(12) United States Patent
Ansari et al.

(10) Patent No.: US 11,032,097 B2
(45) Date of Patent: Jun. 8, 2021

(54) SYSTEM AND METHOD FOR PROVIDING NETWORK SUPPORT SERVICES AND PREMISES GATEWAY SUPPORT INFRASTRUCTURE

(71) Applicant: KIP PROD P1 LP, New York, NY (US)

(72) Inventors: Amir Ansari, Plano, TX (US); George A. Cowgill, Farmersville, TX (US); Leon A. Nicholls, Santa Clara, CA (US); Jude P. Ramayya, Richardson, TX (US); Ramprakash Masina, Plano, TX (US); Alvin R. McQuarters, Euless, TX (US); Atousa Raissyan, Potomac, MD (US)

(73) Assignee: KIP PROD P1 LP, New York, NY (US)

( * ) Notice: Subject to any disclaimer, the term of this patent is extended or adjusted under 35 U.S.C. 154(b) by 0 days.

(21) Appl. No.: 16/452,249

(22) Filed: Jun. 25, 2019

(65) Prior Publication Data

US 2019/0312745 A1    Oct. 10, 2019

Related U.S. Application Data

(63) Continuation of application No. 15/799,450, filed on Oct. 31, 2017, now Pat. No. 10,361,877, which is a (Continued)

(51) Int. Cl.
*H04L 12/28*    (2006.01)
*H04L 29/06*    (2006.01)
(Continued)

(52) U.S. Cl.
CPC .......... *H04L 12/2807* (2013.01); *G05B 15/02* (2013.01); *G05B 19/042* (2013.01);
(Continued)

(58) Field of Classification Search
CPC ..... H04L 12/2807; H04L 41/12; H04L 41/22; H04L 47/80; G06F 16/68; G06F 16/64
See application file for complete search history.

(56) References Cited

U.S. PATENT DOCUMENTS 2,273,733 A    2/1942    Paddock
2,316,993 A    4/1943    Sherwood
(Continued)

FOREIGN PATENT DOCUMENTS

CN    102500747 A    11/2011
DE    3002904 A1    8/1980
(Continued)

OTHER PUBLICATIONS

DLNA enables streaming of premium video in connected homes across Europe. (New Products) IPTV Newsletter, v 5, n 10, p. 4 Oct. 2011.
(Continued)

*Primary Examiner* — Minh Chau Nguyen
(74) *Attorney, Agent, or Firm* — Perkins Coie LLP

(57) ABSTRACT

A service management system communicates via wide area network with gateway devices located at respective user premises. The service management system remotely manages delivery of application services, which can be voice controlled, by a gateway, e.g. by selectively activating/deactivating service logic modules in the gateway. The service management system also may selectively provide secure communications and exchange of information among gateway devices and among associated endpoint devices. An exemplary service management system includes a router connected to the network and one or more computer platforms, for implementing management functions. Examples of the functions include a connection manager for controlling system communications with the gateway devices, an authentication manager for authenticating each gateway device and controlling the connection manager and a subscription manager for managing applications services and/or features offered by the gateway devices. A service manager,
(Continued)

controlled by the subscription manager, distributes service specific configuration data to authenticated gateway devices.

32 Claims, 23 Drawing Sheets

Related U.S. Application Data continuation of application No. 15/357,959, filed on Nov. 21, 2016, now Pat. No. 10,225,096, which is a continuation of application No. 15/047,976, filed on Feb. 19, 2016, now Pat. No. 9,736,028, which is a continuation of application No. 13/618,047, filed on Sep. 14, 2012, now Pat. No. 9,270,492, which is a continuation of application No. 12/521,758, filed as application No. PCT/US2007/019544 on Sep. 7, 2007, now Pat. No. 8,281,010.

(60) Provisional application No. 60/882,865, filed on Dec. 29, 2006, provisional application No. 60/882,862, filed on Dec. 29, 2006.

(51) Int. Cl.

| | | |
|---|---|---|
| *H04L 29/12* | (2006.01) | |
| *H04L 29/08* | (2006.01) | |
| *H04N 21/00* | (2011.01) | |
| *H04N 21/40* | (2011.01) | |
| *H04L 12/24* | (2006.01) | |
| *G06Q 30/04* | (2012.01) | |
| *G06F 16/68* | (2019.01) | |
| *G06F 16/64* | (2019.01) | |
| *H04W 12/033* | (2021.01) | |
| *H04W 12/30* | (2021.01) | |
| *H04W 12/065* | (2021.01) | |
| *H04W 12/0431* | (2021.01) | |
| *H04L 12/66* | (2006.01) | |
| *H04L 12/927* | (2013.01) | |
| *H04L 12/947* | (2013.01) | |
| *G10L 15/22* | (2006.01) | |
| *G05B 15/02* | (2006.01) | |
| *G08B 13/196* | (2006.01) | |
| *G05B 19/042* | (2006.01) | |
| *H04W 12/00* | (2021.01) | |
| *H04W 12/06* | (2021.01) | |
| *H04W 12/08* | (2021.01) | |
| *H04W 4/80* | (2018.01) | |
| *H04N 7/18* | (2006.01) | |

(52) U.S. Cl.
CPC ............ *G06F 16/64* (2019.01); *G06F 16/68* (2019.01); *G06Q 30/04* (2013.01); *G08B 13/19656* (2013.01); *G10L 15/22* (2013.01); *H04L 12/2803* (2013.01); *H04L 12/2812* (2013.01); *H04L 12/2814* (2013.01); *H04L 12/2818* (2013.01); *H04L 12/66* (2013.01); *H04L 29/06027* (2013.01); *H04L 29/12132* (2013.01); *H04L 29/12169* (2013.01); *H04L 41/0803* (2013.01); *H04L 41/12* (2013.01); *H04L 41/22* (2013.01); *H04L 47/80* (2013.01); *H04L 49/25* (2013.01); *H04L 61/1552* (2013.01); *H04L 61/1576* (2013.01); *H04L 63/02* (2013.01); *H04L 63/08* (2013.01); *H04L 63/10* (2013.01); *H04L 63/20* (2013.01); *H04L 65/102* (2013.01); *H04L 67/104* (2013.01); *H04L 67/125* (2013.01); *H04L 67/141* (2013.01); *H04L 67/16* (2013.01); *H04L 67/20* (2013.01); *H04L 67/42* (2013.01); *H04W 12/033* (2021.01); *H04W 12/0431* (2021.01); *H04W 12/065* (2021.01); *H04W 12/35* (2021.01); *G05B 2219/2642* (2013.01); *G10L 2015/223* (2013.01); *H04L 69/325* (2013.01); *H04L 2012/2849* (2013.01); *H04N 7/181* (2013.01); *H04N 21/00* (2013.01); *H04N 21/40* (2013.01); *H04W 4/80* (2018.02); *H04W 12/00* (2013.01); *H04W 12/06* (2013.01); *H04W 12/08* (2013.01); *Y10S 370/911* (2013.01)

(56) References Cited

U.S. PATENT DOCUMENTS

| | | |
|---|---|---|
| 4,297,607 A | 10/1981 | Lynnworth et al. |
| 4,467,586 A | 8/1984 | Long |
| 4,814,552 A | 3/1989 | Stefik et al. |
| 4,991,148 A | 2/1991 | Gilchrist |
| 5,339,259 A | 8/1994 | Puma |
| 5,372,138 A | 12/1994 | Crowley et al. |
| 5,421,338 A | 6/1995 | Crowley et al. |
| 5,515,853 A | 5/1996 | Smith et al. |
| 5,517,579 A | 5/1996 | Baron et al. |
| 5,524,630 A | 6/1996 | Crowley et al. |
| 5,588,432 A | 12/1996 | Crowley et al. |
| 5,673,252 A | 9/1997 | Johnson et al. |
| 5,715,825 A | 2/1998 | Crowley et al. |
| 5,750,941 A | 5/1998 | Ishikawa et al. |
| 5,840,031 A | 11/1998 | Crowley et al. |
| 5,867,146 A | 2/1999 | Kim et al. |
| 5,867,666 A | 2/1999 | Harvey |
| 5,878,223 A | 3/1999 | Becker et al. |
| 5,943,478 A | 8/1999 | Aggarwal et al. |
| 5,977,958 A | 11/1999 | Baron et al. |
| 5,991,739 A | 11/1999 | Cupps et al. |
| 5,995,272 A | 11/1999 | Werner |
| 6,004,269 A | 12/1999 | Crowley et al. |
| 6,016,520 A | 1/2000 | Facq et al. |
| 6,029,045 A | 2/2000 | Picco |
| 6,033,150 A | 3/2000 | Culen |
| 6,039,251 A | 3/2000 | Holowko |
| 6,055,569 A | 4/2000 | O'Brien et al. |
| 6,092,114 A | 7/2000 | Shaffer et al. |
| 6,118,205 A | 9/2000 | Wood et al. |
| 6,158,483 A | 12/2000 | Trpkovski |
| 6,228,290 B1 | 5/2001 | Reames et al. |
| 6,301,609 B1 | 10/2001 | Aravamudan et al. |
| 6,330,599 B1 | 12/2001 | Harvey |
| 6,377,571 B1 | 4/2002 | Tai |
| 6,426,955 B1 | 7/2002 | Dalton |
| 6,434,158 B1 | 8/2002 | Harris |
| 6,434,618 B1 | 8/2002 | Cohen |
| 6,449,344 B1 | 9/2002 | Goldfinger et al. |
| 6,456,597 B1 | 9/2002 | Bare |
| 6,457,294 B1 | 10/2002 | Virnelson et al. |
| 6,487,646 B1 | 11/2002 | Adams et al. |
| 6,493,128 B1 | 12/2002 | Agrawal et al. |
| 6,496,575 B1 | 12/2002 | Vasell |
| 6,526,581 B1 | 2/2003 | Edson |
| 6,542,506 B1 | 4/2003 | Lee |
| 6,549,937 B1 | 4/2003 | Auerbach et al. |
| 6,553,345 B1 | 4/2003 | Kuhn |
| 6,622,168 B1 | 9/2003 | Datta |
| 6,631,412 B1 | 10/2003 | Glasser et al. |
| 6,658,091 B1 | 12/2003 | Naidoo |
| 6,671,730 B1 | 12/2003 | Akatsu |
| 6,677,976 B2 | 1/2004 | Parker et al. |
| 6,681,232 B1 | 1/2004 | Sistanizadeh et al. |
| 6,694,007 B2 | 2/2004 | Lang et al. |
| 6,697,474 B1 | 2/2004 | Hanson et al. |
| 6,731,992 B1 | 5/2004 | Ziegler |
| 6,735,619 B1 | 5/2004 | Sawada |
| 6,745,632 B1 | 6/2004 | Dryer et al. |
| 6,771,006 B2 | 8/2004 | Zioter et al. |
| 6,798,403 B2 | 9/2004 | Kitada et al. |

(56) References Cited

U.S. PATENT DOCUMENTS

| | | |
|---|---|---|
| 6,850,252 B1 | 2/2005 | Hoffberg |
| 6,850,901 B1 | 2/2005 | Hunter et al. |
| 6,850,979 B1 | 2/2005 | Saulpaugh et al. |
| 6,851,054 B2 | 2/2005 | Wheeler |
| 6,865,150 B1 | 3/2005 | Perkins |
| 6,868,292 B2 | 3/2005 | Ficco |
| 6,871,193 B1 | 3/2005 | Campbell et al. |
| 6,889,321 B1 | 5/2005 | Kung |
| 6,891,838 B1 | 5/2005 | Petite et al. |
| 6,898,276 B1 | 5/2005 | Millet et al. |
| 6,910,074 B1 | 6/2005 | Amin |
| 6,928,576 B2 | 8/2005 | Sekiguchi |
| 6,930,598 B2 | 8/2005 | Weiss |
| 6,931,445 B2 | 8/2005 | Davis |
| 6,952,773 B2 | 10/2005 | Wheeler |
| 6,957,275 B1 | 10/2005 | Sekiguchi |
| 6,961,335 B1 | 11/2005 | Millet et al. |
| 6,961,857 B1 | 11/2005 | Floryanzia |
| 6,965,614 B1 | 11/2005 | Osterhout et al. |
| 6,981,025 B1 | 12/2005 | Frazier |
| 6,988,070 B2 | 1/2006 | Kawasaki |
| 7,007,070 B1 | 2/2006 | Hickman |
| 7,035,270 B2 | 4/2006 | Moore, Jr. et al. |
| 7,054,376 B1 | 5/2006 | Rubinstain et al. |
| 7,058,036 B1 | 6/2006 | Yu et al. |
| 7,075,919 B1 | 7/2006 | Wendt et al. |
| 7,123,700 B1 | 10/2006 | Weaver, III et al. |
| 7,130,719 B2 | 10/2006 | Ehlers et al. |
| 7,139,811 B2 | 11/2006 | Lev Ran et al. |
| 7,167,920 B2 | 1/2007 | Traversat et al. |
| 7,203,477 B2 | 4/2007 | Coppinger et al. |
| 7,207,048 B2 | 4/2007 | McQuillan et al. |
| 7,222,087 B1 | 5/2007 | Bezos et al. |
| 7,235,710 B2 | 6/2007 | Hatzfeld et al. |
| 7,266,589 B2 | 9/2007 | Brownhill |
| 7,269,162 B1 | 9/2007 | Turner |
| 7,277,384 B1 | 10/2007 | Chan |
| 7,305,550 B2 | 12/2007 | Oliver |
| 7,313,120 B2 | 12/2007 | Ekberg et al. |
| 7,336,262 B2 | 2/2008 | Tsuji |
| 7,349,993 B2 | 3/2008 | Kawamoto et al. |
| 7,397,807 B2 | 7/2008 | Chen et al. |
| 7,403,838 B2 | 7/2008 | Deen et al. |
| 7,421,483 B1 | 9/2008 | Kalra |
| 7,433,836 B1 | 10/2008 | August |
| 7,444,401 B1 | 10/2008 | Keyghobad |
| 7,461,122 B2 | 12/2008 | Kawana |
| 7,480,724 B2 | 1/2009 | Zimler et al. |
| 7,526,539 B1 | 4/2009 | Hsu |
| 7,551,071 B2 | 6/2009 | Bennett et al. |
| 7,574,660 B2 | 8/2009 | Campbell et al. |
| 7,584,263 B1 | 9/2009 | Hicks |
| 7,596,692 B2 | 9/2009 | Fox et al. |
| 7,627,679 B1 | 12/2009 | Bowen et al. |
| 7,650,361 B1 | 1/2010 | Wong |
| 7,673,001 B1 | 3/2010 | Battle et al. |
| 7,685,629 B1 | 3/2010 | White |
| 7,706,928 B1 | 4/2010 | Howell |
| 7,707,606 B2 | 4/2010 | Hofrichter et al. |
| 7,761,527 B2 | 7/2010 | Ferreira et al. |
| 7,765,294 B2 | 7/2010 | Edwards et al. |
| 7,780,080 B2 | 8/2010 | Owen |
| 7,809,605 B2 | 10/2010 | Tonse et al. |
| 7,818,444 B2 | 10/2010 | Brueck |
| 7,831,748 B2 | 11/2010 | Dernis et al. |
| 7,836,044 B2 | 11/2010 | Kamvar et al. |
| 7,865,735 B2 | 1/2011 | Yiachos |
| 7,895,633 B2 | 2/2011 | Van Hoff et al. |
| 7,913,278 B2 | 3/2011 | Ellis et al. |
| 7,933,970 B2 | 4/2011 | Zimler et al. |
| 7,948,992 B1 | 5/2011 | Holmgren et al. |
| 7,961,712 B2 | 6/2011 | Rabenko et al. |
| 7,970,863 B1 | 6/2011 | Fontaine |
| 7,970,914 B2 | 6/2011 | Bowen et al. |
| 7,987,490 B2 | 7/2011 | Ansari et al. |
| 8,005,915 B2 | 8/2011 | Jeon |
| 8,020,174 B2 | 9/2011 | Sedogbo |
| 8,027,335 B2 | 9/2011 | Ansari et al. |
| 8,031,726 B2 | 10/2011 | Ansari et al. |
| 8,032,409 B1 | 10/2011 | Mikurak |
| 8,060,589 B1 | 11/2011 | Kao |
| 8,086,495 B2 | 12/2011 | Ansari et al. |
| 8,090,856 B1 | 1/2012 | Bonefas |
| 8,107,217 B2 | 1/2012 | Watanabe |
| 8,189,608 B2 | 5/2012 | Duo et al. |
| 8,205,240 B2 | 6/2012 | Ansari et al. |
| 8,280,978 B2 | 8/2012 | Ansari et al. |
| 8,281,010 B2 | 10/2012 | Ansari et al. |
| 8,315,266 B1 | 11/2012 | Lam et al. |
| 8,369,326 B2 | 2/2013 | Ansari et al. |
| 8,374,586 B2 | 2/2013 | Bentkovski |
| 8,375,657 B2 | 2/2013 | Buchwald et al. |
| 8,386,465 B2 | 2/2013 | Ansari et al. |
| 8,391,299 B2 | 3/2013 | Schliserman et al. |
| 8,397,264 B2 | 3/2013 | Ansari et al. |
| 8,422,397 B2 | 4/2013 | Ansari et al. |
| 8,459,119 B2 | 6/2013 | Miyamoto et al. |
| 8,461,413 B2 | 6/2013 | Frankard |
| 8,543,665 B2 | 9/2013 | Ansari et al. |
| 8,577,739 B2 | 11/2013 | Ansari et al. |
| 8,583,055 B2 | 11/2013 | Park |
| 8,621,588 B2 | 12/2013 | Yoshida |
| 8,649,386 B2 | 2/2014 | Ansari et al. |
| 8,654,936 B1 | 2/2014 | Eslambolchi |
| 8,665,885 B2 | 3/2014 | Pastorino et al. |
| 8,694,523 B2 | 4/2014 | Lim et al. |
| 8,701,166 B2 | 4/2014 | Courtney |
| 8,738,921 B2 | 5/2014 | Gephart |
| 8,856,289 B2 | 10/2014 | Ansari et al. |
| 8,893,293 B1 | 11/2014 | Schmoyer |
| 8,971,341 B2 | 3/2015 | Ansari et al. |
| 8,973,056 B2 | 3/2015 | Ellis et al. |
| 9,071,606 B2 | 6/2015 | Braun et al. |
| 9,167,176 B2 | 10/2015 | Winter |
| 9,203,912 B2 | 12/2015 | Krishnaswarmy et al. |
| 9,253,150 B2 | 2/2016 | Ansari et al. |
| 9,270,492 B2 | 2/2016 | Ansari et al. |
| 9,325,540 B2 | 4/2016 | Zhang |
| 9,407,624 B1 | 8/2016 | Myers |
| 9,426,151 B2 | 8/2016 | Richards et al. |
| 9,569,587 B2 | 2/2017 | Ansari et al. |
| 9,602,880 B2 | 3/2017 | Ansari et al. |
| 9,736,028 B2 | 8/2017 | Ansari et al. |
| 9,924,235 B2 | 3/2018 | Ansari et al. |
| 10,057,269 B1 | 8/2018 | Ellingson |
| 10,069,643 B2 | 9/2018 | Ansari et al. |
| 10,071,395 B2 | 9/2018 | Ansari et al. |
| 10,097,367 B2 | 10/2018 | Ansari et al. |
| 10,225,096 B2 | 3/2019 | Ansari et al. |
| 10,263,803 B2 | 4/2019 | Ansari et al. |
| 10,361,877 B2 | 7/2019 | Ansari et al. |
| 10,374,821 B2 | 8/2019 | Ansari et al. |
| 2001/0011284 A1 | 8/2001 | Humpleman |
| 2001/0025349 A1 | 9/2001 | Sharood |
| 2001/0041982 A1 | 11/2001 | Kawasaki |
| 2001/0048030 A1 | 12/2001 | Sharood |
| 2001/0049786 A1 | 12/2001 | Harrison et al. |
| 2001/0051996 A1 | 12/2001 | Cooper et al. |
| 2002/0021465 A1 | 2/2002 | Moore |
| 2002/0023131 A1 | 2/2002 | Wu et al. |
| 2002/0027504 A1 | 3/2002 | David |
| 2002/0033416 A1 | 3/2002 | Gerszberg |
| 2002/0035404 A1 | 3/2002 | Ficco |
| 2002/0046279 A1 | 4/2002 | Chung |
| 2002/0052915 A1 | 5/2002 | Amin-Salehi |
| 2002/0059425 A1 | 5/2002 | Belfiore |
| 2002/0059586 A1 | 5/2002 | Carney et al. |
| 2002/0060994 A1 | 5/2002 | Kovacs et al. |
| 2002/0065894 A1 | 5/2002 | Dalal et al. |
| 2002/0067376 A1 | 6/2002 | Martin |
| 2002/0069243 A1 | 6/2002 | Raverdy |
| 2002/0071440 A1 | 6/2002 | Cerami et al. |
| 2002/0078150 A1 | 6/2002 | Thompson |
| 2002/0103877 A1 | 8/2002 | Gagnon |

(56) References Cited

U.S. PATENT DOCUMENTS

| | | |
|---|---|---|
| 2002/0112047 A1 | 8/2002 | Kushwaha et al. |
| 2002/0120686 A1 | 8/2002 | Schell |
| 2002/0122410 A1 | 9/2002 | Kulikov et al. |
| 2002/0124257 A1 | 9/2002 | Ismagilov |
| 2002/0128930 A1 | 9/2002 | Nakamoto et al. |
| 2002/0133613 A1 | 9/2002 | Teng |
| 2002/0136226 A1 | 9/2002 | Christoffel et al. |
| 2002/0156688 A1 | 10/2002 | Horn |
| 2002/0169858 A1 | 11/2002 | Bellinger |
| 2002/0176404 A1 | 11/2002 | Girard |
| 2002/0184358 A1 | 12/2002 | Traversat et al. |
| 2002/0184620 A1 | 12/2002 | Davies et al. |
| 2003/0005112 A1 | 1/2003 | Krautkremer |
| 2003/0012155 A1 | 1/2003 | Sayeedi |
| 2003/0023131 A1 | 1/2003 | Wu et al. |
| 2003/0023730 A1 | 1/2003 | Wengrovitz |
| 2003/0083961 A1 | 5/2003 | Bezos et al. |
| 2003/0095569 A1 | 5/2003 | Wengrovitz |
| 2003/0112755 A1 | 6/2003 | McDysan |
| 2003/0118726 A1 | 6/2003 | Nakayama |
| 2003/0104010 A1 | 7/2003 | Szeto et al. |
| 2003/0126207 A1 | 7/2003 | Creamer et al. |
| 2003/0135823 A1 | 7/2003 | Marejka |
| 2003/0140103 A1 | 7/2003 | Szeto et al. |
| 2003/0151621 A1 | 8/2003 | McEvilly |
| 2003/0169752 A1 | 9/2003 | Chen et al. |
| 2003/0171996 A1 | 9/2003 | Chen et al. |
| 2003/0185360 A1 | 10/2003 | Moore |
| 2003/0210770 A1 | 11/2003 | Krejcarek |
| 2003/0217110 A1 | 11/2003 | Weiss |
| 2003/0229900 A1 | 12/2003 | Reisman |
| 2003/0231641 A1 | 12/2003 | Ryoo |
| 2003/0237004 A1 | 12/2003 | Okamura |
| 2004/0001480 A1 | 1/2004 | Tanigawa et al. |
| 2004/0003070 A1 | 1/2004 | Fernald et al. |
| 2004/0005859 A1 | 1/2004 | Ghercioiu et al. |
| 2004/0006477 A1 | 1/2004 | Craner |
| 2004/0006769 A1 | 1/2004 | Ansari et al. |
| 2004/0010327 A1 | 1/2004 | Terashima |
| 2004/0019489 A1 | 1/2004 | Funk et al. |
| 2004/0030750 A1 | 2/2004 | Moore et al. |
| 2004/0032399 A1 | 2/2004 | Sekiguchi et al. |
| 2004/0047310 A1 | 3/2004 | Chen et al. |
| 2004/0047358 A1 | 3/2004 | Chen et al. |
| 2004/0060079 A1 | 3/2004 | Tanaka et al. |
| 2004/0062230 A1 | 4/2004 | Taylor et al. |
| 2004/0073867 A1 | 4/2004 | Kausik et al. |
| 2004/0078573 A1 | 4/2004 | Matsuyama |
| 2004/0114608 A1 | 6/2004 | Rao et al. |
| 2004/0114610 A1 | 6/2004 | Featherson |
| 2004/0128310 A1 | 7/2004 | Zmudzinski et al. |
| 2004/0133657 A1 | 7/2004 | Smith et al. |
| 2004/0136373 A1 | 7/2004 | Bareis |
| 2004/0140989 A1 | 7/2004 | Papageorge |
| 2004/0160969 A1 | 8/2004 | Moon et al. |
| 2004/0174858 A1 | 9/2004 | Caspi et al. |
| 2004/0174863 A1 | 9/2004 | Caspi et al. |
| 2004/0177376 A1 | 9/2004 | Caspi et al. |
| 2004/0203942 A1 | 10/2004 | Dehlin |
| 2004/0213273 A1 | 10/2004 | Ma |
| 2004/0215750 A1 | 10/2004 | Stilp |
| 2004/0218609 A1 | 11/2004 | Foster et al. |
| 2004/0228324 A1 | 11/2004 | Alexiou |
| 2004/0230695 A1 | 11/2004 | Anschutz et al. |
| 2004/0240389 A1 | 12/2004 | Bessis |
| 2004/0255048 A1 | 12/2004 | Lev Ran et al. |
| 2004/0255326 A1 | 12/2004 | Hicks, III et al. |
| 2005/0018612 A1 | 1/2005 | Fitzgerald |
| 2005/0025887 A1 | 2/2005 | Xin |
| 2005/0027887 A1* | 2/2005 | Zimler ............... H04L 12/2814 709/249 |
| 2005/0038526 A1 | 2/2005 | Choi |
| 2005/0038875 A1 | 2/2005 | Park |
| 2005/0065855 A1 | 3/2005 | Geller |
| 2005/0068938 A1 | 3/2005 | Wang |
| 2005/0071663 A1 | 3/2005 | Medvinsky |
| 2005/0076198 A1 | 4/2005 | Skomra et al. |
| 2005/0089052 A1 | 4/2005 | Chen et al. |
| 2005/0094621 A1 | 5/2005 | Acharya |
| 2005/0107086 A1 | 5/2005 | Tell |
| 2005/0108091 A1 | 5/2005 | Sotak et al. |
| 2005/0141492 A1 | 6/2005 | Chan |
| 2005/0144616 A1 | 6/2005 | Hammond |
| 2005/0149922 A1 | 7/2005 | Vincent |
| 2005/0150697 A1 | 7/2005 | Altman et al. |
| 2005/0174950 A1 | 8/2005 | Ayyagari |
| 2005/0180396 A1 | 8/2005 | Lim |
| 2005/0190744 A1 | 9/2005 | Sun et al. |
| 2005/0190898 A1 | 9/2005 | Priest |
| 2005/0195752 A1 | 9/2005 | Amin-Salehi |
| 2005/0195802 A1 | 9/2005 | Klein |
| 2005/0198040 A1 | 9/2005 | Cohen |
| 2005/0208948 A1 | 9/2005 | Hori |
| 2005/0210064 A1 | 9/2005 | Caldini |
| 2005/0216302 A1 | 9/2005 | Raji |
| 2005/0216580 A1* | 9/2005 | Raji ....................... G06Q 30/02 709/223 |
| 2005/0216949 A1 | 9/2005 | Candelora et al. |
| 2005/0220081 A1 | 10/2005 | Urquizo |
| 2005/0222933 A1 | 10/2005 | Wesby |
| 2005/0226158 A1 | 10/2005 | Takahashi |
| 2005/0232284 A1 | 10/2005 | Karaoguz et al. |
| 2005/0240680 A1 | 10/2005 | Costa-Requena et al. |
| 2005/0240943 A1 | 10/2005 | Smith et al. |
| 2005/0257039 A1 | 11/2005 | Marshall |
| 2005/0260996 A1 | 11/2005 | Groenendaal |
| 2005/0262257 A1 | 11/2005 | Major |
| 2005/0273790 A1 | 12/2005 | Kearney, III et al. |
| 2005/0286466 A1 | 12/2005 | Tagg |
| 2006/0020589 A1 | 1/2006 | Wu |
| 2006/0025132 A1 | 2/2006 | Karoguz et al. |
| 2006/0029007 A1 | 2/2006 | Ayyagari |
| 2006/0029064 A1 | 2/2006 | Rao et al. |
| 2006/0031406 A1 | 2/2006 | Watson et al. |
| 2006/0031476 A1 | 2/2006 | Mathes et al. |
| 2006/0040667 A9 | 2/2006 | Coppinger et al. |
| 2006/0041926 A1 | 2/2006 | Istvan |
| 2006/0041936 A1 | 2/2006 | Anderson |
| 2006/0067344 A1 | 3/2006 | Sakurai |
| 2006/0075108 A1 | 4/2006 | Sylvain |
| 2006/0075276 A1 | 4/2006 | Kataria |
| 2006/0075429 A1 | 4/2006 | Istvan |
| 2006/0080352 A1 | 4/2006 | Boubez et al. |
| 2006/0104432 A1 | 5/2006 | Evslin |
| 2006/0122976 A1 | 6/2006 | Baluja et al. |
| 2006/0136246 A1 | 6/2006 | Tu |
| 2006/0146784 A1 | 7/2006 | Karpov et al. |
| 2006/0153214 A1 | 7/2006 | Moore et al. |
| 2006/0159116 A1 | 7/2006 | Gerszberg |
| 2006/0164205 A1 | 7/2006 | Buckingham |
| 2006/0167985 A1 | 7/2006 | Albanese |
| 2006/0174289 A1 | 8/2006 | Theberge |
| 2006/0178943 A1 | 8/2006 | Rollinson et al. |
| 2006/0209857 A1 | 9/2006 | Hicks, III et al. |
| 2006/0220830 A1 | 10/2006 | Bennett |
| 2006/0227724 A1 | 10/2006 | Thubert et al. |
| 2006/0239425 A1 | 10/2006 | Hurst |
| 2006/0253894 A1 | 11/2006 | Bookman |
| 2006/0256759 A1 | 11/2006 | Sayeedi |
| 2006/0258396 A1 | 11/2006 | Matsuoka |
| 2006/0259584 A1 | 11/2006 | Watson et al. |
| 2006/0271695 A1* | 11/2006 | Lavian ................. G06F 21/552 709/229 |
| 2006/0291506 A1 | 12/2006 | Cain |
| 2006/0293965 A1 | 12/2006 | Burton |
| 2007/0005766 A1 | 1/2007 | Singhal et al. |
| 2007/0021867 A1 | 1/2007 | Woo |
| 2007/0036303 A1 | 2/2007 | Lee et al. |
| 2007/0038637 A1 | 2/2007 | Taneja |
| 2007/0043476 A1 | 2/2007 | Richards et al. |
| 2007/0043478 A1 | 2/2007 | Ehlers et al. |
| 2007/0049342 A1 | 3/2007 | Mayer et al. |
| 2007/0050351 A1 | 3/2007 | Kasperski et al. |
| 2007/0055759 A1 | 3/2007 | McCoy |

(56) References Cited

U.S. PATENT DOCUMENTS

| | | |
|---|---|---|
| 2007/0058608 A1 | 3/2007 | Lin |
| 2007/0058644 A1 | 3/2007 | Brahmbhatt et al. |
| 2007/0061149 A1 | 3/2007 | Chang |
| 2007/0100981 A1 | 5/2007 | Adamczyk et al. |
| 2007/0106570 A1 | 5/2007 | Hartman et al. |
| 2007/0109976 A1 | 5/2007 | Samanta et al. |
| 2007/0115922 A1 | 5/2007 | Schneider et al. |
| 2007/0143262 A1 | 6/2007 | Kasperski |
| 2007/0143831 A1 | 6/2007 | Pearson |
| 2007/0147420 A1 | 6/2007 | Dean |
| 2007/0150286 A1 | 6/2007 | Miller |
| 2007/0150345 A1 | 6/2007 | Tonse et al. |
| 2007/0156265 A1 | 7/2007 | McCoy |
| 2007/0165629 A1 | 7/2007 | Chaturvedi et al. |
| 2007/0169144 A1 | 7/2007 | Chen |
| 2007/0171895 A1 | 7/2007 | Oberle et al. |
| 2007/0192477 A1 | 8/2007 | Hicks et al. |
| 2007/0192486 A1 | 8/2007 | Wilson |
| 2007/0192735 A1 | 8/2007 | Lehto |
| 2007/0198437 A1 | 8/2007 | Eisner et al. |
| 2007/0199022 A1 | 8/2007 | Moshiri |
| 2007/0220165 A1 | 9/2007 | Moorer |
| 2007/0253443 A1 | 11/2007 | Dean, Jr. et al. |
| 2007/0286159 A1 | 12/2007 | Preiss et al. |
| 2007/0291650 A1 | 12/2007 | Ormazabal |
| 2007/0294721 A1 | 12/2007 | Haeuser |
| 2007/0297454 A1 | 12/2007 | Brothers |
| 2008/0005306 A1 | 1/2008 | Kushalnagar |
| 2008/0005565 A1 | 1/2008 | Shiga |
| 2008/0022391 A1 | 1/2008 | Sax |
| 2008/0043719 A1 | 2/2008 | Pok et al. |
| 2008/0052393 A1 | 2/2008 | McNaughton et al. |
| 2008/0066126 A1 | 3/2008 | Walter |
| 2008/0069121 A1 | 3/2008 | Adamson et al. |
| 2008/0084789 A1 | 4/2008 | Altman et al. |
| 2008/0084888 A1 | 4/2008 | Yadav et al. |
| 2008/0098212 A1 | 4/2008 | Helms |
| 2008/0101320 A1 | 5/2008 | Krahn et al. |
| 2008/0123683 A1 | 5/2008 | Cheng et al. |
| 2008/0130666 A1 | 6/2008 | Kawamoto et al. |
| 2008/0134258 A1 | 6/2008 | Goose |
| 2008/0141315 A1 | 6/2008 | Ogilvie |
| 2008/0144642 A1 | 6/2008 | Song |
| 2008/0151778 A1 | 6/2008 | Venkitaraman et al. |
| 2008/0155613 A1* | 6/2008 | Benya ............... H04N 7/17318 725/89 |
| 2008/0163059 A1 | 7/2008 | Craner |
| 2008/0166048 A1 | 7/2008 | Raif et al. |
| 2008/0177856 A1 | 7/2008 | Howard |
| 2008/0178236 A1 | 7/2008 | Hoshall |
| 2008/0221715 A1 | 9/2008 | Krzyzanowski |
| 2008/0239957 A1 | 10/2008 | Tokura |
| 2008/0240125 A1 | 10/2008 | Purvis et al. |
| 2008/0304500 A1 | 12/2008 | Schliserman et al. |
| 2009/0034419 A1 | 2/2009 | Flammer et al. |
| 2009/0077207 A1 | 3/2009 | Karaoguz et al. |
| 2009/0100460 A1 | 4/2009 | Hicks |
| 2009/0178079 A1 | 7/2009 | Derrenberger |
| 2009/0180422 A1 | 7/2009 | Bohacek et al. |
| 2009/0189774 A1 | 7/2009 | Brundridge et al. |
| 2009/0216847 A1 | 8/2009 | Krishnaswarmy et al. |
| 2010/0014444 A1 | 1/2010 | Ghanadan et al. |
| 2010/0030734 A1 | 2/2010 | Chunilal |
| 2010/0061309 A1 | 3/2010 | Buddhikot et al. |
| 2010/0071053 A1 | 3/2010 | Ansari et al. |
| 2010/0205152 A1 | 8/2010 | Ansari et al. |
| 2010/0211636 A1 | 8/2010 | Starkenburg |
| 2010/0238810 A1 | 9/2010 | Ormazabal |
| 2010/0241711 A1 | 9/2010 | Ansari et al. |
| 2010/0291940 A1 | 11/2010 | Koo |
| 2011/0019135 A1 | 1/2011 | Koganezawa |
| 2011/0092232 A1 | 4/2011 | Lee |
| 2011/0182205 A1 | 7/2011 | Gerdes et al. |
| 2012/0060181 A1 | 3/2012 | Craner |
| 2012/0101881 A1 | 4/2012 | Taylor et al. |
| 2012/0110490 A1 | 5/2012 | Keller |
| 2012/0157043 A1 | 6/2012 | LaJoie |
| 2012/0311665 A1 | 12/2012 | Lim |
| 2013/0191871 A1 | 7/2013 | Gilboy |
| 2013/0329745 A1 | 12/2013 | Phillips et al. |
| 2014/0362253 A1 | 12/2014 | Kim |
| 2015/0074259 A1 | 3/2015 | Ansari et al. |
| 2015/0208363 A1 | 7/2015 | Fu et al. |
| 2016/0226823 A1 | 8/2016 | Ansari et al. |
| 2016/0226920 A1 | 8/2016 | Ansari et al. |
| 2016/0330200 A1 | 11/2016 | Ansari et al. |
| 2016/0344745 A1 | 11/2016 | Johnson et al. |
| 2017/0078154 A1 | 3/2017 | Ansari et al. |
| 2017/0344703 A1 | 11/2017 | Ansari et al. |
| 2018/0123819 A1 | 5/2018 | Ansari et al. |
| 2018/0131571 A1 | 5/2018 | Ansari et al. |
| 2018/0131572 A1 | 5/2018 | Ansari et al. |
| 2018/0152310 A1 | 5/2018 | Ansari et al. |
| 2018/0198692 A1 | 7/2018 | Ansari et al. |
| 2018/0227140 A1 | 8/2018 | Ansari et al. |
| 2018/0323993 A1 | 11/2018 | Ansari et al. |
| 2018/0333746 A1 | 11/2018 | Ansari et al. |
| 2018/0361426 A1 | 12/2018 | Ansari et al. |
| 2019/0020496 A1 | 1/2019 | Ansari et al. |
| 2019/0245714 A1 | 8/2019 | Ansari et al. |
| 2020/0076638 A1 | 3/2020 | Ansari et al. |
| 2020/0176095 A1 | 6/2020 | Ansari et al. |
| 2020/0228363 A1 | 7/2020 | Ansari et al. |
| 2020/0228364 A1 | 7/2020 | Ansari et al. |

FOREIGN PATENT DOCUMENTS

| | | |
|---|---|---|
| DE | 3818631 A1 | 12/1989 |
| DE | 9116206 U1 | 4/1992 |
| DE | 19723596 C1 | 10/1998 |
| DE | 10024525 A1 | 11/2001 |
| DE | 20304806 U1 | 8/2003 |
| EP | 0805254 A2 | 11/1997 |
| EP | 0921260 A2 | 6/1999 |
| EP | 1113659 A2 | 7/2001 |
| EP | 1195497 A2 | 4/2002 |
| EP | 1377005 A1 | 1/2004 |
| EP | 1394986 A1 | 3/2004 |
| EP | 1657396 A2 | 5/2006 |
| JP | 07104063 A | 4/1995 |
| JP | 03269387 B2 | 3/2002 |
| JP | 2002139565 A | 5/2002 |
| WO | WO0193533 A2 | 12/2001 |
| WO | WO2005111653 A2 | 11/2005 |
| WO | WO2007004921 A1 | 1/2007 |
| WO | WO2008021665 A2 | 2/2008 |
| WO | WO2008082346 A1 | 7/2008 |
| WO | WO2008082441 A1 | 7/2008 |
| WO | WO2008083384 A2 | 7/2008 |
| WO | WO2008083385 A1 | 7/2008 |
| WO | WO2008083387 A2 | 7/2008 |
| WO | WO2008083391 A2 | 7/2008 |
| WO | WO2008085201 A2 | 7/2008 |
| WO | WO2008085202 A1 | 7/2008 |
| WO | WO2008085203 A2 | 7/2008 |
| WO | WO2008085204 A2 | 7/2008 |
| WO | WO2008085205 A2 | 7/2008 |
| WO | WO2008085206 A2 | 7/2008 |
| WO | WO2008085207 A2 | 7/2008 |
| WO | WO2008085205 A3 | 9/2008 |
| WO | WO2008085204 A3 | 10/2008 |
| WO | WO2008085207 A3 | 10/2008 |
| WO | WO2008085203 A3 | 11/2008 |
| WO | WO2008085206 A3 | 11/2008 |
| WO | WO2009036088 A1 | 3/2009 |
| WO | WO2009036185 A1 | 3/2009 |
| WO | WO2009086134 A1 | 7/2009 |

OTHER PUBLICATIONS

Dueans, J.C., "An End-to-End Service Provisioning Scenario for the Residential Environment," IEEE Communications Magazine, Sep. 2005, pp. 94-100.

(56) References Cited

OTHER PUBLICATIONS

Ganguly, A., et al., "IP over P2P: enabling self-configuring virtual IP networks for grid computing," in Parallel and Distributed Processing symposium, 20060 IPDPS Apr. 25-29, 2006, retrieved on Jan. 20, 2010, retrieved from the internet http://aarXiV.org/PS_cache/cs/pdf/0603/0603087v1.pdf.
Haerick W et al., "Success in Home Service Deployment: Zero-Touch or Chaos?", British Telecommunications, Jul. 1, 2007, pp. 36-43, vol. 5, No. 3, London, GB.
Il-Woo Lee, et al., "A Proposed Platform & Performance Estimation of Digital-Home Service Delivery/Management Systems," Apr. 10, 2006, pp. 713-719, Information Technology: New Generations, 2006.
Intel, "Delivering on the Promise of Triple Play Digital Media," Technology Backgrounder, Consumer Electronics, 2004, pp. 1-4.
International Application No. PCT/US2008/087724, filed Dec. 19, 2008, 7 Pages, 1211 Geneva 20, Switzerland.
International Search Report and the Written Opinion of the International Searching Authority issued in International Application No. PCT/US2008/087724 dated Feb. 17, 2009.
International Search Report and the Written Opinion of the International Searching Authority issued in International Patent Application No. PCT/US08/75889 dated Nov. 24, 2008.
International Search Report and Written Opinion in International Application No. PCT/US05/15860, dated Jul. 17, 2006, 8 pages.
International Search Report and Written Opinion in International Application No. PCT/US08/76036, dated Nov. 14, 2008.
International Search Report in International Application No. PCT/JP2008/051225, dated Feb. 19, 2008.
International Search Report dated Apr. 25, 2008, International Application No. PCT/US2007/019531, filed Sep. 7, 2007, 1 page.
International Search Report dated Aug. 21, 2008, International Application No. PCT/US2007/019534, filed Sep. 7, 2007, 1 page.
International Search Report dated Aug. 25, 2008, International Application No. PCT/US2007/019545, filed Sep. 7, 2007, 1 page.
International Search Report dated Aug. 27, 2008, International Application No. PCT/US2007/089237, filed Dec. 31, 2007, 6 pages.
International Search Report dated Jul. 14, 2008, International Application No. PCT/US2007/019546, filed Sep. 7, 2007, 1 page.
International Search Report dated Jul. 17, 2008, International Application No. PCT/US2007/019543, filed Sep. 7, 2001, 1 page.
International Search Report dated Jul. 2, 2008, International Application No. PCT/US2007/019544, filed Sep. 7, 2007, 1 page.
International Search Report dated Mar. 14, 2008, International Application No. PCT/US2007/019533, filed Sep. 7, 2007, 1 page.
Machine Translation of JP11290082-A, Oct. 1999.
Notification of Transmittal of the International Search Report and the Written Opinion of the International Searching Authority, or the Declaration dated Aug. 27, 2008, 24 pages, Application No. PCT/US2007/089232.
Notification of Transmittal of the International Search Report and the Written Opinion of the International Searching Authority, or the Declaration dated Aug. 8, 2008, 22 pages, Application No. PCT/US2007/089227.
Notification of Transmittal of the International Search Report and the Written Opinion of the International Searching Authority, or the Declaration dated Oct. 22, 2008, 12 pages, Application No. PCT/US2007/089232.
Notification of Transmittal of the International Search Report and the Written Opinion of the International Searching Authority, or the Declaration, dated Feb. 26, 2008, 11 pages, Application No. PCT/US07/19483.
Notification of Transmittal of the International Search Report and the Written Opinion of the International Searching Authority, or the Declaration, dated Mar. 14, 2008, 12 pages, Application No. PCT/US07/19533.
PCT Invitation to Pay Additional Fees and, where Applicable, Protest Fee (PCT/ISA/206) and Communication Relating to the Results of the Partial International Search (Annex to PCT/ISA/206) dated May 19, 2008 for PCT Application No. PCT/US2007/089237, 7 pages.
PCT Invitation to Pay Additional Fees and, where Applicable, Protest Fee (PCT/ISA/206) and Communication Relating to the Results of the Partial International Search (Annex to PCT/ISA/206) dated May 21, 2008 for PCT Application No. PCT/US2007/089227, 7 pages.
Technology and challenges of virtual communities. International Journal of Business Research , v 7 , n 4, p. 69 Jul. 2007.
Wen-Shyang Hwang et al., "A QoS-aware Residential Gateway with Bandwidth Management," Aug. 2005.
Written Opinion of the International Searching Authority dated Apr. 25, 2008, International Application No. PCT/US2007/019531, filed Sep. 7, 2007, 7 pages.
Written Opinion of the International Searching Authority dated Aug. 21, 2008, International Application No. PCT/US2007/019534, filed Sep. 7, 2007, 5 pages.
Written Opinion of the International Searching Authority dated Aug. 25, 2008, International Application No. PCT/US2007/019545, filed Sep. 7, 2007, 5 pages.
Written Opinion of the International Searching Authority dated Jul. 14, 2008, International Application No. PCT/US2007/019546, filed Sep. 7, 2007, 5 pages.
Written Opinion of the International Searching Authority dated Jul. 17, 2008, International Application No. PCT/US2007/019543, filed Sep. 7, 2007, 5 pages.
Written Opinion of the International Searching Authority dated Jul. 2, 2008, International Application No. PCT/US2007/019544, filed Sep. 7, 2007, 5 pages.
Written Opinion of the International Searching Authority dated Mar. 14, 2008, International Application No. PCT/US2007/19533, filed Sep. 7, 2007, 7 pages.
Written Opinion of the International Searching Authority dated Aug. 27, 2008, International Application No. PCT/US2007/089237, filed Dec. 31, 2007, 15 pages.
Yeon-Joo, O. et al., "Design of a SIP-based Real-time Visitor Conversation and Door Control Architecture using a Home Gateway," Consumer Electronics, 2006, ICCE '06, 2006 Digest of Technical Papers, International Conference, Las Vegas, NV, USA, IEEE, Jan. 7, 2006, pp. 187-188.
Young-Gab Kim et al., A Service Bundle Authentication Mechanism in the OSGI Service Platform, Advanced Information Networking and Applications, 2004, AINA 2004. 18th International Conference on Fukuoka, Japan, Mar. 29-31, 2004, Piscataway, NJ, USA, IEEE, vol. 1, Mar. 29, 2004, pp. 420-425.
U.S. Appl. No. 16/291,856 for Ansari et al., filed Mar. 4, 2019.
U.S. Appl. No. 16/439,501 for Ansari et al., filed Jun. 12, 2019.
U.S. Appl. No. 16/460,148 for Ansari et al., filed Jul. 2, 2019.
U.S. Appl. No. 16/512,876 for Ansari et al., filed Jul. 16, 2019.
U.S. Appl. No. 16/514,803 for Ansari et al., filed Jul. 17, 2019.
U.S. Appl. No. 16/531,914 for Ansari et al., filed Aug. 5, 2019.
U.S. Appl. No. 16/842,518, for Ansari et al. filed Apr. 7, 2020.
U.S. Appl. No. 16/876,946, for Ansari et al., filed May 18, 2020.
U.S. Appl. No. 16/889,347, for Ansari et al., filed Jun. 1, 2020.
U.S. Appl. No. 16/900,487, for Ansari et al., filed Jun. 12, 2020.
"Apple moves to link TV to the computer," TVTechnology, Sep. 18, 2006, 2 pages.
"Apple Releases QuickTime 5 and QuickTime Streaming Server 3 Public Previews," Apple Press Release, Oct. 10, 2000, 3 pages.
"Microsoft Introduces New Interactive Program Guide Solution to Improve Digital Cable Tv Experience," Microsoft, May 6, 2002, 4 pages.
"Microsoft WebTV Networks Announces Pricing for UltimateTV Service," PressPass, Microsoft, Oct. 26, 2000, 2 pages.
"QuickTime 4.0 Plays MP3," Wired, Apr. 14, 1999, 3 pages.
"QuickTime 6.4 User's Guide," Apple Computer, Inc.,2003, 50 pages.
"QuickTime 7 User's Guide," Apple Computer, Inc., 2005, 62 pages.

(56) References Cited

OTHER PUBLICATIONS

"RealNetworks Releases RealPlayer 10, the best Media Player Ever," E-Channel News, Jan. 7, 2004, 4 pages.
"Vulnerability in Windows Media Services Could Allow a Denial of Service," Microsoft Security Bulletin, MS04-008, Mar. 9, 2004, 12 pages.
"Windows Media Services 4.1," Microsoft, 2000, 3 pages.
Akst, D., "The Cutting Edge: Computing/Technology/Innovation: The Hear and Now of Making Sound on the Internet," Los Angeles Times, Jun. 28, 1995, 8 pages.
Apple TV Setup Guide, 2008, 37 pages.
Lane, S., "Disney chief talks up Apple's iTV media hub," AppleInsider, 13 pages.
Mattson, W., "QuickTime 4 ready for prime time," ZDNet, Jun. 9, 1999, 5 pages.
Perez, C., "Microsoft Tv (IPTV) is here," Academy Florida, Jan. 9, 2006, 10 pages.
Sheesley, J., "Add Streaming Media Capability to Your Windows NT Server," TechRepublic, May 13, 2002, 11 pages.
Transcription of Apple Showtime Event 2006—The iTV Introduction (Pt.1) <https://www.youtube.com/watch?v=X_oz3DdLkG4>, including screenshots of Apple devices, GUI's, and menus from video (Nov. 13, 2006), 13 pages.
U.S. Appl. No. 17/000,067 for Ansari et al., filed Aug. 21, 2020.
U.S. Appl. No. 17/019,930 for Ansari et al., filed Sep. 14, 2020.

\* cited by examiner

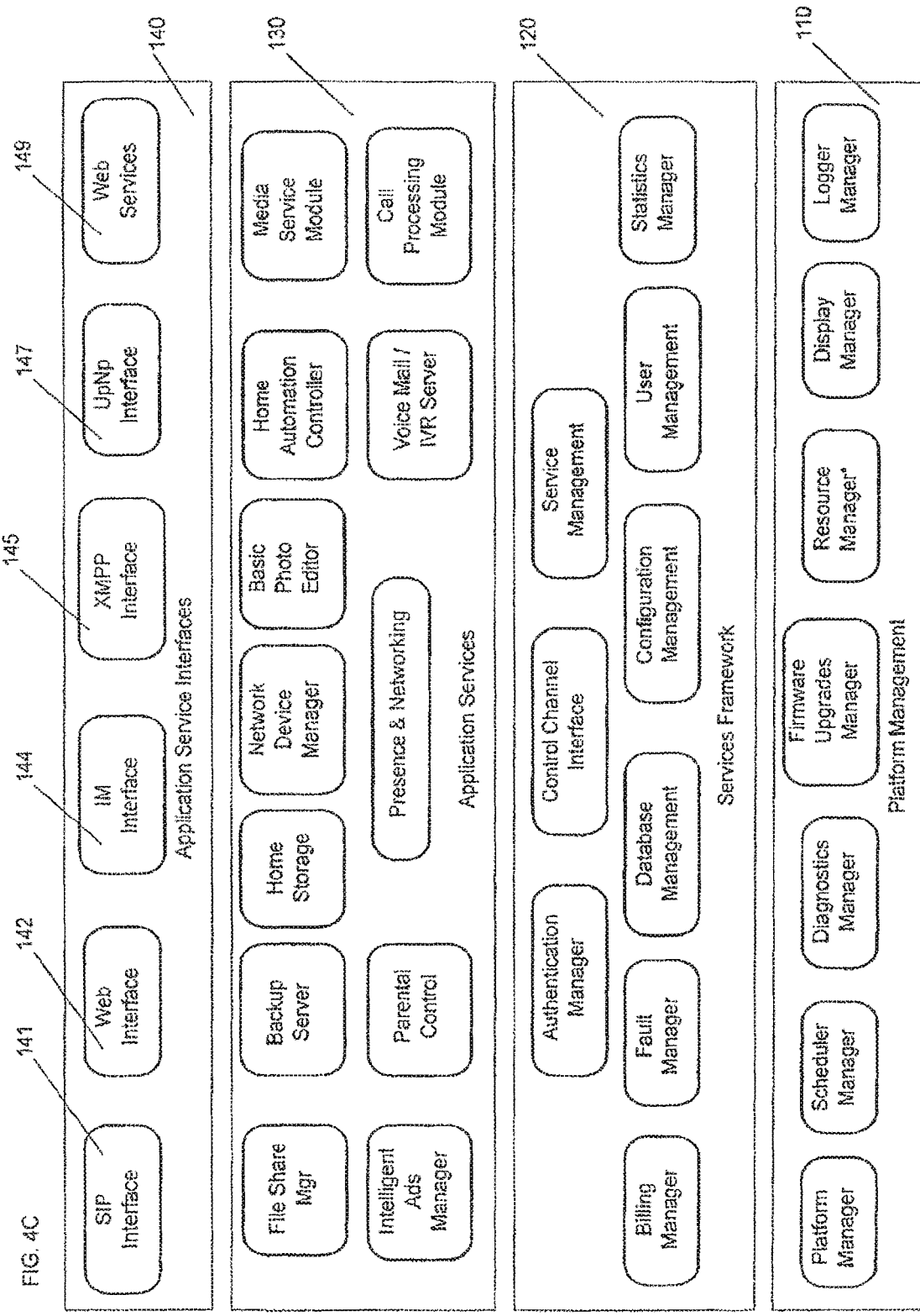

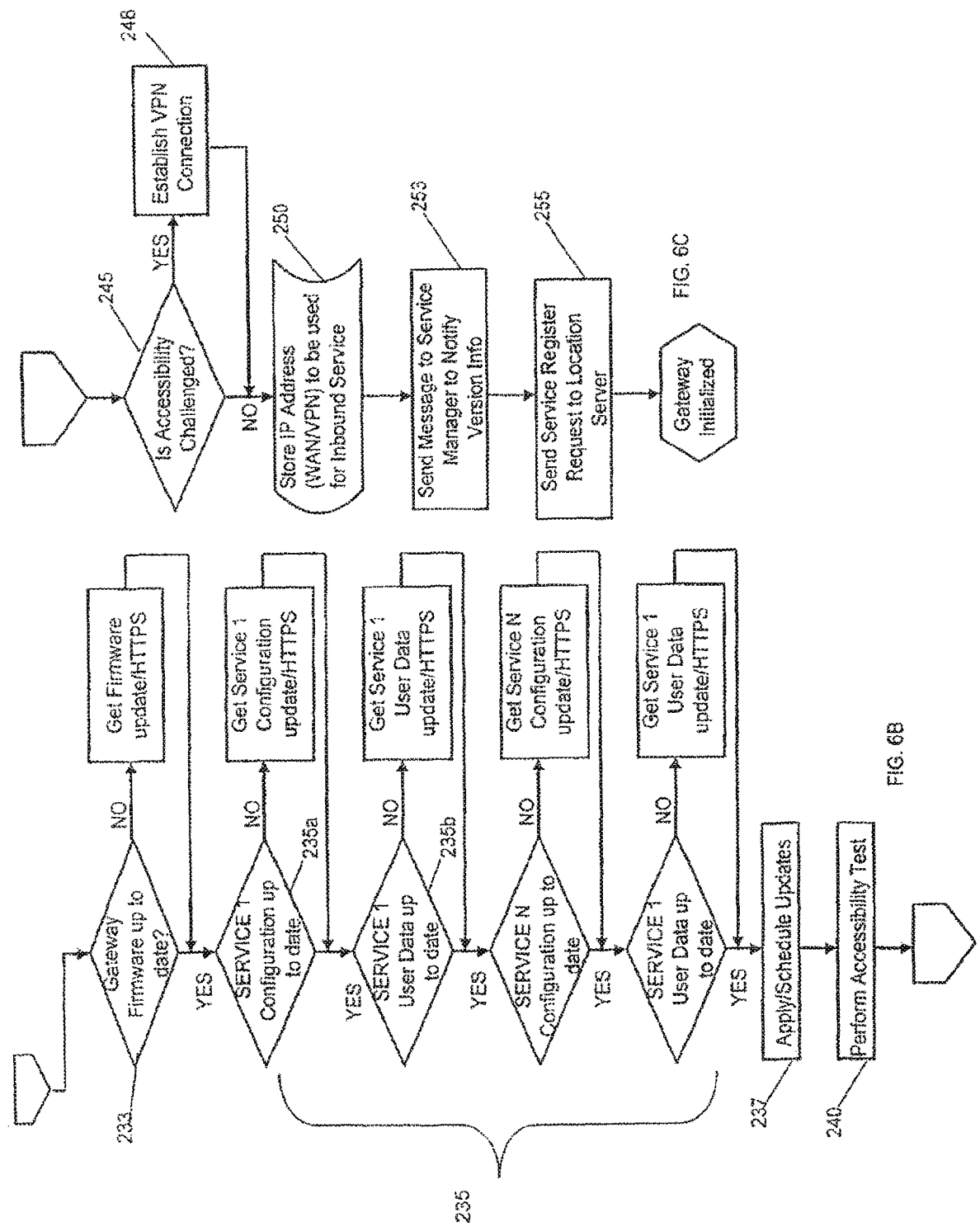

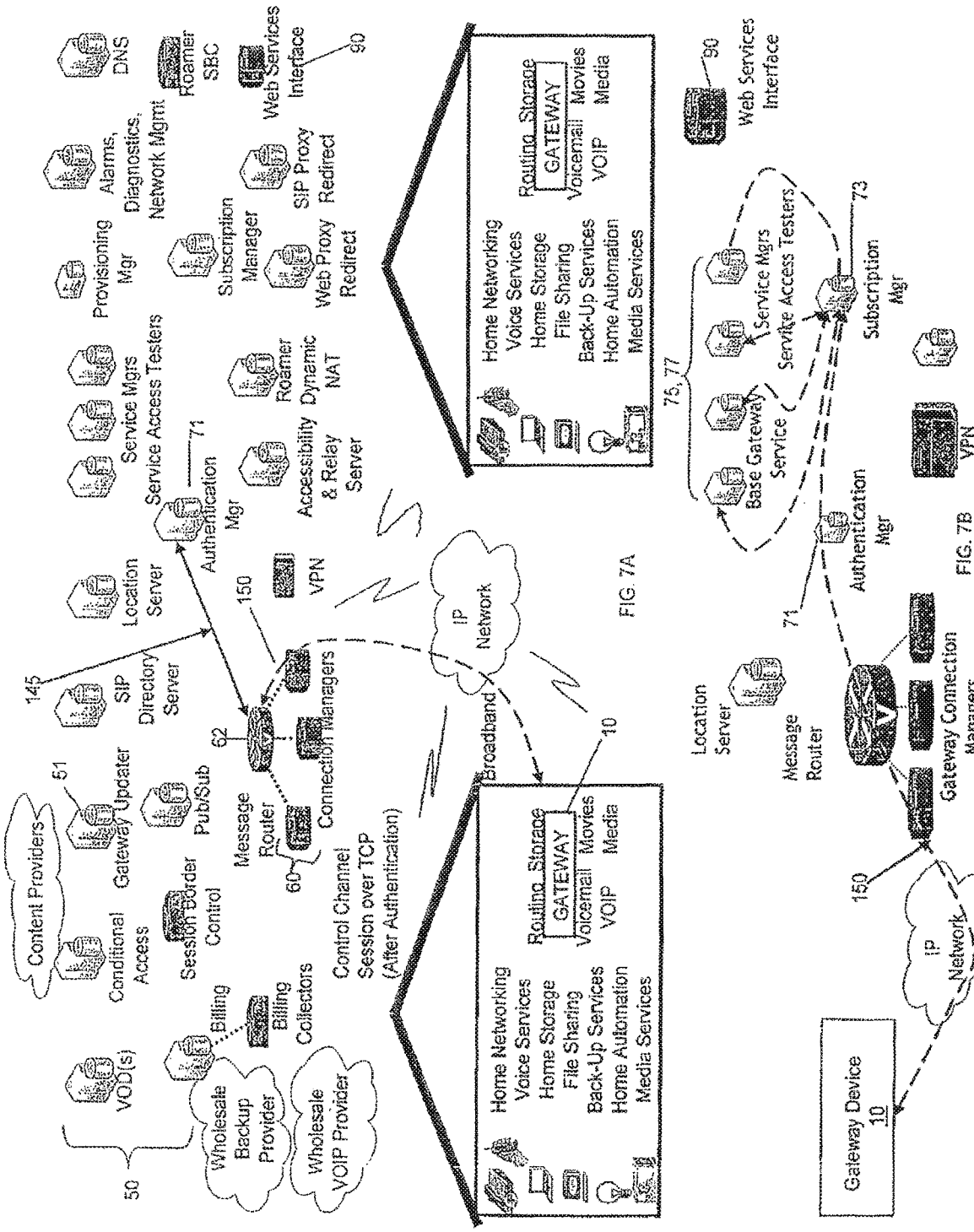

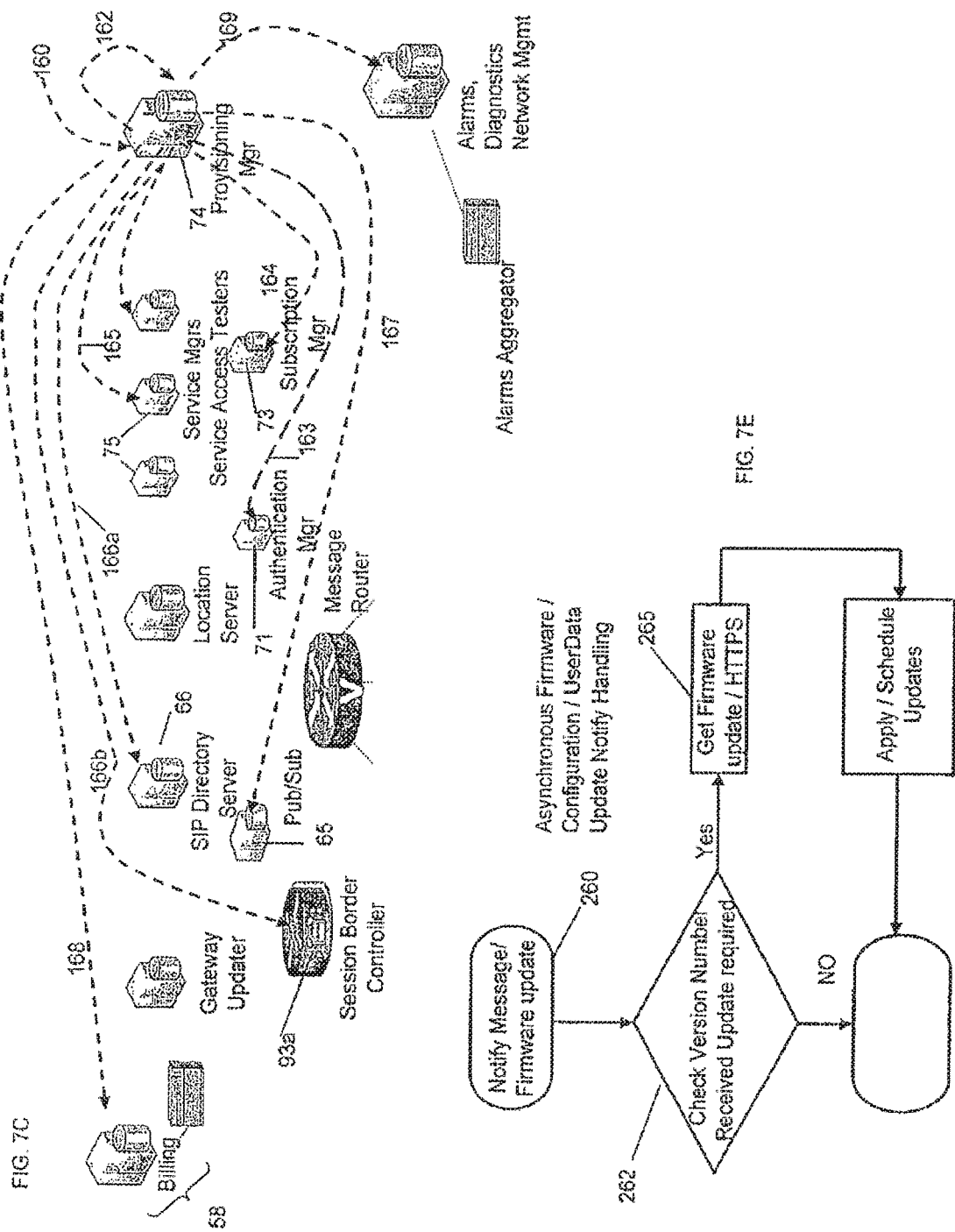

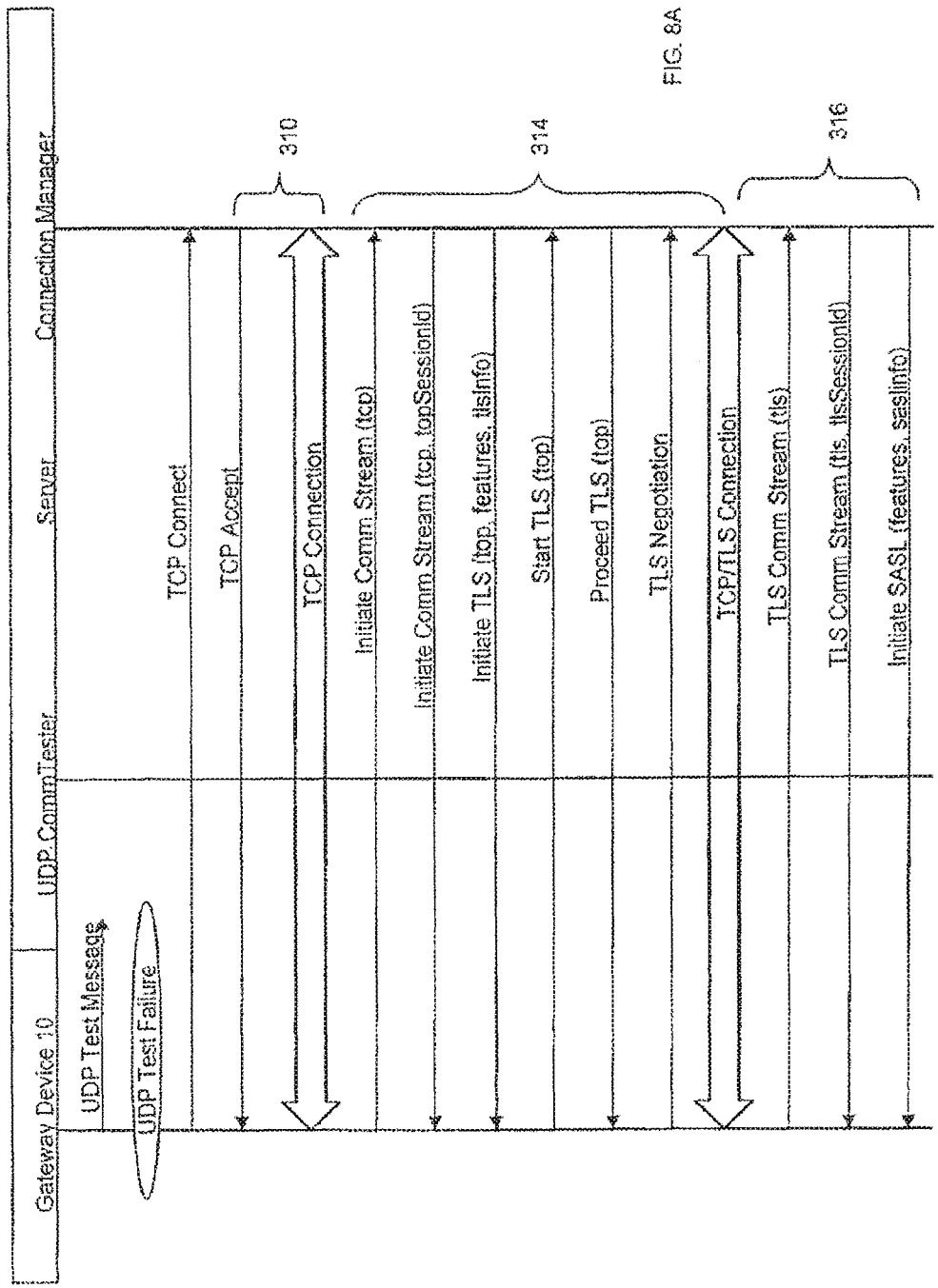

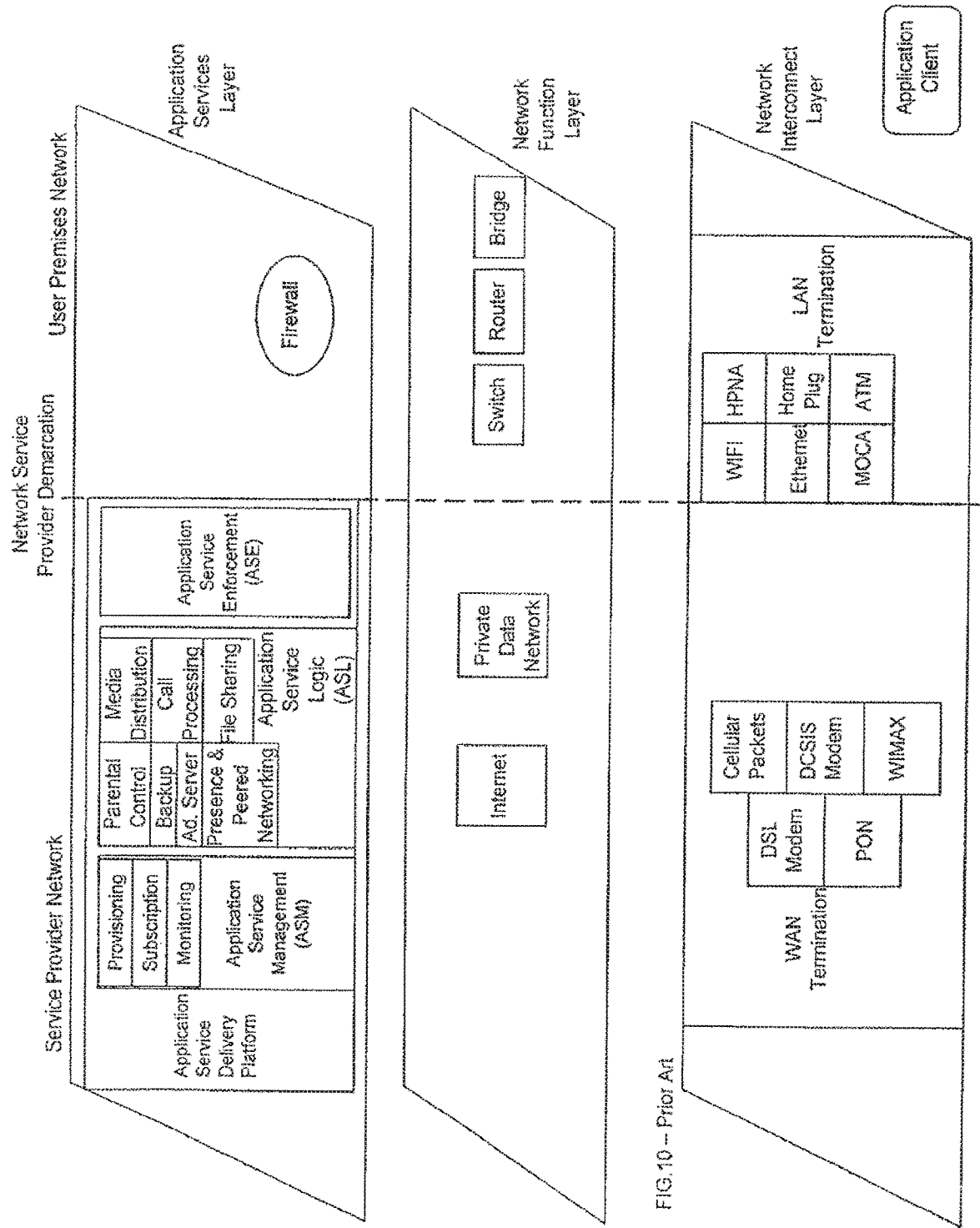
FIG. 10 – Prior Art

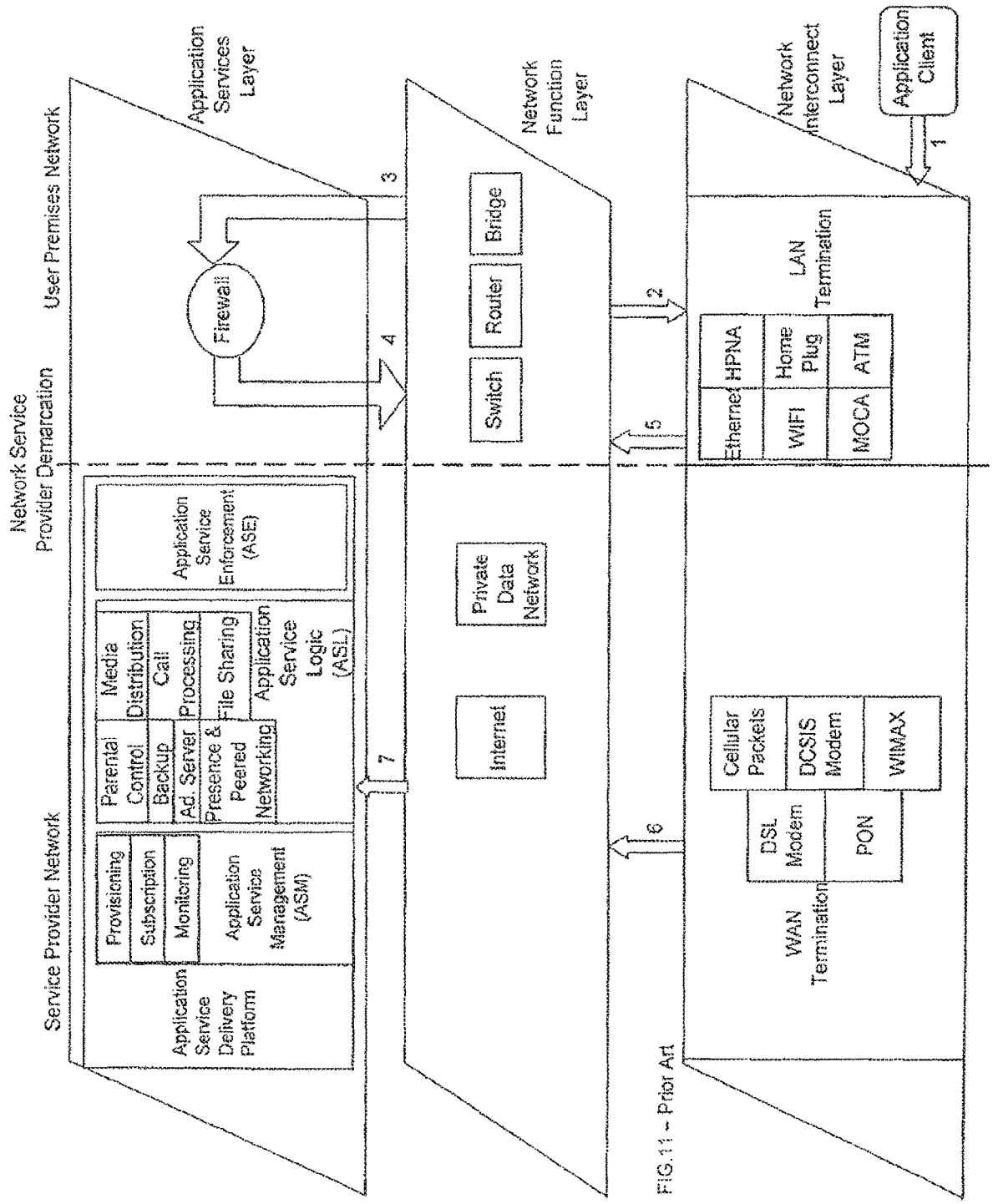
FIG. 11 – Prior Art

SYSTEM AND METHOD FOR PROVIDING NETWORK SUPPORT SERVICES AND PREMISES GATEWAY SUPPORT INFRASTRUCTURE

CROSS-REFERENCE TO RELATED APPLICATIONS

This application is a continuation of U.S. application Ser. No. 15/799,450, filed on Oct. 31, 2017, which is a continuation of U.S. application Ser. No. 15/357,959, filed on Nov. 21, 2016, now U.S. Pat. No. 10,225,096, which is a continuation of U.S. application Ser. No. 15/047,976, filed on Feb. 19, 2016, now U.S. Pat. No. 9,736,028, which is a continuation of U.S. application Ser. No. 13/618,047, filed Sep. 14, 2012, now U.S. Pat. No. 9,270,492, which is a continuation of U.S. application Ser. No. 12/521,758, filed May 3, 2010, now U.S. Pat. No. 8,281,010, which is a U.S. national phase application of International Application No. PCT/US2007/019544, filed Sep. 7, 2007, which claims the benefit of U.S. Provisional Application No. 60/882,865 filed Dec. 29, 2006, and of U.S. Provisional Application No. 60/882,862, filed Dec. 29, 2006, the disclosures of which are incorporated herein by reference.

TECHNICAL FIELD

The present subject matter relates to a service management system, for remotely managing delivery of voice controlled application services by one or more gateway devices at respective user premises, which may also selectively provide secure communications and exchange of information among gateway devices and among endpoint devices associated with the gateway devices.

BACKGROUND

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically challenged user. Furthermore, with respect to Internet based data, most of the content delivery solutions are provided to the digital home networks through availability of the "two-foot" interface (i.e. the PC). It is relatively cumbersome to bring this content to the "ten-foot" interface (e.g. the television).

Thus, a need exists for a technique or devices to simplify the overall management of services and applications available to the digital home or even the small enterprise. Such a technique or devices would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device. Thus, an unmet need exists for a device associated with a user premises that has robust functionality but does not require sophisticated or inordinate attention from the user to manage, provision and utilize them.

In practice, a customer typically subscribes to basic transport services from a network "Service Provider" (e.g. ISP—Internet Service provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 or 3 of the OSI model. While network services and associated devices may operate minimally at those levels, they operate at those levels only to support operations at OSI layers 1, 2 or 3. Many applications, however, involve higher level service logic for applications that view the network transport as a transparent pipe. The current internet applications delivery and management architecture, and many devices or management systems based on it, require a server with robust processing and storage capability to be located at the network operations center, not in the home. For voice over internet protocol (VoIP) type telephone service, for example, the VoIP service provider operates a session initiation protocol (SIP) server or the like, and each user has only client functionality. The network transport layers are transparent to the IP packets containing the voice and related signaling. The SIP server, however, controls the call set-up, tear-down, billing and the like for the voice call services. With such an architecture, the major capabilities and functionalities connected with providing application services from the server throughout the network reside on the server and supporting elements, all of which are located in the network operations center.

It might be helpful to walk through examples of the configuration for application services delivery to a client of an application within a user premises under the typical, current network configuration. FIG. 10 depicts one possible configuration for a client application to access a particular service that is being hosted of served outside of the user premises based on the typical, and currently employed, network application service configuration. We identify two regimes in the overall architecture, the Service Provider Network regime (WAN side), and the User Premises Network regime (LAN side). The association between the Service Provider Network and the User Premises Network is broken down into three layers; Network Interconnect Layer (NI), Network Function Layer (NF), and the Application Services Layer (AS). These layers do not represent physical communication pathways, but are a logical representation of pathways and elements employed in a network-based communication.

The separation between the managed Service Provider Network (WAN side) and the User Premises Network (LAN side) is depicted as the Network Service provider Demarcation. The Network Service Provider Demarcation at the Network Interconnect Layer represents the logical and physical separation between the user premises and the broad-band network. In the present representation of the three functional layers, the Network Service Provider Demarcation is extended into the Services and Application Layer to emphasize the functional barrier at that layer between the Service Provider Network and the User Premises Network, in currently configured networks.

The NI Layer depicts how the connectivity between a User Premises Network and the Public/Service Provider Network is established. On the Service Provider Network side, the Wide Area Network services are terminated onto a WAN termination device with the appropriate interface (e.g. a Broadband internet service such as ADSL would terminate on to a managed ADSL Terminal Adapter). The WAN termination layer adapts the WAN interface into a compatible LAN interface (e.g. Ethernet or WiFi). On the User Premises Network side the LAN Termination interfaces are used to connect to the Local Area Network via a variety of interfaces, such as Ethernet, WiFi, MOCA, etc.

The LAN Termination interfaces and the WAN Termination interface could reside on two separate physical devices or they could reside on one physical device. In either case, on the User Premises Network side, packets or data must flow through the NF Layer between the WAN Termination Interface and the LAN Termination Interface. One or both of these interfaces may reside on a "gateway" device. Gateway and like router devices are currently available for various premises that allow several computers to communicate with one another and to share a broadband Internet connection. These devices function as routers by matching local network addresses and the hostnames of the local computers with the actual networking hardware detected. As gateways, these devices translate local network addresses to those used by the Internet for outgoing communications, and do the opposite translation for incoming packets.

The User Premises NF Layer allows for switching of packets between LAN devices and routing or bridging of packets between the LAN and WAN interfaces. It could physically reside on the same device(s) with the LAN Termination or it could exist at an independent device that could interconnect to the LAN Termination interface via a variety of physical interfaces (e.g. Ethernet, MOCA, etc.). The Service Provider NF Layer provides the Wide Area Network access between the WAN Termination device and the AS Layer where all the applications servers are being hosted. The Internet could be used for this connectivity as could a private packet/cell network (e.g. Cellular packet network, or a private ATM or packet backbone).

The AS Layer represents the functional layer that provides access to applications services by application clients. On the User Premises side, the AS Layer provides a Firewall to protect the application client from application level attacks from the open Internet. On the Service Provider side, the AS Layer encompasses application services such as Parental Control, Backup, and Call Processing. These application services exist on a managed Application Service Delivery Platform (ASD) on a secure network server that can be hosted at a facility that has private and or public data connection paths. The ASD may include three functional modules, namely the Application Service Enforcement (ASE) module, the Application Service Logic (ASL) module, and the Application Service Management (ASM) module.

The ASE module is responsible for enforcing the relevant Application Client privileges to the application services. It gets the policies and permissions of each application client from the ASM module (such as provisioning data and subscription data) and enforces those policies against the requested actions by the client application.

The ASL module executes the application services that the Application Clients request. Such services could be Call Processing, Parental Control, Peered Networking, Backup, etc. The ASL module must interact with the ASM module for monitoring purposes and status information such as Call Data Recording and Billing. It must also interact with the ASE module to provide access to the client applications that have passed the policy enforcement procedures.

The ASM module, as described above, provides the necessary data to the ASE and ASL modules for them to carry out their respective functions. It also oversees the overall integration and communication among all the modules and the services that are managed by the ASM. The ASM also manages the overall security and integrity of the ASD.

All ASD modules are in constant communication with each other, preferably through secure connections. The inter-module communication may be managed by the ASM, or may be independent of a central management function. Note that the ASE, ASL and ASM modules are only examples of functions that may be logically bundled; other bundles, and other means of bundling these functions, are possible.

FIG. 11 depicts a logical flow of how a specific Application Client residing at a user premises could interact with an Application Service that is being managed in the typical network configuration. Traditionally, as depicted in this example, an Application Client (e.g. Telephony) that needs to connect to an Application Service (e.g. call processing) must first connect to the Local Area Network termination interface (1). Depending on the specific deployment, a switching function, routing function or bridging function is used to establish the connection path between the application client (2) and the Firewall service (3). The Firewall Service works in conjunction with the router function (4) to permit access to the Wide Area Network interface (5) and maintain a level of security to the Application Client. The firewall service in this example is not aware of either the type of application client or the specific application service that is being targeted. There is no feedback mechanism between the Application Service Delivery Platform and the Firewall function. Once connectivity to the WAN termination interface is established, routing mechanisms are used to establish a connection through the Service Provider Network. Function Layer (6) to the Application Service Layer (7). At the Application Service Layer, the client application goes through application validation procedures and privilege and permission checks by the ASE prior to allowing the application client to connect to the desired application service.

In the logical hierarchy, such as shown in FIGS. 10 and 11, a home gateway device may implement the NI layer functions and the user premises side NF layer functions. The firewall functionality may reside in the gateway or in one or more other elements on the premises network. For example, many PCs internally implement firewalls, e.g. in close association with the client programming of the endpoint device. As can be seen by the illustrations in FIG. 11, however, even with a home gateway deployment for a premises network, the application services functionality still requires the support and service logic to reside on a server in the network. That is, for service provisioning, service management and upgrades, remote diagnostics, for a digital endpoint device such as a PC or SIP phone, the home premises still must rely on the application service logic executed by the service providers in their server networks, typically according to proprietary platforms. Moreover, many other core services, e.g. file storage, media content access and delivery, are offloaded to other 3rd-party service providers that provide service logic and support applications at their network server devices.

With the paradigm discussed above relative to FIGS. 10 and 11, it is currently the case that many of the application service providers also find it difficult to provide and support new emerging technologies at the home. That is, service providers are challenged to select a platform that can evolve with their applications. With existing service architectures, the launch of new services compounds complexity to the core network, adding to both capital and operating expenditures.

Thus, as new services come to the fold, often with the requirement of new equipment, e.g. integrated access devices (IADs) for VoIP and set-top boxes for streaming video, the management of the customer premises equipment (both hardware and software) complicates customer support requirements. Managing the home network environment can be an inhibitor to the adoption of new services, both from the user perspective and from the perspective of management by the service providers.

A need exists for a new paradigm, with improved convenience for the user and easier management for the application service provider. In that regard, it would be desirable to provide an arrangement in which one or more aspects of application service(s) facilitated by gateway devices within the user premises are centrally managed.

SUMMARY

The disclosure herein addresses one or more of the issues outlined above from a system perspective. The disclosure encompasses a service management system as well as combinations of such a system with one or more gateway devices at user premises.

For example, a service management system is disclosed for managing voice controlled services through gateway devices at respective user premises. The gateway devices provide gateway connectivity to a wide area network and at least some server functionality for service delivery for one or more digital endpoint client devices associated with the gateway device, one or more of which may be at respective customer premises. Gateway devices communicate with endpoint devices within respective premises over networks within the customer premises. The service management system can include a router for connection to the wide area network for communications with the gateway devices, and one or more computer platforms coupled to the router. The platform can also provide an authentication manager for authenticating each of the gateway devices and controlling the connection manager to establish a signaling communication link through the wide area network with each of the gateway devices upon successful authentication of each respective gateway device. The computer platform can also be configured for implementing a service manager for distributing service specific configuration data to logic implementing the server functionality in authenticated gateway devices, via the wide area network, responsive to the subscription manager. An application gateway can be configured to execute the voice controlled application services provided from the application service provider, wherein the application gateway can execute the application services at the user premises independent of application services executing on the application service provider's network, and wherein upon receiving a request to execute the application service on the application gateway at the user premises, the service manager can communicate with the subscription manager to verify that the request conforms with policy and usage rules associated with the application services in order to authorize execution of the application services on the application gateway. A graphical user interface rendered on a display can be associated with at least one of the at least one computer platform, gateway devices and one or more endpoint devices, for enabling voice controlled management and control of application services executed by the application gateway on at least one of the computer platform and the one or more endpoint devices.

Application services can include a service application executed at the application gateway that enables at least one of: home automation of connected devices within the user premises; home security of the user premises via connected devices within the user premises; management of video cameras and associated video data captured within the user premises; management of sensors located at or within the user premises; management of monitors at or within the user premises; home automation of connected devices within the user premises; management, including monitoring, of medical devices within the user premises; management of wired and wireless connections to endpoint devices at or within the user premises; management of digital rights utilized by endpoint devices at or within the user premises; management of context sensitive advertising that is available for rendering on endpoint devices at or within the user premises.

In the disclosed example, the authentication manager can confirm authentication of the respective gateway device and of application services provided or executed by each respective gateway device, from time to time. The authentication manager can control the connection manager to maintain a logical session for the signaling communication link through the wide area network with each respective gateway device as long as the authentication manager continues to confirm the authentication of the respective gateway device. Typically, this signaling link remains logically on through the wide area network, so long as the gateway device is powered-on and can be authenticated by the service management system.

The signaling communications between the gateway devices and the service management center may utilize a variety of different types of protocols. In the examples, the system is configured to communicate via the signaling communication link through the wide area network with each respective gateway device, using a peer and presence messaging protocol.

In an example, the computer platform comprises a plurality of computers coupled to the router, to arrange the system to form a service management center network. Such a network may implement a variety of additional functionalities. For example, the service management center network can include a gateway device updater implemented on the at least one computer platform. The updater can be configured for downloading service logic modules for implementing voice controlled application services and/or service features to the gateway devices, via the wide area network, for enabling voice controlled application services and/or service features identified by the service manager at respective gateway devices. The service management center network can also include a location server functionality, responsive to the service manager, for maintaining information as to accessibility of authenticated gateway devices for enabling peer-to-peer communications among gateway devices via the wide area network. Another functionality that may be provided is an accessibility test server. Such a server communicates via signaling communication link through the wide area network with each of the gateway devices, to determine nature of accessibility of each gateway device through the wide area network. The service management center network can also include a Session Initiation Protocol (SIP) proxy server functionality and a Session Border Controller functionality, configured to support SIP based voice over Internet protocol (VoIP) telephone services through the wide area network for endpoint devices communicating through a plurality of the gateway devices.

The disclosure also encompasses systems that can include both a service management center and one or more of the gateway devices.

In a first example, such a disclosed system can provide managed services for a plurality of endpoint devices associated with a premises having a local area network, and the system can include a gateway device located at the premises coupled for communication with at least one of the endpoint devices which is located at the premises, via the local area network. The gateway device can also be coupled for communication with a wide area network outside the premises. The gateway device can be operable to deliver one or more application services to the plurality of endpoint devices. The gateway device can include one or more service logic modules for causing the gateway device to provide the one or more application services respectively, and configuration data for configuring the one or more service logic modules to enable the gateway device to deliver the one or more application services. The service logic modules and the configuration data can be logically positioned on the user premises side of a logical Network Service Provider Demarcation, between the wide area network and the user premises. Also, the gateway device can be further operable to provide interoperability among two or more of the endpoint devices. The service management system can be coupled to the wide area network for communication with the gateway device. This can enable the service management system to remotely manage the delivery of the one or more voice controlled application services by the gateway device. The service management system can selectively activate or deactivate one or more of the service logic modules in the gateway device.

As noted, the disclosure also encompasses a system having a number of the gateway devices. In such an arrangement, the service management system can be further operable to selectively provide secure communications and exchange of information among the gateway devices and among the endpoint devices associated therewith.

The detailed description below also discloses examples of implementations of the gateway devices. For example, a gateway device can include a first interface for enabling bi-directional communications within the premises via the local area network, with one or more of the endpoint devices. A second interface enables bi-directional communications for the one or more endpoint devices via the wide area network, and for enabling at least some bi-directional communications with the service management system via the wide area network. The gateway device can include a processor coupled to the interfaces and storage coupled to the processor, for storing programming for the processor including the one or more service logic modules and for storing the configuration data.

In one arrangement, for each voice controlled application service, processor execution of the programming provides a number of functions in relation to a respective service for one or more endpoint devices. Examples of such functions can include application server communication with a client functionality of one or more endpoint devices, for the respective service, communicated on top of network layer communications of one or both of the interfaces. The program implemented gateway functions can also include enforcement regarding authorization, authentication, configuration, or use of the respective service via the one or more endpoint devices. The voice controlled application service can be managed based upon the communications with the service management center via the wide area network through the second interface.

A specific example of the software architecture for the gateway devices utilizes a layered approach. Such an architecture can include the service logic modules, which provide logic for the application services. The programming can further include logic for interfaces for the application services, logic for a services framework, and logic for platform management. The interaction and interoperability of the application service interfaces logic, the application services logic, the services framework logic, and the platform management logic can be managed responsive to the communications with the service management center via the wide area network through the second interface.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A-4D depict the software and hardware architectures of the multi-services applications gateway device.

FIGS. 6A-6C illustrate aspects of an initialization technique for establishing a gateway device's connection to and enabling communication with the service management center network.

FIGS. 7A-7F depict more detailed interactions for functions and services to illustrate the core network elements of the service management center.

FIGS. 8A-8E depict exemplary call flow diagrams detailing TCP control channel setup, subscription and software updates regarding provisioning for a gateway device.

FIG. 10 is a layered logical block diagram of one possible configuration for service delivery to a client of an application within a user premises based on a typical current network architecture.

FIG. 11 is similar to FIG. 10, but overlaid with arrows to show a sample flow of logical steps taken by an Application Client to access a specific managed Application Services in the typical current network configuration.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein move application service logic, formerly resident in a network node, into a gateway device in the customer premises. The gateway device is implemented in such a manner as to offer its user many of the applications services, such as were previously offered from network side servers, from the user premises. As further described below, these application services comprise, by way of example, programming to simplify support services in the digital home including one or more of: media delivery, content management, access control and use tracking, file sharing, and protection and back-up services of both Internet/Web-generated digital media content and user generated digital media content. The novel gateway device is programmed to simplify various aspects of managing the emerging home/business digital networks including the myriad of interconnected digital endpoint devices associated with the gateway device. It is important to note that the endpoint devices need not reside within, or be located at, the premises to maintain their association with the gateway device.

Therefore, although based on a Client-Server architecture, the exemplary gateway device and service management center move substantial functions performed by the typical network server into the user premises by incorporating those functions into the gateway device, but in a way that allows for the server functionality to be externally managed by the service management center from the network side, which may be operated by a third-party service provider. In this novel architecture, both the server functionality and the application services, which can be voice controlled, offered via the gateway device may be managed by the service management center. Moreover, the server function residing in the gateway device is not only located in the premises but it now resides logically on the premises side of the Network Service Provider demarcation.

The gateway device and the system architecture effectively place a set of application services on a tightly coupled (e.g. always-on or always-available basis), secure hardware platform that is externally managed. The gateway device comprises application services programming, and associated hardware, that is positioned on the user premises side of the Network Service Provider Demarcation, which is configured to be managed by an external service management center.

Figure 1:
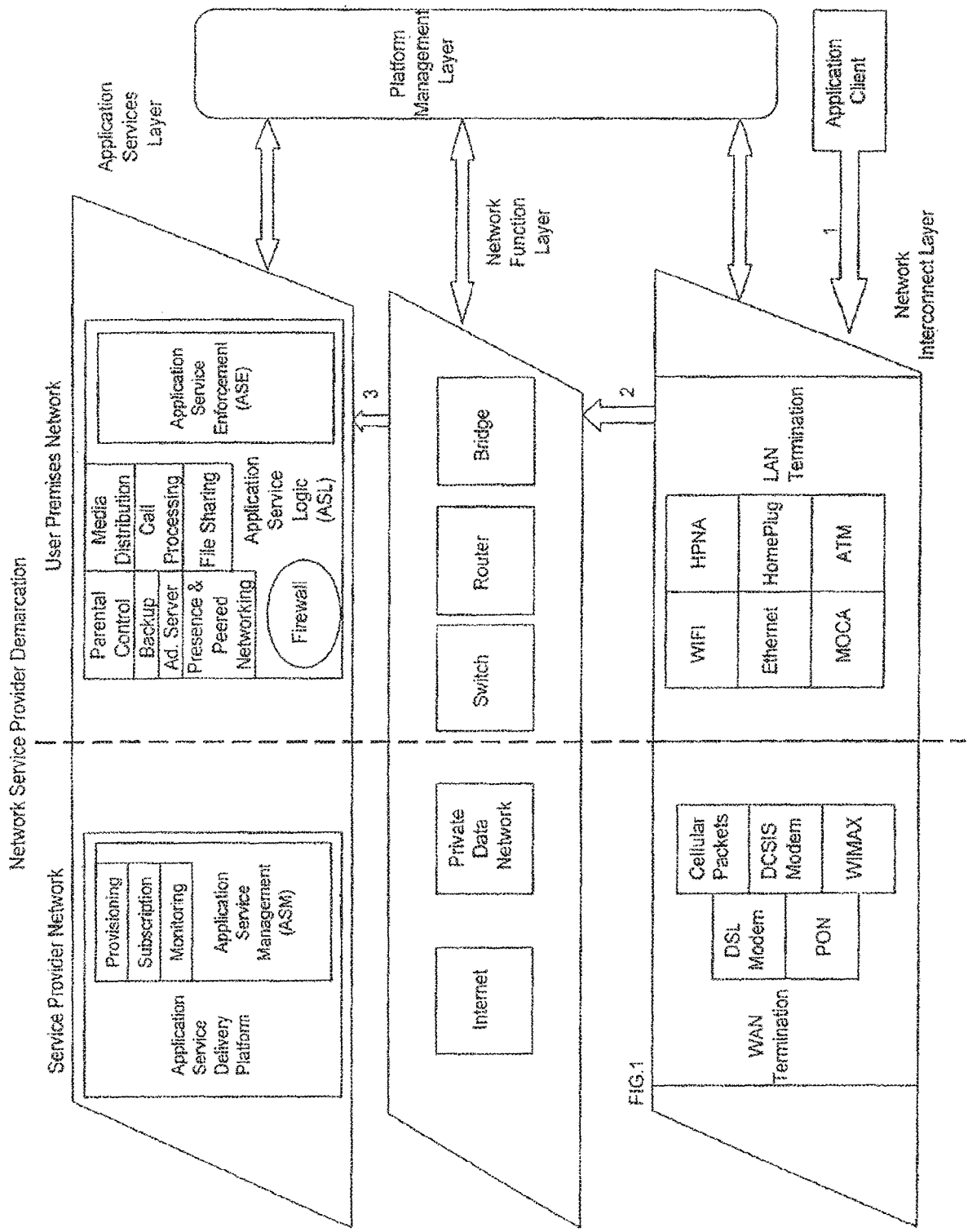
FIG. 1 is a layered logical block diagram with arrows representing steps of a sample logical flow, for an application client to access a specific managed application service, in a gateway device-service management center type network configuration.

Reference now is made in detail to the examples illustrated in the accompanying drawings and discussed below. FIG. 1 is a high-level diagram of the architecture of the gateway-service management center network as disclosed herein, as well as the logical flow of how a specific Application Client residing at a User Premises could interact with an Application Service in a gateway device that is being managed in the gateway-service management center network configuration. Heretofore, as described above, many application services that form part of the Application Service Delivery Platform were logically positioned at the AS Layer but on the network side of the Network Service Provider Demarcation. FIG. 1 shows that, in the novel architecture, many of these application services that were previously offered from network-side servers have now been moved across the Network Service Provider Demarcation and now logically reside at the AS Layer in the User Premises Network, i.e., on the hardware components located in the user premises, such as, by example, a gateway device. In particular, the programming that implements application services is logically positioned on the user premises side of the Network Service Provider Demarcation. The application service on the user premises side that enforces authorization, authentication, configuration, or use of the respective service via an endpoint device is logically depicted in FIG. 1 as the ASE module in the AS Layer of the User Premises Network. The ASE module may also communicate via the wide area network with the ASM logic residing in the service management center.

FIG. 1 depicts an approach in which the ASL and the ASE functions have moved to the User Premises side (compare to FIGS. 10 and 11 discussed above). As discussed more below, the ASL and the ASE functions are implemented as high-level server type logic within a home gateway device at a user premises. Other elements shown in FIG. 1 that may reside in the user premises gateway device include the user-premises-side network function or NF (switch, router or bridge) and the LAN termination for communication with the endpoint devices implementing the application client functions. Thus, with reference to FIG. 1, the first interface, as described above, for enabling bi-directional network layer communications on the user's side of the premises with one or more of the associated endpoint devices resides at the NI Layer and provides the LAN Termination referenced therein. FIG. 1 also depicts the WAN termination providing connectivity to the wide area network (network-side NF—Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 1, the core of the logical capacities of the service management center resides on the Service Provider Network, and is depicted as the Application Service Management (ASM) portion of the Application Service Delivery Platform in the AS Layer. The ASM function is implemented in the service management center, which is external to the user premises, and, perforce, on the network side of the demarcation line. The ASL and ASE functions maintain logical connectivity or interaction with the Application Service Management (ASM) function in the service management center, typically via communication through a wide area network. This logical connectivity is established through an always-on (or on an as needed, periodic basis), secure communication channel between the User Premises AS Layer (ASL and ASE) and the Service Provider AS Layer (ASM) at the service management center. The service management center and the communications of the center with one or more of the gateway devices provides an infrastructure support and/or management of the application services offered to endpoint devices and their users by the logic implemented in the gateway device(s). Effectively, the ASD, considered in its entirety, extends all the way to the User Premises and traverses the Network and Network Service Provider Demarcation. The secure communications channel is established through the NF Layer and the NI layer.

The examples discussed herein also introduce a logical platform management layer to the user premises-side, which allows for inter-layer allocation of local resources. This function guarantees access between the Application Service Logic function on the user premises network and the applications service management function in the service management center by assuring that the local user premises hardware and software modules are functioning at a required state (CPU and memory usage, bandwidth usage, QoS settings, etc.) in order for the ASL to have the necessary resources to establish its required communications path to the ASM.

The platform manager is also responsible for implementing that part of the managed application services to be performed by the gateway device. In that regard, the platform manager secures and manages the overall hardware platform, given that in this scenario, the NF layer and the AS layer reside on one hardware platform. This secure hardware platform provides a robust and secure operating environment for the AS Layer. So, to establish a secure and robust hardware operating environment, the platform manager must interface with all the layers above it and allow for bi-directional management information flow among all of the functions. For example, if the Application Client is a telephony application and the desired application is call processing, the application must first connect to the LAN termination interface (1). Then a connection must be established to the AS Layer through the NF layer (2). At this point the platform manager determines if there are sufficient resources available for this to take place on the routing and switching modules and if there is not sufficient resources on either the LAN Termination interface or the NF layer functions, it would take the necessary corrective measure to free up the required resources so that the application can execute properly (e.g. prioritize packets, throttle bandwidth, attempt to reduce noise on an RF interface, or free up time slices on a TDMA interface such as MoCA). Once that is done, the connection is established to the AS Layer (3), where the ASE and ASL, having been updated by the ASM in the network, respond instantaneously to the Application Client, completing the service request.

Application services represent functionalities, implemented in the higher layer(s) of the protocol or logical stack above the network layer(s) that may extend up to the top application layer (layer 7 of the OSI model). An application service, for example, provides application server communication with a client functionality of one or more endpoint devices, for the respective service, communicated on top of network layer communications through the interfaces. In the examples, the services are provided on a subscription service basis to users at the premises. Hence, the application service logic provides enforcement regarding authorization, authentication, configuration, and/or use of the respective service via the endpoint devices. The application service includes service and feature functions, implemented and controlled by the application service logic. Management of the application service is based on communications with the service management center via the wide area network.

The illustrated architecture of the gateway device-service management center network enables other features and capabilities that have not previously been available to the user. For instance, peer-to-peer application communication between or among gateways is possible without the need to go through, or utilize resources at, an external service management center. Communications through the service management center are also possible. In addition, given the considerable functionality present in the gateway device, and its ability to manage the various endpoint devices associated with it (as explained below), the user interface with the gateway can be presented and utilized on the home TV. Additionally, information from other endpoint devices, such as the PC, network sources (such as an RSS (Really Simple Syndication) service), may now be overlaid on the TV screen so that, for example, PC messages, or weather information, can be viewed on the TV screen, and the functionality of the PC (or other home networked endpoint devices) can be accessed from the TV screen.

Figure 2:
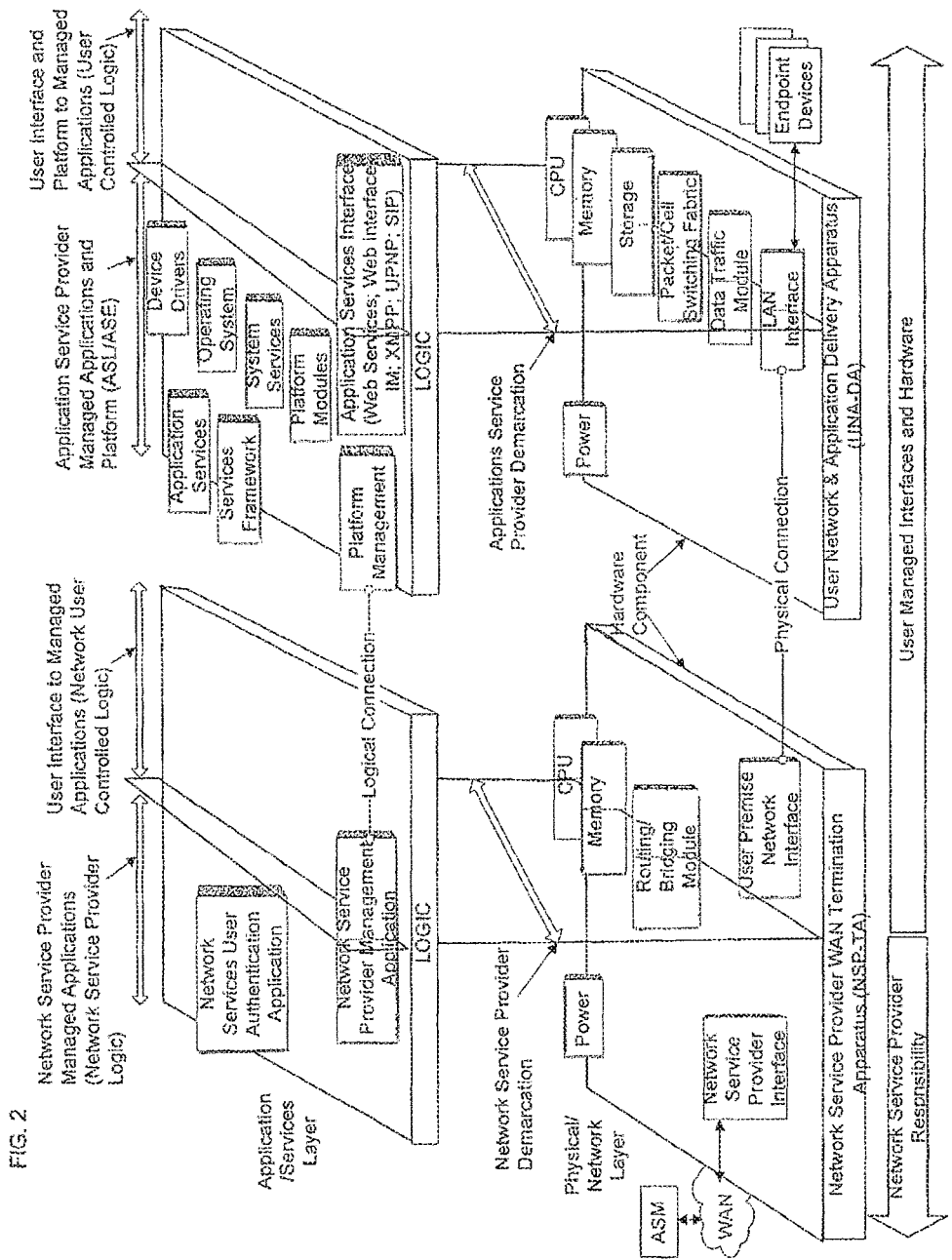
FIG. 2 depicts the managed application services delivery platform.

FIG. 2 depicts, at the Physical/Network layer shown therein, an example of user premises hardware components required for delivering data services (i.e. Internet connectivity) along with a separate, non-integrated managed hardware used in delivering a set of managed application services (i.e. IP telephony). The Network Service Provider Wide Area Network Termination Apparatus (NSP-TA) allows for a typical termination of Wide Area Network Services, such as DSL, Cable, Fiber, etc, by a network services provider. The NSP-TA provides the WAN Termination in the NI Layer (FIG. 1). The NSP-TA may be an existing user-premises device, provided by the carrier supplying network services to the premises. FIG. 2 also depicts the Network Service Provider Demarcation at the hardware level.

If configured as a standalone device, the NSP-TA device is required to have its own CPU, Memory, physical interfaces and logic control. In order for Network Service Providers to deliver managed services, they typically require a management element controlled by the CPU on the NSP-TA. To depict these logical elements residing on the hardware components, FIG. 2 includes an Application/Services Layer above the hardware layer. This layer corresponds to the AS Layer of FIG. 1, but without reference to any logical elements residing at the network services provider. The management element, represented by the Network Service Provider Managed Application, allows the network service provider to determine the status of the network hardware device and interfaces as well as maintain a certain degree of security enforcement at the customer premises. As noted, the network service functionality is at the NI and NF Layers and generally does not extend to the AS Layer(s) beyond basic authentication authorization and state management. As with the hardware components, the logical elements also have a Network Service Provider Demarcation as shown in FIG. 2. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application/Services Layer. Within this interface resides programming and logic available to users other than the network service provider referred to as the Network User Controlled Logic. The Network. User Controlled Logic, which is depicted at the Application/Services Layer in FIG. 2, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in depth visibility or significant responsibility beyond the Network Service Provider Demarcation.

The User Network and Application Delivery Apparatus (UNA-DA), shown on the right hand side of FIG. 2, is a separate managed gateway device that a managed service provider (which may be different than the network service provider) would control in delivering a set of application services to the user premises. This device is required to have its own dedicated CPU, memory, logic control, as well as its own dedicated set of interfaces. The UNA-DA includes one or more Network Interfaces providing connectivity to the NSP-TA as well as to user premises endpoint devices. The interfaces provide the LAN Termination functionality at the NI Layer (FIG. 1). One skilled in the art will readily recognize, however, that the physical connection that connects the UNA-DA to the NSP-TA also provides connectivity for the UNA-DA to the public (WAN side) network, and is the means by which the UNA-DA accesses the public network. The end point devices connected to the LAN Interface are on the private (LAN) side of that interface. The UNA-DA also includes a switch, router or bridge for the NF Layer.

Programming elements of the UNA-DA are depicted at the Application/Services Layer of the UNA-DA. Certain logical elements, depicted as the Application Service Provider Managed Applications and Platform in FIG. 2, on which resides, inter alia, the programming corresponding to the ASL and ASE of FIG. 1, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables managed application service provider to control and manage the hardware elements on the UNA-DA to ensure proper use and allocation of the UNA-DA's processing, memory, storage, and bandwidth, to monitor local hardware security and generate needed alarms or protection sequences, and to prioritize applications based on a set of established policies. The user would have control over specific parameters of the UNA-DA through the User Interface and Platform to Managed Applications (User Controlled Logic) shown in FIG. 2. These parameters allow the user to control the local behavior of the interfaces and to configure the specific applications to accommodate the user network as configured by the user and to implement the user preferences for those applications.

To identify the separation of, and distinguish between, the programming and hardware components subject to control by the managed service provider and those subject to control by the user premises, FIG. 2 identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to Communicate with each other. Optionally the two sub-systems can be combined together, either physically in one hardware device, or logically as two separate hardware devices, but having one user managed interface.

The two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform (compare to above-discussed FIG. 12). This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 2. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

Figure 3:
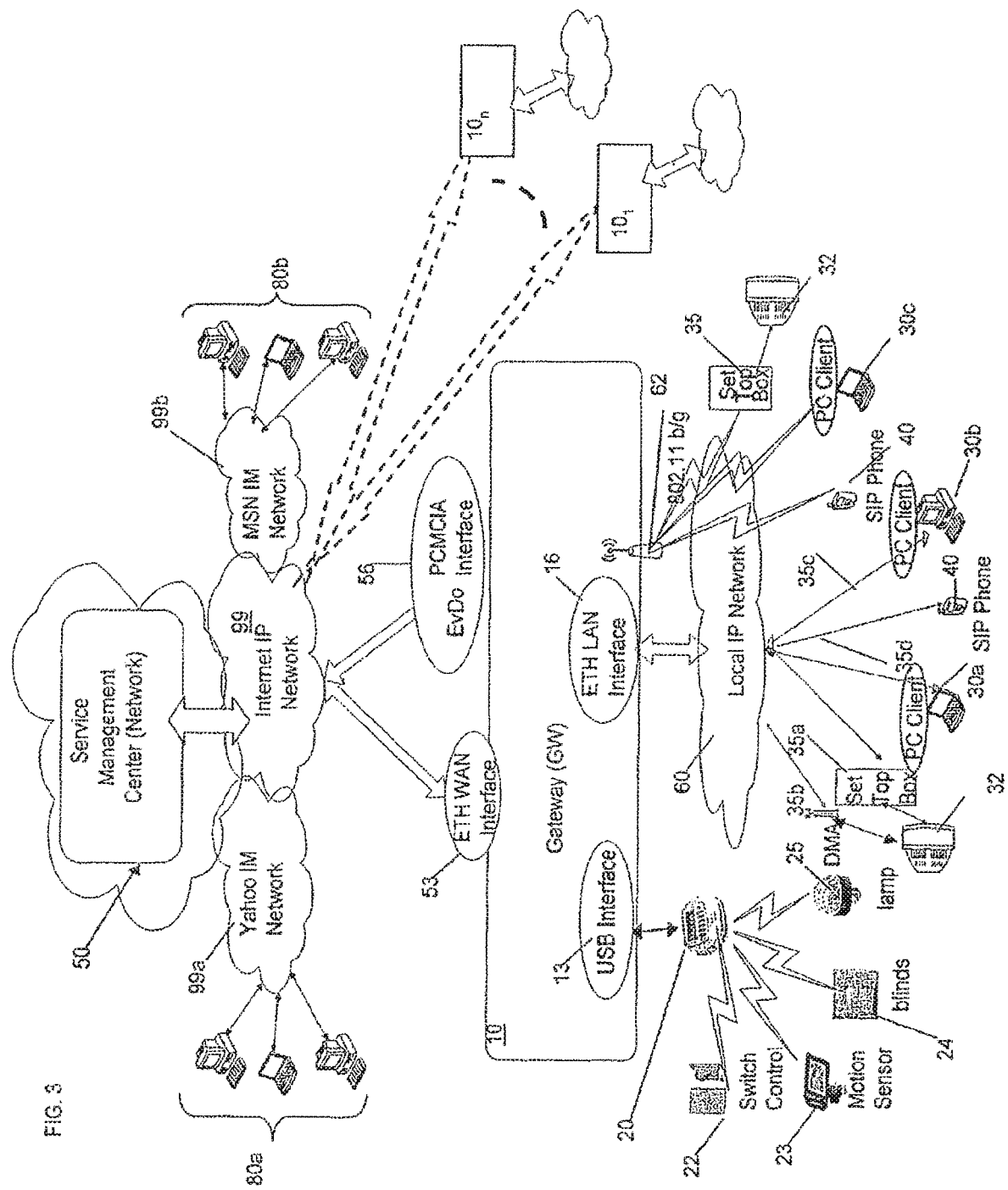
FIG. 3 is a network diagram, depicting a gateway device, endpoint devices at the user premises, one or more wide area networks and a service management center.

It may be helpful now to consider more detailed examples of the gateway device-service management center network. Gateway Device and Service Management Center Elements—Overview Those skilled in the art will recognize that functions of the service management center, which reside in the Application Service Management node on the Service Provider Network, as depicted in FIG. 1, may be implemented in a variety of different ways, on one or more computer hardware platforms connected to the gateway devices via a wide area network. FIG. 3 depicts an example wherein the implementation is on Internet or other wide area IP network 99. The example uses a distributed processing approach, in which the elements/platforms implementing the service management center are interconnected for communication and for wide area communication, and in this way, those elements form a network 50 for implementing the service management center.

As shown in FIG. 3, the service management center network, through the logical capabilities earlier depicted in FIG. 1 as the ASM module of the ASD Platform at the AS Layer, manages application services for a number of gateway devices 10, 10.sub.1 . . . 10.sub.n located at various users' premises. These application services, shown as ASL and ASE in FIG. 1, implement their functionality within the Application Services Layer (FIG. 1), through programming that at least in part, within, the Application Service Provider Managed Applications and Platform of the UNA-DA (FIG. 2). As shown in FIG. 3, secure connectivity to the service management center network 50 is provided, in one embodiment, via a WAN Termination interface, such as Ethernet WAN 53 over a broadband connection via the public Internet 99, or, for example, via a wireless EvDO (Evolution Data Optimized) Internet data interface embodied as a PCMCIA (personal computer memory) wireless card 56. When the WAN Termination interface 53 is used, for example, it may provide connectivity to a broadband modem serving as the NSP-TA of FIG. 2, either as a separate unit or on a board included within the gateway device 10. If the wireless WAN interface is used, there may be no physical NSP-TA device, and the logic of the gateway device would implement functions of the NSP-TA as well.

As will be described in greater detail herein below, the service management center 50 generally provides a communications and processing infrastructure for supporting the variety of application services and related communications residing at the gateway devices 10, 10.sub.1 . . . 10.sub.n. In an exemplary embodiment, this infrastructure may be configured to provide a secure environment and may be IP-based. Preferably, this support architecture is designed for high availability, redundancy, and cost-effective scaling.

The secure platform for building and providing multiple application services for digital endpoints associated with a gateway device requires connectivity between the gateway device 10 and each of a user's devices (referred interchangeably herein as "endpoint devices" or "digital endpoint devices"). This connectivity may be provided by implementation of one or more USB ports (interfaces) 13, a wired Local Area Network connection such as provided by an Ethernet local area network (LAN) interface 16, or, a wireless network interface via a WiFi LAN access point 62 provided, for example, in accordance with the I.E.E.E. 802.11b/g/n wireless or wireless network communications standard. These physical interfaces provide the required network interconnectivity for the endpoint devices to connect to the multiple application services. Although not shown in FIG. 3, this connectivity between digital endpoint devices and the gateway device may be accomplished by other means, including, by way of example, through of a virtual private area network connection accessed through a WAN interface.

That is, the gateway device 10 interfaces with digital endpoint devices including, but not limited to: a home automation networking device 20 (e.g. X10, Z-Wave or ZigBee) for wired or wireless home network automation and control of networked home devices such as a switch controller 22, sensor devices 23, automatically controlled window blinds 24, a controlled lighting or lamp unit 25 etc, individual or wired or wireless network of personal computing (PC) and laptop/mobile devices 30a, . . . , 30c that serve as file sources, control points and hosts for various other client endpoints, one or more television display devices 32 including associated set top boxes (STB) 35a or digital media adapters (DMA) 35b, one or more VoIP phone devices (e.g. SIP phones) 40, or other devices (not shown) that convert IP interfaces to PSTN FXO and FXS interfaces.

As noted earlier, the gateway device 10 may provide an interface 35b to the Digital Media Adapter (DMA) for television (TV) 32, which enables bidirectional wireline or wireless communication. This interface supports several functions for multiple services including, but not limited to: media (e.g., video and music) by enabling the transfer of media (e.g., video and music) to the TV; voice services, by providing for Called Line ID and for voice mail control; and provide Home Automation Services including status and control of networked home automation devices. The DMA element 35b converts audio and video (optionally) to a format suitable for a TV. In addition, the Digital Media Adapter 35b may be capable of receiving context-sensitive commands from a remote control device (not shown) and forwarding those commands to the gateway device 10. This enables the use of menus on the TV 32 for controlling application services and various features functions thereof, as offered by the gateway device 10. For example, the Media Adapter/TV combination is able to provide the following features including, but not limited to: display of media; media control functions, when enabled (FF, REW, STOP, PAUSE, etc); display of Calling Line Identification (CLID); control of voicemail; picture viewing; control of home automation; and user functions for the gateway device 10.

A Set Top Box 35a as shown in FIG. 3 also may handle media format conversion (for example NTSC to ATSC television RF signals), digital decryption and other DRM (digital rights management) functions, and Video On Demand Purchases, etc. The Set Top Box/TV combination may thus enable, by way of example: Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA interface 35b and the TV 32 or by the set top box 35a and the TV 32, the communications to and from the TV provide a user interface for interaction with the gateway device 10. The programming of the gateway device supports, among other things, a graphical user interface (GUI) via the TV, sometimes referred to as the "ten-foot" interface.

With respect to PCs interfacing with the gateway device 10, PCs may serve as, among other things, file sources, control points and hosts for various software clients. Thus, the PC programming may work in conjunction with the ASL and ASE programming of the gateway device. Together, the PC programming and the ASL and ASE programming provide a more comprehensive and robust user experience. The gateway device 10 may further provide a bidirectional wireline or wireless interface 35c to a PC device 306 for supporting the transfer of media (e.g., video and music) to the computer for storage and viewing; for supporting voice services, e.g., by providing for calls from SIP soft clients; for file sharing, file back-up and home storage and home automation control functions. The access point 62 offers wireless data communications with a PC 30c. The gateway device interface through any PC may provide for the bidirectional moving of files, and status and control for the endpoint devices, including for example, status and control of networked home automation devices. In addition, using the PC interface, users may, for example, share files on the gateway devices, back-up or transfer files to the gateway devices or other storage; access personal page for notifications, RSS, shared photos, voicemail, etc. In addition to the IM and SIP capabilities of the gateway device, as described more below, PCs may also serve as a host for IM and SIP soft phone clients and other client devices. The client-server interaction of the PC with the application service logic of the gateway device 10 offers an alternative GUI for at least some of the services. The PC based GUI is sometimes referred to as the "two-foot" interface.

Although not shown in FIG. 3, other digital endpoint devices for which connectivity may be established with the gateway device 10 include, but are not limited to: personal music or media players, hi-fi audio equipment with media streaming capability, game stations, Internet radio devices, WiFi phones, WiFi or other wirelessly enabled digital cameras, facsimile machines, electronic picture frames, health monitors (sensor and monitoring devices), etc.

As described in greater detail herein, the gateway device 10 includes both a hardware and software infrastructure that enables a bridging of the WAN and LAN networks, e.g. a proxy function, such that control of any digital endpoint device at the premises from the same or remote location is possible via the gateway device 10 using, optionally, a secure peer and presence type messaging infrastructure or other communications protocols, e.g., HTTPS. For example, via any IM-capable device or client 80a, 80b respectively connected with an Instant Messaging (IM) or XMPP (Extensible Messaging and Presence Protocol) network messaging infrastructure, e.g. IM networks 99a, 99b such as provided by Yahoo, Microsoft (MSN), Skype, America Online, ICQ, and the like, shown for purposes of illustration in FIG. 3, a user may access any type of functionality at a subordinate digital endpoint device at the premises via the gateway device 10 and service management center 50 by simple use of peer and presence messaging protocols. In one exemplary embodiment, a peer and presence communications protocol may be used such as Jabber and/or XMPP. Particularly, Jabber is a set of streaming XML protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint device or application at the premises via the IM-based messaging framework. In addition, the gateway device 10 and network connectivity to the novel service management center 50, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at a first premises and a second gateway device $10_n$ located at the remote premises. Thus, such an infrastructure provides for content addressing, enabling peers through remote gateway devices $10_1 \ldots 10_n$ to supply and request content such as files, media content or other resources of interest to a community of interest.

As noted above, the novel system architecture allocates the logical functionality of the ASD Platform (FIG. 1) between the gateway device 10 and the service management center 50 within an environment that enables communication and feedback at the AS Layer (FIG. 1) between the gateway device 10 and service management center 50. Thus, the gateway device 10, when operable with the service management center 50, makes possible the management of services for the digital home and facilitates the easy addition of new services or modification of existing services. Such services may include, for example, facility management (home automation), media content downloading and Digital Rights Management (DRM), device updates, data backups, file sharing, media downloading and transmission, etc., without the intermediary of a plurality of external service providers who may typically provide these individual services for every digital endpoint device in the home or premises. The programming for these services resides in the Application Service Provider Managed Applications and Platform of the UNA-DA (FIG. 2). That is, as earlier shown, the gateway device 10 is integrated with hardware and software modules and respective interfaces that handle all aspects of home automation and digital endpoint service and management for the home in a manner without having to rely on external service providers and, in a manner that is essentially seamless to the user. This, advantageously is provided by the service management center 50 which is able to access regions of the gateway device 10 that are not accessible to the user, e.g. for controlling the transport and storing of digital content and downloading and enabling service applications and upgrades and providing largely invisible support for many tasks performed by users.

For example, with the robust capabilities of the Application Service Provider Managed Applications and Platform (FIG. 2), the gateway device 10 is capable of handling all aspects of the digital home communications, e.g. IP, voice, VoIP, phone connectivity. In this example, the service logic located and stored at the gateway device 10 may provide soft-switch functionality for implementing call-processing features at the premises (rather than the network) for voice communications, and enabling management of other service features to be described. With the provision of central office type call services and other service features provided at the gateway devices $10.\text{sub}.1 \ldots 10.\text{sub}.n$, a distributed soft-switch architecture is built. The ASM logical functionality of the service management center 50, in cooperation with the ASE logical functionality of the gateway device, may, among other things, provide, manage and regulate, for example, service subscription/registration, authentication/verification, key management, and billing aspects of service provision, etc. With all of the service logic and intelligence residing at the gateway device a service provider can offer customers a broad spectrum of services including, but not limited to: media services, voice services, e.g. VoIP, automated file backup services, file sharing, digital photo management and sharing, gaming, parental controls, home networking, and other features and functions within the home or premises (e.g. home monitoring and control). Users can access their content and many of the solution's features remotely. Moreover, software updates for the in-home devices that require updating are handled in an automated fashion by the system infrastructure. The service management center infrastructure additionally provides a web interface for third-party service providers to round out the service solutions provided at the gateway device for the premises. For example, a third-party service provider other than the managed service provider associated with the service management center may be allowed access through the infrastructure to particular endpoint devices to provide additional services such trouble shooting, repair and update services.

Gateway Device Software and Hardware Architecture

Figure 4A:
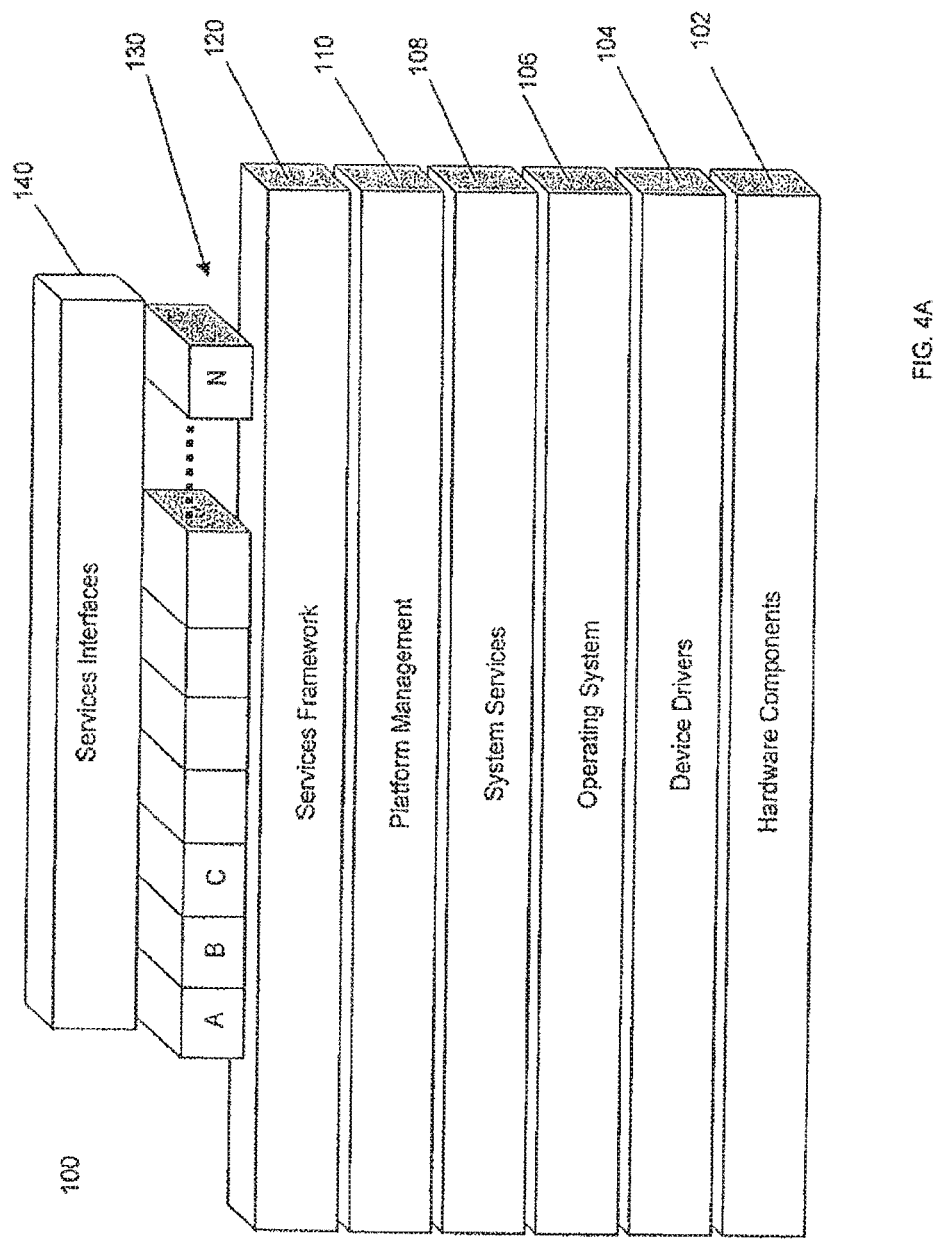
Figure 4B:
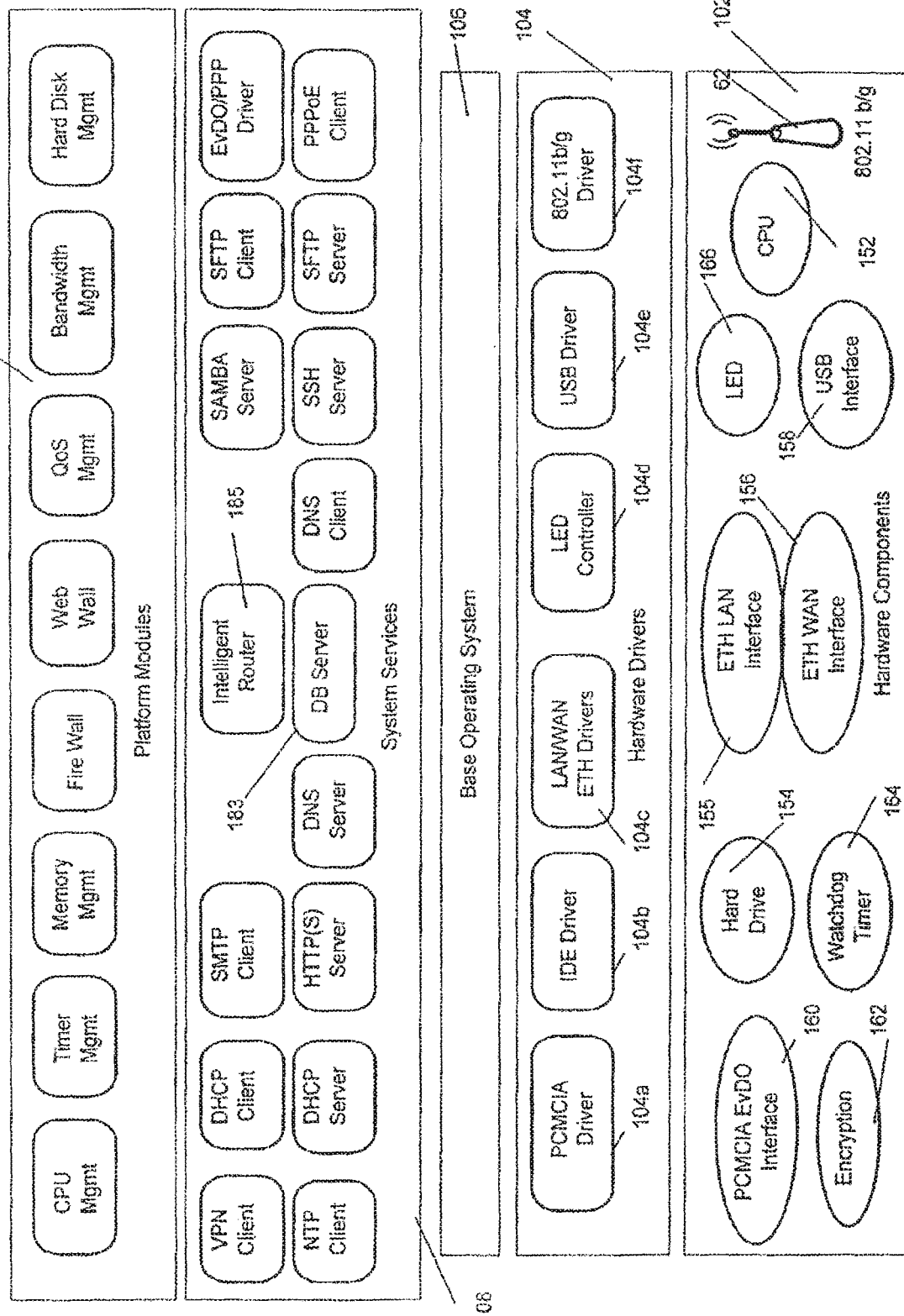
Figure 4D:
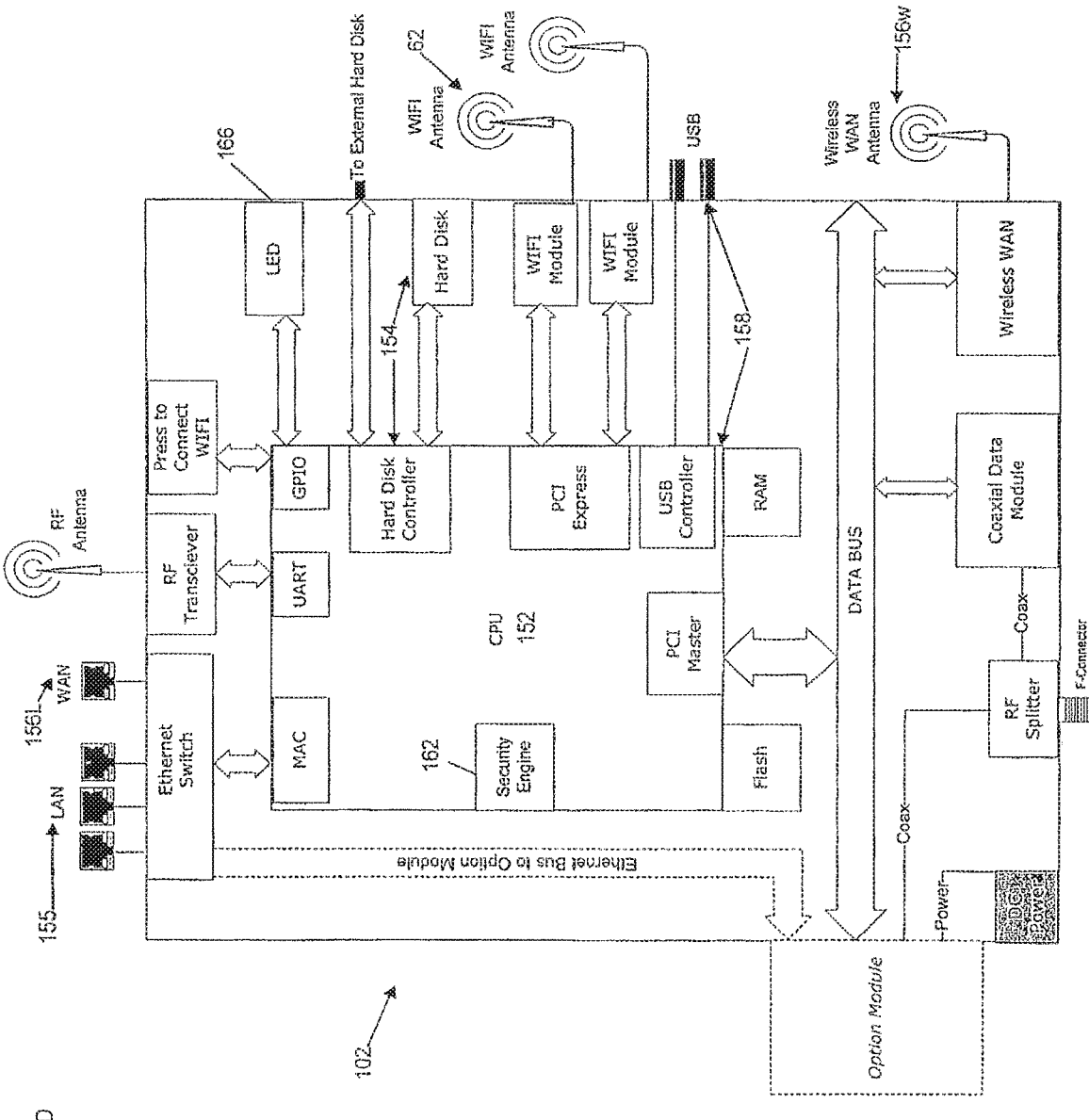

The composition of the premises gateway device 10, earlier described with reference to FIG. 2, is now described in greater detail with reference to FIGS. 4A-4D. As shown in FIG. 4A, the gateway device 10 utilizes a layered architecture 100, which enables the encapsulation of similar functionality and the minimization of dependencies between functions in different layers. FIGS. 4B and 4C depict exemplary functionality (hardware and logical) resident in, or corresponding to, each of the layers shown in FIG. 4A. The layers include a hardware layer 102, and device driver software 104 for allowing the processor to operate other hardware elements of the gateway device 10. FIG. 4D is a functional block diagram illustrating interconnection of exemplary elements of the hardware layer 102. The logical elements of the NI Layer residing on the gateway device 10 (FIG. 3) are found in the Hardware Drivers 104 which govern the operation of the Hardware Components 102. The processor runs an operating system shown at layer 106, which plays a role in each of the NI, NF, AS and Platform Management Layers (FIG. 1). The layered architecture 100 also includes software for systems services 108 and for the platform management layer shown at 110 in this drawing. Logical elements represented by the NF Layer depicted in FIG. 1 are comprised of elements from the system services 108 of FIG. 3. In a similar fashion, the Platform Management Layer depicted in FIG. 1 is implemented in the exemplary architecture of FIGS. 4A-4D by the platform modules 109 and the platform management layer 110.

Particular logical elements comprising the ASL and ASE functionalities of the AS Layer represented in FIG. 1, and that reside on the gateway device 10 (predominately in the Application Service Provider Managed Applications and Platform of the UNA-DA shown in FIG. 2) are depicted, in FIG. 4C, and comprise logical elements from each of services framework 120 and application services 130. The layered architecture in FIG. 4C facilitates reuse or sharing of logic across the layers to provide a managed service framework 120. The service management functionality provided by the framework 120 enables deployment of new services as pluggable modules comprising computer readable instructions, data structures, program modules, objects, and other configuration data, in a plug and play fashion. The layered service architecture 100 additionally provides the gateway device 10 with intra-process communication and inter-process communication amongst the many services and modules in the service framework layer 120 that enables the provisioning, management and execution of many applications and services 130, depicted e.g. services A, B . . . N at the gateway device 10. Additionally provided are the application service interfaces 140 that enable communications from user endpoint devices with service environments. In that regard, the interfaces 140 enable the application service logic 130 to act as an appropriate server with respect to client device application or service functionality of the endpoint devices. The application service interfaces 140 also enable corresponding interfaces for the application services with aspects of service environments implemented outside the user premises. In that regard, the interfaces 140 enable the application service logic 130 to act as an appropriate client, for extending the application or service related communications to a server accessed via the wide area network 99, such as a server of the service management center 50. For example, the gateway device may appear as a SIP server to a SIP client in an end point device, e.g. for a VoIP telephone service; but the gateway device will appear as a SIP client with respect to some related functions provided by a server (such as a SIP directory server) provided by the service management center 50.

FIG. 4A thus depicts a high level service framework upon which are built services, e.g. downloaded via the service management center network 50 and wide area network 99 as packages that are developed and offered by a service entity for customers. These services may be offered as a part of a default service package provisioned and configured at the gateway device 10, or provisioned and configured subject to user subscription and may be added time as plug-in service modules in cooperation with the service management center 50. It is understood however, that while the gateway device 10 includes much of the intelligence or service logic for providing various services, it is also possible that for some services, some or all of service logic may reside in the service management center network and/or with a third party provider.

As shown in more detail in FIGS. 4B and 4D, the base support layer 102 comprises hardware components including a processor device 152, e.g. a system on chip central processing unit ("CPU") that includes processing elements, digital signal processor resources and memory. The CPU 152 is also coupled to a random access memory ("RAM") and additionally, non-volatile hard drive/disk magnetic and/or optical disk memory storage 154. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. The card 155 referred to as the LAN interface card provides data communication connectivity within the user premises, essentially, for communication via a user premises network 60 with any endpoint devices operating within the premises. The card 156 referred to as the WAN interface card provides data communication connectivity for the gateway device 10 and endpoint devices communicating through the device 10, with the wide area IP network 99. For additional or alternative customer premises communications, the hardware components 102 may also include one or more USB interfaces 158; and for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

As mentioned above, the gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 152.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 4B, the device driver layer 104 comprises a multitude of driver interfaces including but not limited to: a PCMCIA driver 104*a*, for enabling low level communication between the gateway CPU 152 and the PCMCIA network interface card wireless interface, an IDE driver 104*b* for enabling low level communication between the gateway CPU 152 and the local mass memory storage element, and LAN/WAN drivers 104*c* for enabling low level communication between the gateway CPU 152 and the respective network interface cards 155 and 156. The exemplary driver layer also includes an LED driver/controller 104*d* for driving LED(s) 166, a USB driver 104*e* allowing CPU 152 to communicate via USB interface 158, and an 802.11b/g (or n) wireless network driver 104*f* for allowing the CPU 152 to communicate via the access point 62. The drivers provide the logical connectivity between the low level hardware devices 102 and the operating system 106 which controls the execution of computer programs and provides scheduling, input-output control, file and data management, memory management, and communication control and related services for the gateway device. With respect to the operating system 106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 10 may be advantageously provided with an embedded operating system 106 that provides operating system functions such as multiple threads, first-in first-out or round robin scheduling, semaphores, mutexes, condition variables, message queues, etc.

Built upon the system operating system 106 is a system services support layer 108 providing both client-like and server-like functions that enable a wide range of functionality for the types of services capable of being managed by the gateway device 10. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 10 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network 50, according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination governs the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 183 handles all of the database aspects of the system. For example, the database server 183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 183 also satisfies all other database storage needs as will be described in greater detail herein.

Referring back to FIGS. 4A and 4B, built on top of the system services layer 108 is the platform module layer 109. The platform module layer 109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture 100 further provides a platform management layer 110 as shown in FIG. 4C, which together with the platform modules 109 implement the platform management layer/logic discussed earlier (with regard to FIG. 1).

The features/functions in the layer 110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 110 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g. voice call logs, at the user premises. The platform management layer 110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 2, is thus defined that provides a hard line between what is owned by the customer and what is owned by the service provider.

The logical platform management layer 110 allows for inter-layer allocation of local resources. This function guarantees access between the application service/management logic implemented at the higher layers in the gateway device 10 and the applications service management function in the service management center 50, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 4A and 4C, built on top of the platform management layer 110 is the Services Framework 120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 120 is the Application Services layer 130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 10 further provides application service interfaces 140 that are used to enable a variety of user applications and communications modalities.

For instance, the SIP Interface 141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center 50 (FIG. 3).

The Web Interface 142 enables HTTP interactions (requests and responses) between two applications. The Web services interface 149 provides the access interface and manages authentication as multi-services gateway devices access the service management center 50 (FIG. 3) via web services. The IM Interface 144 is a client that enables the multi-services gateway device 10 to connect to one or more specific IM network(s). As further shown in FIG. 4C, the UpNp (Universal Plug and Play) interface enables connectivity to other stand-alone devices and PCs from many different vendors.

The XMPP interface 145 is provided to implement the protocol for streaming (XML) elements via the gateway device 10, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

As noted, FIG. 4D provides a functional block diagram of exemplary elements of the hardware layer 102. For example, a system on a chip provides the CPU 152 and associated system components. The CPU 152 is also coupled to a random access memory ("RAM") and flash memory. The system on a chip also includes a hard drive controller controlling a hard disk drive, and together the controller and drive form the hard disk example of the storage 154. An Ethernet switch and associated LAN port(s) provide the Ethernet LAN interface 155; and the Ethernet switch and associated WAN port provide a landline implementation of the WAN interface 156L, for connection to a broadband modem or the like implementing the NSP-TA. The WAN interface may also be wireless, as implemented at 156w for example by a wireless WAN module and associated antenna. An example of such an interface would be the EvDO interface discussed earlier. If the gateway device uses the wireless WAN interface 156w, there would be no separate NSP-TA.

In the example of FIG. 4D, a USB controller in the system on a chip and one or more associated USB ports provide the USB interface 158. The USB interface 158 may provide an alternate in-premises data communication link instead of or in addition to the wired or wireless Ethernet LAN communications. The system on a chip includes a security engine, which performs the functions of the data encryption/decryption unit 162.

The hardware layer 102 may also include an option module. The UNA-DA hardware components at layer 102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

Gateway Processing

For the in-home services, the multi-services gateway device 10 connects the various service delivery elements together for enabling the user to experience a connected digital home, where information from one source (for example, voicemail) can be viewed and acted on at another endpoint (for example, the TV 32). The multi-services gateway device 10 thus hosts the various in-home device interfaces, and facilitates the moving of information from one point to another. Some of the in-home endpoint device processing duties performed by the gateway device 10 include, but are not limited to: 1) detecting new devices and provide IP addresses dynamically or statically; 2) functioning as a (Network Address Translator) NAT, Router and Firewall; 3) providing a centralized disk storage in the home; 4) obtaining configuration files from the service management center and configuring all in-home devices; 5) acting as a Registrar for SIP-based devices; 6) receiving calls from and delivering calls to voice devices; providing voicemail services; 7) decrypting and securely streaming media having digital rights management (DRM) encoding; 8) distributing media to an appropriate in-home device; 9) compressing and encrypting files for network back-up; 10) backing-up files to the network directly from gateway device; 11) handling home automation schedules and changes in status; 12) providing in-home personal web-based portals for each user; 13) providing Parental Control Services (e.g. URL filtering, etc.); 14) creating and transmitting billing records of in-home devices including, recording and uploading multi-service billing event records; 15) distributing a PC client to PCs in the home, used in support of the various services such as monitoring events or diagnostic agents; 16) storing and presenting games that users and buddies can play; 17) delivering context-sensitive advertising to the endpoint device; and, 18) delivering notifications to the endpoint device; and, 19) enabling remote access through the web, IM client, etc. Other duties the gateway device 10 may perform include: service maintenance features such as setting and reporting of alarms and statistics for aggregation; perform accessibility testing; notify a registration server (and Location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

Logical Architecture and Service Management Center Network

While the gateway devices 10 as described above are each equipped with various logic and intelligence for features that enable the gateway devices to provide various integrated digital services to the premises, as described herein with respect to FIG. 3, the network-based elements of the service management center 50 supports and manages multi-services gateway devices, for instance, so as to control the accessibility to functionalities and service features provisioned in the gateway devices and the ability to communicate with other gateway devices and various digital endpoint devices connected thereto. These elements that support and manage the gateway devices 10 comprise the ASM module described above with reference to FIG. 1. These ASM elements may, for example, provide the necessary data to the ASE and ASL modules so that they may carry out their respective functions, oversee the overall integration and communication among all the modules and the services that are managed by the ASM, manages the overall security and integrity of the ASD, and maintains alarm, statistical, subscription and provisioning data, and data necessary for the integration of services from third-party service providers, e.g., media content aggregators.

Examples of various ASM functionalities performed at the service management center 50, from the Service Provider Network regime, include but are not limited to: service initialization of the gateway devices, providing security for the gateway devices and the network support infrastructure, enabling real time secure access and control to and from the gateway devices, distributing updates and new service options to the gateway devices, providing service access to and from the gateway devices and remote access to the gateway devices, but not limited to such. In support of these services, the service management center 50 provides the following additional services and features: authentication; multi-service registration; subscription control; service authorization; alarm management; remote diagnostic support; billing collection and management; web services access; remote access to gateway devices (e.g. via SIP or Internet/web based communications); reachability to access challenged gateway devices; software updates; service data distribution; location service for all services; SIP VoIP service; media services; backup services; sharing services; provisioning; gateway interfaces to other service providers (Northbound and peering); load balancing; privacy; security; and network protection.

Figure 5:
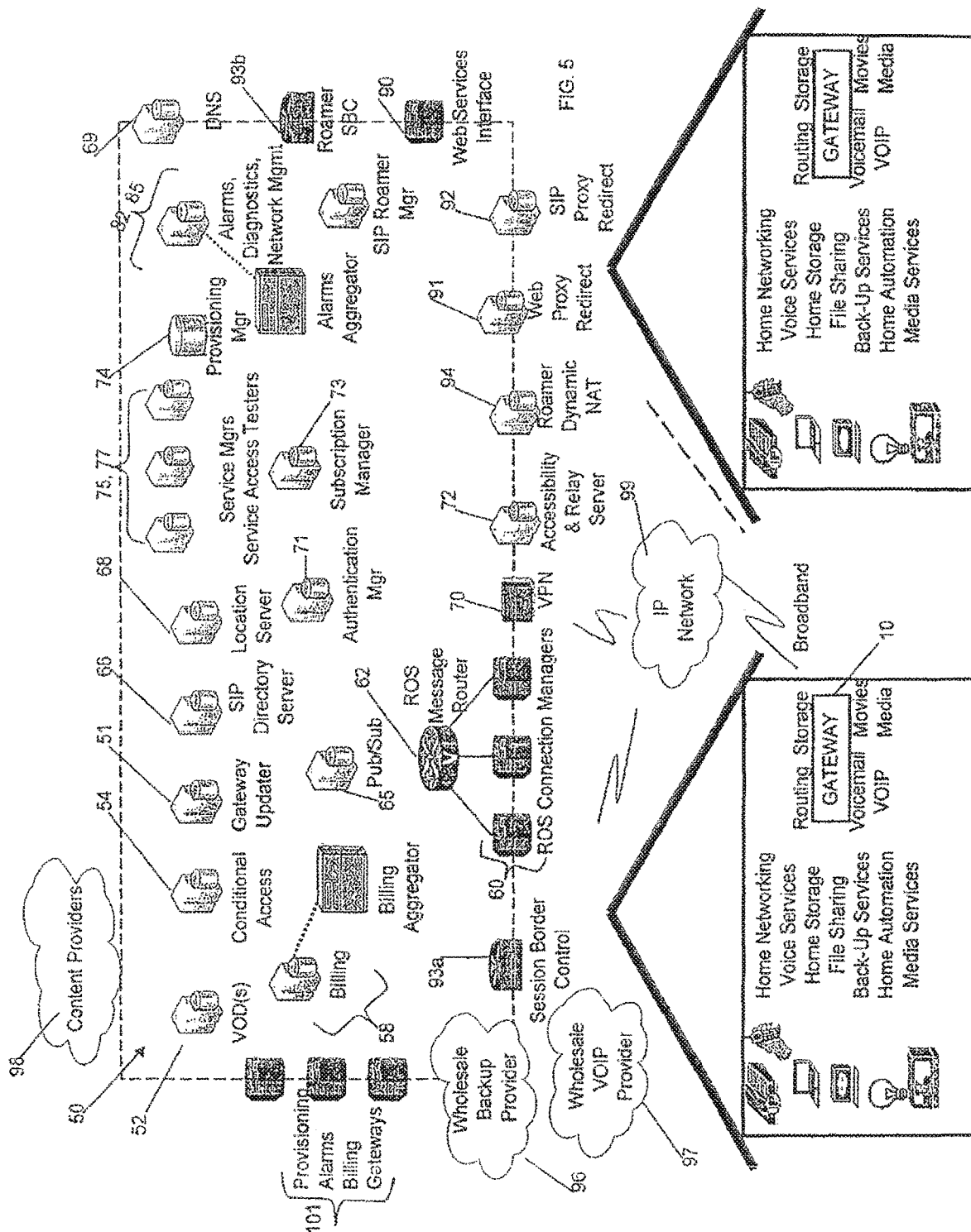
FIG. 5 depicts the networked operations services support infrastructure of a network implementation of the service management center, for delivering service capabilities to the multi-services applications gateway device of FIG. 3.

The logical network architecture for the service management center network delivering these capabilities is illustrated in FIG. 5. It should be understood that the functional components described in view of FIG. 5 may be combined and need not be running on discrete platforms or servers. Rather one server or component may provide all the service management center functionalities for providing managed network of gateway devices 10. In addition, any one of the components shown in FIG. 5 may perform any one of the functionalities described herein. Thus, the description in the present disclosure associating certain functions with certain components are provided for ease of explanation only; and the description is not meant to limit the functionalities as being performed by those components only. Thus, the network elements or components shown in FIG. 5 illustrate logical architecture only, and the present teachings do not require the specific components shown to perform specific functionalities described. Moreover, the functional components may use distributed processing to achieve a high availability and redundancy capacity.

The one or more network elements of center 50 illustrated in FIG. 5 support the gateway devices 10 that are services points of presence in the user premises such as users homes, and the various endpoint devices connected thereto. Examples of functionalities provided in the service management center network 50 are discussed below. Upgrades to gateway device firmware and various endpoint devices may be managed in the service management center network 50, for example, by a firmware updater server 51. VOD (video on demand) functionalities, for example, serviced by VOD servers (VODs) 52, ingest wholesale multi-media content and provide DRM-based premium content to the multi-services gateway device and endpoint devices. The service management center network 50 also may enforce DRM (Digital Rights Management) policies, for example, by a conditional access (CA) server 54, which provides key-based access and initiating billing processes. The service management center network 50 may also provide functionalities such as collecting billing information and processing billing events, which for instance may be handled by billing aggregator sub-system 58. The service management center network 50, for example, using one or more connection manager servers 60, may establish and maintain a signaling control channel with each active multi-service gateway device 10. For message routing functionality of the service management center network 50, for example, one or more message router devices 62, may provide intelligent message touting service for the network 50 and maintain gateway device presence and registration status in an internal session manager sub-system of the service management center network 50. Publish and subscribe, functionality of the service management center network 50, for example, a Publish/Subscribe (Pub/Sub) server sub-system 65, may provide publish and subscribe messaging services or the multi-services gateway devices 10 and the elements service management center network 50.

The service management center network 50 may provide SIP-based directory services for voice and other multimedia services, for example, via its SIP Directory Server 66. In addition, location service functionality, for example, provided by the Location Server 68, may include IP and Port level services for all inbound services. As discussed more later, the location server 68 maintains information as to accessibility of authenticated gateway devices 10, for enabling peer to peer communications among gateway devices 10 via the wide area IP network 99. DNS services functionality may be provided by a DNS server 69 for all inbound services.

The service management center network 50 may also provide virtual private network (VPN) functionalities, for example, handled by its VPN server/subsystem 70, and provide VPN connection services for certain inbound services on multi-services gateway devices 10. VPN connection services may be provided on those multi-services gateway devices that have accessibility challenges, for example, those that are behind external firewalls and NATs. The service management center network 50 may also include functionality for determining the nature of the accessibility configuration for the multi-services gateway devices 10. In one, embodiment accessibility service may be performed by an accessibility test server 72 that functions in cooperation with the multi-services gateway device 10 to determine the nature of the accessibility. For example, the accessibility test determines whether the gateway devices are behind a firewall, whether NATs is required, etc.

The service management center network 50 also functions to provide provisioning services to all elements of service management center network 50 and to multi-services gateway devices 10. Such functionality of the network 50, for example, may be implemented by the provisioning server 74 in one embodiment.

Authentication functionality of the service management center network 50, for example, provided by an authentication manager 71, provides authentication services to all service management center network elements and to multi-services gateway devices 10. As discussed more later, upon successful authentication of a gateway device 10, the authentication manager 71 controls the connection manager 60 to establish a signaling communication link through the wide area IP network 99 with the authenticated gateway device 10. The authentication manager 71 confirms authentication of the respective gateway device 10 from time to time, and the authentication manager 71 controls the connection manager 60 to maintain a session for the signaling communication link through the wide area IP network 99 with the respective gateway device 10 as long as the authentication manager 71 continues to confirm the authentication of the respective gateway device. The signaling connection may be torn-down, when the device 10 no longer passes authentication, either because it becomes inaccessible to the authentication manager 71 or its service status changes.

The gateway devices 10 and service management center 50 implement several methodologies that allow the service provider to manage various subscription application services provided for endpoint devices associated with the gateway devices 10. In general, one subscription management methodology involves sending information indicating configuration data or software currently needed for the one gateway device to implement server functionality for an application service or a feature of an application service, based on a service subscription of a customer associated with that gateway device. Several different ways of sending this information are discussed by way of example below. A request from a particular gateway device 10 is received in the service management center 50, indicating that the device 10 needs the configuration data or software to implement the application service or feature thereof. In response, the service management center 50 sends the necessary configuration data or software through the wide area network 99 to the gateway device 10. The gateway device 10 can install the configuration data or software, to enable that device 10 to deliver the server functionality for the application service or the feature to its associated one or more endpoint device(s) that implement the client functions regarding the particular application service.

Subscription functionality of the service management center network 50, for example, provided by a subscription manager 73, is one mechanism used to provide management of subscription services to all multi-services gateway devices 10. The subscription manager 73 manages applications services and/or features of the server functionality of the gateway device 10, to be enabled on each respective authenticated gateway device, based on a service subscription associated with the respective device 10.

The service management center network 50 may include functionality for providing management services for each of the services provided in the gateway device 10. For example, respective service managers 75 store and serve to distribute service specific configuration data to the multi-services gateway devices 10, typically via the signaling communication links established through the wide area IP network 10 upon successful device authentication. The configuration data downloads by the service managers 75 are based on the service subscription of the user or premises associated with the particular gateway device 10, that is to say, as indicated by the subscription manager 73.

The service management center network 50 also includes elements to provide necessary software to the gateway devices 10 through the wide area network, as needed to implement customers' subscription services. In the example, the service management center network 50 includes an updater 51 for transmitting software to the gateway devices. The software resident in the gateway device is sometimes referred to as firmware. Software can be distributed upon request from an individual gateway device 10 or as part of a publication procedure to distribute upgrades to any number of the gateway devices. For this approach, the publication/subscription (Pub/Sub) server or like functionality 65 provides notifications of available software updates. For example, upon detecting an update regarding an application service, gateway devices 10 subscribing to an update notification service with regard to the relevant application service are identified. The Pub/Sub server 65 sends notification messages through, the wide area network 99 to the identified gateway devices 10. Assuming that a notified gateway device does not yet have the software update installed as part of its resident firmware, it sends a request indicating that the gateway device needs the available update. In response to the received request, the updater 51 sends the update of the software through the wide area network 99 to the one gateway device 10. The update enables the gateway device 10 to deliver the subscription application service or feature thereof, based on the updated software, to one or more endpoint devices implementing client functions related to the subscription application service.

Service access test functionality of the service management center network 50 performs tests to multi-services gateway devices to verify the accessibility for each subscribed service. Such functionality may be provided by service access test managers 77. The service management center network 50, for example, in an alarm aggregator subsystem 82 may aggregate alarms received from the multi-services gateway devices. The service management center network 50 also may include functionalities to support, for instance by alarms, diagnostics and network management (NWM) server 85, network management and network management services. The service management center network 50 enables web interface communication mechanism, for example, via a web services interface server 90, to for example provide access interface and manage authentication as multi-services gateway devices access the service management center for various services, including access to configuration data in the service managers 75.

Additional service management center network functionalities shown in FIG. 5 may include providing HTTP redirection services for public web access to the multi-services gateway devices, which function, for example, may be provided via a public web redirect server 91. Public SIP Redirect/Proxy functionality provides, for instance, via a Public SIP Redirect/Proxy server 92, SIP redirection and proxy services to public remote SIP phones and devices. The service management center network 50 also may include functionalities to provide a SIP-based network border interface and billing services for off-net voice calls. Such functionality in one embodiment may be provided in a Session Border Controller device 93a. Another functionality of the service management center network 50 may be providing Session Border Control services to SIP roaming SIP callers in certain situations, which functionality for example may be provided by a Roaming Session Border Controller device 93b. The service management center network 50 also functions to provide dynamic NAT services during certain SIP roaming scenarios. Such functionality may be implemented in the Roamer Dynamic NAT Server 94.

The service management center network 50 further may provide off-site backup services for the service management center network to a Wholesale Back-up Provider 96. The service management center network 50 further interoperates with Wholesale VoIP Provider 97, which may provide VoIP call origination/termination services for off-net voice calls. For instance, the service management center network 50 may provide VoIP/PSTN gateway that enables a translation, between protocols inherent to the Internet (e.g. voice over Internet protocol) and protocols inherent to the PSTN. Other entities that may be partnered with the service management center network 50 as shown in FIG. 5 include the content providers 98 that provide media-based content (including, but not limited to music, video, and gaming) to the service management center network 50, gateway interfaces 101 for billing, alarms/diagnostic network management (NWM), and provisioning interfaces for partnered wholesale providers (e.g. peering interfaces) and service provider customers (e.g. North bound interfaces).

In the illustrated example, a server or servers of the service management center network 50 are intended to represent a general class of data processing device commonly used to run "server" programming. Such a device typically utilizes general purpose computer hardware to perform its respective server processing functions and to control the attendant communications via the network(s). Each such server, for example, includes a data communication interface for packet data communication. The server hardware also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

Gateway and Service Network Initialization

Figure 6A:
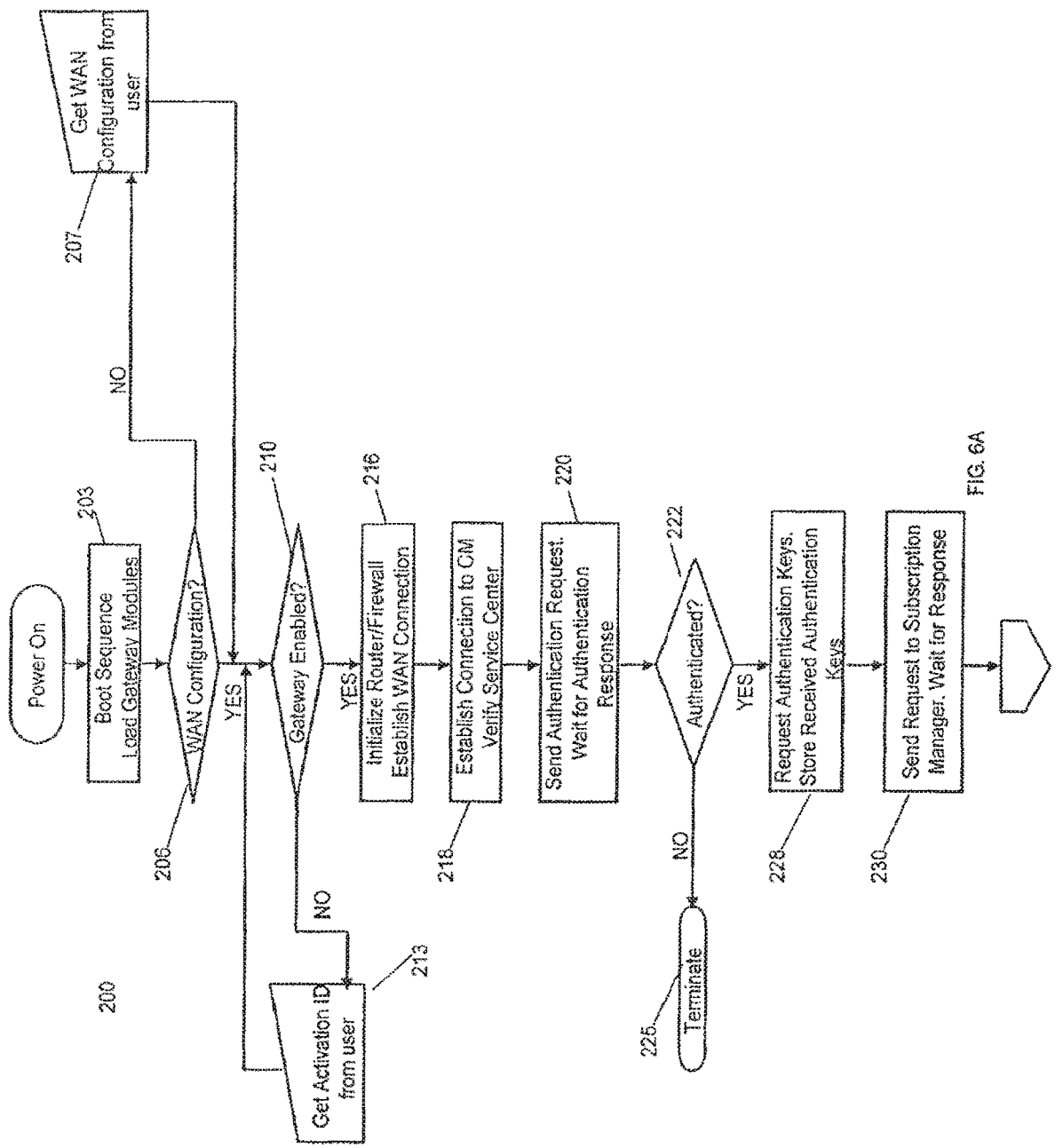

FIGS. 6A-6C describe high-level aspects of an initialization technique 200 for establishing a gateway device's connection to and enabling communication with the service management center network 50, and further the provisioning and management and maintenance of services. After power is applied to the gateway device 10, a boot sequence is executed that loads the software modules of the gateway device at step 203.

As shown in FIG. 6A, a gateway device 10 is fully enabled if a subscriber activation code and optionally, the WAN configuration information is provisioned. Thus, optionally, at step 206, a determination is made as to whether the necessary WAN configuration information is provided. In an example, the gateway device 10 comes preconfigured for a certain (default) WAN configuration, but this may not match the appropriate configuration for the particular subscriber. For example, the gateway device 10 might have a default configuration to obtain a dynamic IP address from the network, but the user may have subscribed to a static IP address, in which case a DHCP request would fail and the user would need to input the static IP address. As another example, the gateway device 10 might come configured without a PPoE login, but the user's configuration requires a PPoE login. In that example, the user would need to input this data. Hence, in the process flow of FIG. 6A, if the determination at step 206 is that the subscribers' WAN configuration the default configuration already existing in the gateway device 10, then no user input is required. However, if the WAN configuration information is not properly provisioned in the gateway device 10, the process proceeds to step 207 where the system obtains from the user the gateway device's WAN configuration. At step 210, a determination is made as to whether the gateway device is fully enabled. If the gateway device 10 is not fully enabled, the process is performed at step 213 to obtain an activation identifier (ID) from the user. It should be understood however, that before full activation, minimal functionality could be provided.

Once the gateway device is fully enabled, at step 216, there is initiated the process of initializing the router/firewall and establishing the WAN connection. In one embodiment, a Transport Layer Security (TLS) connection is established with the connection manager server functionality 60 at the service management center network 50 and communications with the service management center network at step 218. This TLS connection in one embodiment is a signaling channel that is always-on for transacting various communications with the service management center network. For example, the channel or session may remain logically on at least while the device is authenticated and may remain on for the duration that the gateway device 10 is powered on and providing its services and functionalities as the in-premises or in-home platform for endpoint devices associated with the premises.

Continuing to step 220, the gateway device 10 then sends an authentication request including an authentication digest using a hardware identifier, an activation code, and a subscriber ID, and waits for an authentication response. At step 222, the process waits until the authentication notice or like response is received. If the authentication response is not received, the process terminates as shown at step 225. If the gateway device becomes authenticated, at step 228, the gateway device requests from the service management center the authentication keys and stores them at the gateway device. These keys are used whenever a gateway device has to be authenticated, e.g. when conducting a transaction or accessing the service management center network, for example, through a web services interface or a control signal channel.

Continuing to step 230, FIG. 6A, the gateway device 10 sends a request to the subscription manager functionality 73 or the like of the service management center network 50, and the gateway device 10 waits until it receives a response. The request from the gateway device 10 includes, for example, the gateway device identifier information. In response, the subscription manager functionality 73 of the service management center network 50 replies with a service descriptor indicating the latest software version and configuration information for that gateway device 10, for example, information associated with one or more services currently subscribed in that gateway device 10, the latest software information for the gateway and configuration for all subscribed services. There is also provided an indicator that identifies a change in user specific service data for all of the subscribed services, if any.

Continuing to FIG. 6B, at step 233, the gateway device 10 determines whether its firmware versions are up to date by checking the received software version numbers with version numbers for the firmware modules that currently reside in the gateway device 10. If necessary, the gateway device 10 receives the actual software or configuration data from the service management center, for instance, through a web services interface 90 over a secure HTTPS connection in one embodiment. At step 235, a determination is made as to whether the configuration data 235a and user data 235b for each service of up to N services that the user may be subscribed to are up to date. For each service, if it is determined that the configuration data 235a and user data 235b are not updated, the gateway device 10 may receive such data from the service management center network 50, for example, over the HTTPS connection.

Continuing to step 237, the gateway device may apply the configuration/software updates immediately or, schedule them for another time. A user may utilize a GUI to schedule the updates. If certain firmware needs to be updated right away, there may be a prompt presented to the user to acknowledge and approve the updates.

At step 240, a gateway device accessibility test is performed to determine if a VPN connection to the service management center network is needed. This may happen if the gateway device 10 is behind a firewall or the like that protects the gateway device from the public access. The test, for example, may be optional. In one embodiment, this test is done on start-up, and for example, for cases when the gateway device is disconnected from the WAN or a new IP address from the WAN is assigned. An accessibility testing functionality of the service management center network, for example, may send a connection request (such as a ping) in order to try to reach the gateway device. Different port numbers on a given IP address may be tested for reachability to the gateway device.

Continuing to step 245, FIG. 6C, a determination is made as to whether accessibility has been challenged, e.g. the device lies behind a firewall at a private IP address. If accessibility has been challenged, then at step 348, a connection with a VPN is established. Step 250 represents the step of storing the WAN and VPN IP addresses to be used for inbound services. Examples of inbound services may include, but not limited to, voice service, remote web access, etc. At step 253, the gateway device 10 sends a message to the service management center network 50, for example, which message is routed to service manager 75 and subscription manager 73 of the service management center network 50. The message informs the service manager 75 and subscription manager 73 about the gateway device's current version and configuration information. Registering with those server functionalities may initiate notification services that enable asynchronous configuration, firmware, and/or user data updates.

At step 255, a general multi-purpose registration is performed, whereby a service register request message is sent from the service manager 75 to a location server 68 of the service management center network 50. This request message tells the location server 68 that the gateway device 10 is ready to accept inbound services on a given IP address and port number for the respective service. Thus, the information may include the IP Address (WAN/VPN) and/or other specific data for informing the location server 68 how to route to the gateway device 10. In one embodiment, a clock on a gateway device may be set when the gateway device re-registers with the service management center network 50.

Architectural Overview for Establishing Connections and Authentication Process

FIG. 7A is an architectural diagram illustrating a manner in which the multi-services gateway device makes an initial connection to the service management center network 50 in one example. It is noted that the individual components shown in the service management center network 50 illustrate logical components or functionalities provided in the service management center network. As mentioned above, a signaling channel in an exemplary embodiment is established between the gateway device 10 and the service management center network 50 during the gateway device's initialization process, and in one embodiment this connection is maintained for the duration that the gateway device is powered on and is providing its functionalities. Thus, a connection is established between the gateway device and the connection manager server functionality 60 in the service management center network, for example, to provide connection services prior to establishing a session state and authenticating the gateway device. As shown in FIG. 7A, a TCP/TLS connection 150 is made between the gateway device using the gateway device's broadband connection and the IP network to connection manager server functionality 60 of the services service management center network. The connection manager 60 of the service management center network 50 receives the session state of the network channel request where control is implemented to initiate authentication. A message router 62 routes the request message to an authentication manager 71 or the like as shown in FIG. 7A. Prior to establishing any TCP/IP connection, an authentication is performed, as indicated at 145.

In one embodiment, the connection manager 60 may aggregate a plurality of connection channels 150 and multiplex these signaling channels to the message router device 62. The connection manager 60 works with the message router 62 and the authentication manager 71 to authenticate the multi-services gateway device 10 and allow its access to the network 50 by enabling the establishment of a control channel 150 providing an "always on" control channel between the multi-services gateway device and the services service management center 50 once the gateway device is authenticated. The connection managers 60 also provide network security and protection services, e.g. for preventing flooding, denial of service (DOS) attacks, etc. In one embodiment, there may be interfaces such as APIs for interfacing the connection managers 60 or the like to the message routers 62 and the multi-services gateway devices 10. As the network of multi-services gateway devices grow, the number of connection managers 60 may grow to meet the demand for concurrent signaling control channel connections.

In one embodiment, a message router device(s) 62 provides control signal message routing services and session management services to the multi-services gateway device 10 and the other network elements of the service management center 50. In one embodiment, the message router device 62 has control channel signaling access, via the control channel to the firmware upgrade manager server or gateway firmware updater 51, VOD server(s) 52, a billing system 58, content managers 98, pub/subs 65, service accessibility test manager 77, authentication manager 71, service manager 75, subscription manager 73, alarms aggregator 82, network management (NWM) server 85 and public web proxy redirect 91, and the multi-services gateway devices 10. The message router 62 may also include a session manager subsystem that maintains control channel state information about every gateway device client in the gateway-service center network. The message router 62, and session manager enable sessions to be established to each multi-services gateway device 10 and each element of the service management center 50 and provide robust routing services between all the components. The message routers 62 may additionally connect to other message routers for geographic based scaling, creating a single domain-based control channel routing infrastructure. The message routers 62 may additionally connect to IM gateways and other message routers that provide user based IM services, which may enable users to interact directly with their multi-services gateway device via IM user clients. Thus, besides providing routing and session management for all the multi-services gateway devices and the network elements, the message router element 62 enables control signaling between all the network elements and the multi-services gateway devices and, connects to IM gateways to provide connectivity to other IM federations.

With respect to authentication functionality, the authentication manager component 71 provides authentication services for all the network elements of the service management center network 50. The service management center network elements query the authentication manager 71 to verify the identity of elements, including the multi-services gateway device 10, during inter-element communications. The gateway device 10 authenticates the service management center 50 at the Web Services Interface 90. The Web Services Interface 90, for example, may return data that the multi-services gateway device 10 uses to confirm the identity of the service management center 50.

The authentication manager functionality 71 may interface to the multi-services gateway devices 10 and other network elements such as the message router 62 and session manger servers, the accessibility server or the like, the service accessibility test mangers 77, the web services interface 90 or the like, the provisioning manager server 74, the NWM server 85 or the like, pub/sub 65 or the like, VODs 52, CA servers 54, and the billing system 58 or the like.

Signaling Control Channel

As mentioned herein with respect to FIG. 7A, the connection manager servers 60 or the like functionality in the service management center network 50 provide connection services and enable the establishment of a control channel, enabling an "always on" control channel between the gateway device and the service management center functions of the service management center network. Thus, in one embodiment a gateway device 10 establishes a TCP/TLS connection to the connection manager functionality 60 in the service management center network 50, as shown at 150.

FIG. 8A illustrates details regarding TCP control channel setup in one embodiment. Step 310 establishes TCP control channel connection between the home gateway device and the service management center network 50 via a TCP Connect request and TCP Accept exchange. Once the control channel is established, an InitiateComm Stream request is generated by the gateway device and the network connection manager responds by establishing a TCP session and associated TCP/Session ID for streaming applications. Once the TCP communications session is established, a Transport Layer Security (TLS) or like cryptographic protocol security feature may optionally be established to secure endpoint authentication by the connection manager of the service management center network, e.g. by using public key certificates to verify the identity of endpoints. In the handshake, example parameters TCP, features and tlsinfo are exchanged to initiate the secure communications session with the gateway device as indicated at step 314. Once the TLS negotiation is completed, a secure, encrypted TCP/TLS communications session is established at 316 upon which may be layered additional security features such as SASL- or non-SASL-based. Those standards are described in detail in IETF RFC 2246 and RFC 2222.

Authentication

As mentioned above, once the gateway device 10 is physically connected to the service management center 50 via the network 99, it registers and authenticates itself on the service management center network 50. In one embodiment, this registration and authentication is done through the above established secure connection. Further details regarding TCP control channel and authentication are now described with reference to FIG. 8B. In one optional embodiment data link layer security may be established by implementing, for example, Simple Authentication and Security Layer (SASL). The SASL framework provides authentication and data security services in connection-oriented protocols via replaceable mechanisms (IETF RFC 2222). This framework particularly provides a structured interface between protocols and mechanisms and allows new protocols to reuse existing mechanisms and allows old protocols to make use of new mechanisms. The framework also provides a protocol for securing subsequent protocol exchanges within a data security layer. At step 320, after establishing the TCP/TLS connection between gateway device 10 in the home and the service management center network 50 (e.g. connection manager server 60 or the like), the SASL authentication process is initiated whereupon the gateway device 10 communicates authentication details to the connection manager server 60. The connection manager server 60 of the service management center network 50 routes the authentication request to the authentication manager 71, via intermediary of the control message router device 62 and session manager servers or the like as shown at 324 in FIG. 8B. Once the authentication details for the gateway device 10 reach the authentication manager 71, the gateway device is authenticated. Additionally, control access information is communicated to a Location server 68, which may provide location and IP port information updates to, for example, other network functionalities or elements such as a file sharing server, remote web access server, other gateway devices 10, and other elements.

In the example, with the security option, once secure connection (e.g. XMPP connection) is established at step 326, authenticated session state between the home gateway device and the service management center network is ensured and messages can safely flow to and from the gateway device 10. In one embodiment, authentication credentials may include: user ID, subscriber ID, and a unique identifier (id) that is hardware dependent. In an alternate embodiment, a unique hardware based ID need not be sent, however, may be used to hash a string or digest. At this point, any requests originating from the gateway device 10 may be serviced.

The authentication procedure between the gateway device 10 and the authentication manager 71 is repeated from time to time, to allow the service management center network 50 to confirm authentication of the respective gateway device 10. The authentication manager 71 could initiate such a repeat authentication, but typically, this would be initiated by a new authentication request from the gateway device 10. The gateway device 10 would be programmed to initiate the new request after some predetermined period of time. In turn, the authentication manager 71 would be programmed to terminate authentication of the respective gateway device 10 if such a new request was not received within some delay interval following expiration of the time for the expected new request. The signaling connection would be torn-down, when the device no longer passes authentication, in this example, when it fails to send the expected new request for confirmation of authentication in a timely manner. If the device 10 later attempts to obtain authentication, it would go through the procedure to communicate with the authentication manager 71 as outlined above relative to FIG. 8B.

In one example, a presence and peering based messaging protocol is used for the gateway device 10 to establish connection with the service management center network 50. This may comprise an SASL or NON SASL-based XMPP (Extensible Messaging and Presence Protocol), described in IETF RFC 3920 and RFC 3921. For instance, using XMPP, messages are sent and received between the gateway device and the service management center network (e.g. via connection manager and message router functionalities).

In one example, during the authentication, if the service management center network 50 does not contain the gateway device registration and subscription information, the service management center network 50 may prompt the user via the gateway device 10 for the information. Such information may include, but is not limited to, gateway identifier such as the MAC address, name for a fully qualified domain name (FQDN) which is a complete DNS name such as johndoe.xxx.com, subscriber information such as name, address, email, and phone number. Additionally, service plan information such as file sharing, voice, file backup; media services, personal page, home automation, billing, to which the user is subscribing or desires to subscribe, user name and password for the subscriber and billing options and information may be obtained.

In one example, before completing the authentication process, the service management center network 50 optionally may display to the user via the gateway device 10 a list of the enabled services allowing the user to confirm the services enabled, and/or allow the user to add to or delete from the services enabled. Once the authentication process is completed, the service management center network registers the gateway device with other functionalities in the network for enabling different services. For example, for phone service, there may be an optional registration or authentication process on the SIP redirect server functionality.

Authentication Keys, Service Keys, Dynamic Key Renewal

In one example, the gateway device 10 and the service management center network 50 utilize keys or tokens for authenticating the gateway device, web service interface requests, and other services subscriptions, for instance, to verify that the gateway devices are valid users of the system and services. In one embodiment, the authentication keys (also referred to as tokens herein) are renewable and may change dynamically for each gateway device. For example, the authentication manager 71 or the like in the service management center 50 may generate updated keys or tokens for all or a selected number of gateway devices, notify those gateway devices periodically or at predetermined times, to retrieve the new authentication keys. In another embodiment, the gateway devices themselves may request the authentication manager or the like to provide a new or updated key. Yet in another embodiment, the updated keys may be pushed to gateway devices. This way the keys or tokens are periodically refreshed. Such dynamically changing keys enhance security, for instance, making it difficult for hackers to track the changing keys.

Each gateway device 10 may have more than one authentication key, for instance, for different purposes. For example, there may be different keys or tokens for allowing access to different services or features provided by the gateway device. Thus authentication keys are also referred interchangeably as service keys or tokens. These service keys may also dynamically change and are renewable. In one embodiment, the gateway device receives the service keys or tokens when individual services are provisioned on the gateway device. Thereafter, the service keys may be updated to change periodically, at a predetermined intervals, or regular intervals. The keys or tokens themselves, in one embodiment, may be hardware based key. In another example, they may be implemented independent of the hardware they are being used on.

Web Services Interface

In an example, the service management center network 50 may also provide web services interface functionality (for example, shown at 90 in FIG. 5) that forms an application programming interface (API) between the gateway devices 10 and the service management center network 50 as a mechanism to communicate between the gateway devices and the service management center network. That is, in addition to the established signaling control channel, the gateway devices 10 and the service management center network 50 may utilize web services interface 90 to communicate. For instance, the gateway devices 10 and the service management center network 50 may exchange information via secure HTTP or HTTPS using SOAP, XML, WSDL, etc. or the like.

In one example, an authentication key is used or embedded in the message in order to validate the communication between one or more gateway devices 10 and the web services interface functionality 90 in the service management center network 50. In one embodiment, the gateway device 10 may request from the service management center network 50, for instance, from its authentication manager functionality 71, a temporary key, which is to be used when the gateway device 10 requests services via the web services interface 90. Preferably, this key is not a service specific key, but rather identifies a particular gateway device 10 to enter the service management center 50 through the web services interface 90. Every time the gateway device 10 requests a key, the authentication manager 71 functionality may store the key and the expiry time of the key. A response message provided from the authentication manager 71 has the key and expiry time. In one example, gateway devices 10 are responsible to determine a status of the key compared to the expiry and to request a new key before the expiry time. In another embodiment, the web services interface authentication key may be assigned during initial registration and may be renewable as described above with reference to dynamic renewable authentication and service keys.

The web services interface 90 subsequently directs message requests to the appropriate functionality in the service management center network 50. The incoming requests may be load balanced in one embodiment by the DNS server 69, and loading and performance information may be fed back to the DNS in support of this function. The web services interface 90 may have interfaces (e.g. APIs) to the gateway device 10, the authentication manager functionality 71 of the service management center network 50, DNS 69, the service managers 75 of the service management center network 50, etc.

In an exemplary embodiment, a gateway device 10 may utilize the web services interface to pull data, software or information from the service management center network 50, while the service management center network may utilize the signaling control channel to push data such as various notification data to the gateway devices. In an example discussed more below, the subscription manager 73 notifies the gateway device 10 of configuration data applicable to a service subscribed to by the customer associated with the particular gateway device. If the gateway device 10 determines that it needs the configuration data (not yet resident or not up-to-date), then the gateway device 10 sends a request to the web services interface 90, which is forwarded to the appropriate service manager 75. The service manager 75 in turn sends the configuration data to the gateway device 10 for loading and future use. A similar procedure can be used to download software, e.g. from a gateway updater or other firmware server based on a descriptor from the subscription manager or a published notification from a Pub/Sub server.

Gateway Device Registration and Service Subscription

In one example, the service management center network 50 further includes provisioning manager functionality 74, which may handle gateway device registration and subscription activation. FIG. 7C depicts conceptually the process of subscriber provisioning in one embodiment. The provisioning manager functionality 74 may interface to 3.sup.rd party order entry or provisioning system 160 that is enabled to accept purchase orders for gateway devices and services provided therein. In another aspect, the provisioning manager 74 may interface with a user interface provided in the service management center network 50 for entering and accepting such orders. Thus, for example, gateway device registration or subscriber provisioning may occur through an internal customer service representative user interface application, or a customer/subscriber self-provisioning web application, or through a partner service provider application interface. Other registration methods are possible and they are not limited to those listed methods. For instance, the first time registration may occur during power-up and initialization stage as explained above, or any other way.

In each instance, the subscriber information may be input via the provisioning manager 74 or the like functionality. As will be described in more detail, provisioning input may include attributes such as the gateway device identification information, user information, and service plan information. In one embodiment, the provisioning input data including subscriber provisioning action/data may be classified as accounting/business and operational data and may persist in the provisioning manager 74 as shown at 162. This may be an optional step, for example, where partner service providers have their own existing systems.

Examples of subscriber information include, but are not limited to the following. In addition, not all information is required as subscriber information. Examples are subscriber name, address, billing information, email, phone, social security number (SSN), etc.; gateway device ID, e.g. MAC address, FQDN such as e.g. johnsmith@rosservice.com. This data may be generated and may have different domain base depending on the provider. This ID may be called the JID (jabber ID) or BIT) (Box ID) or Family ID); a subscriber unique ID (Internal Generated Number); an assigned gateway device serial number (the serial number may be an external identifier of the gateway device); a gateway device model number (e.g. to link the software, configuration to the model); a user access password (this may be different from the gateway device access key which is operational system generated); a user service/gateway device binding identifier (this may be generated by the system and mailed to user); a locale/region identifier; a list of the subscribed services, e.g. voice, video, remote access, backup; a list of service specific features, e.g. voice—call forwarding allowed, voice feature 2, etc.; a list of service specific user details, e.g. voice—DN, etc.; Backup—Max GB, Max Bandwidth, etc.

In a further step, as shown at step 163, FIG. 7C, the added gateway device and/or user, e.g. new subscriber, is added to the authentication manager functionality 71. Thus, for example, the authentication manager functionality 71 may maintain the following subscriber information/data for authenticating users and their gateway device devices 10: the JID/BID; the gateway device's serial number; a user access password; a user service/gateway device binding identifier; the subscriber active/disable status; the gateway device hardware ID; a subscriber/hardware binding: BOOL; a Web interface access key; and associated Web interface access key validity time.

In a further step, as shown at step 164, FIG. 7C, the added gateway device and/or user, e.g. new subscriber, is added to the subscription manager (server or functionality or the like) 73. Thus, the subscription manager 73 for example may maintain the following subscriber information/data for providing subscription information to gateway devices 10: the model number, the JID/BID or the like to be able to create and distribute the right package of meta information and to identify the firmware ID, configuration and configuration data to the gateway device. Additional exemplary data made available at the subscription manager 73 may include, but not limited to: user ID; gateway device serial number; the gateway device model; the subscriber locale current gateway device firmware version: and, a list of services and enabled features, for example:

Service 1
    Enable/Disable
    Feature 1 Enable/Disable
    . . .
    Feature N Enable/Disable
      Current Configuration Version
Service 2

Enable/Disable
    Feature 1 Enable/Disable
    . . .
    Feature N Enable/Disable
      Current Configuration Version
    . . .
Service N
    . . .

In a further step, as shown at step 165, FIG. 7C, the added gateway device and/or user, e.g. new subscriber, is added to one or more service manager (servers or devices or functionality or the like) 75. Service data maintained at the service manager 75 may include, but is not limited to information identifying: configuration files, e.g. voice: dial plans; parental control: black lists, etc., for the application services and features thereof subscribed to by the customer associated with a gateway device 10. This data may be in database or versioned files stored on disk. Optionally, the following subscriber data may be maintained at the service manager 75: the gateway device's JID/BID; the provisioned subscriber data for each service (e.g. a list comprising Data 1, Data 2, etc.); and the generated subscriber data for each service (e.g. a list comprising Data 1, Data 2, etc.). It is understood that some services are basic services and some services may not have subscriber data at all. Thus, as an example, if implementing provisioning of Backup Services, the service management center network 50 may generate the following account on behalf of the subscriber: Backup Acct ID, KEY. The provisioned subscriber data and generated data are communicated to the gateway device 10.

In a further step, as shown at step 166a, FIG. 7C, the added gateway device and/or user, e.g. new subscriber, is added to a SIP directory server or like functionality 66 and, additionally, to the Session Border Controller device 93a or like functionality, as shown at step 166b. For example, the SIP directory server 66 may be provisioned with data such as the SIP user identifier (e.g. www.gw10.ros.com); associated gateway DN numbers; and, any other data as may be required by the Session Border Controller device 93a, e.g. realm data or, location data for the endpoint device. Additional service data that may be provisioned may include: OFFNET/ONNET DN Numbers; and, other SIP Service specific data.

In a further step, as shown at step 167; FIG. 7C, the added gateway device and/or user, e.g. new subscriber, is added to the publication/subscription (Pub/Sub) server or like functionality 65. The new subscriber information maintained at the Pub/Sub may include the subscriber for gateway device software/firmware update events and for service configuration/locale events, e.g. U.S. dial plans, parental controls, etc. The Pub/Sub server 65 may maintain various event channels and the content for event channels (i.e. events per channel) and subscribed users for the event channels (i.e. users for channel).

In a further step, as shown at step 168, FIG. 7C, the added gateway device and/or user, e.g. new subscriber, is added to the billing sub-system server 58 or like functionality. The new subscriber information maintained at the billing sub-system server may include, but not limited to: the subscriber name; address; billing information; email; phone; SSN; user ID, e.g. johnsmith@rosservice.com; a subscriber unique ID (Internal Generated Number); an assigned gateway device serial number (the serial number may be an external identifier of the gateway device); a locale/region identifier; and, a list of the subscribed services.

In a further step, as shown at step 169, FIG. 7C, the added gateway device and/or user, e.g. new subscriber, is added to the Alarms, Diagnostics and Network Management server 85 or like functionality and alarm aggregator sub-system. The new subscriber information maintained at the Alarms, Diagnostics and Network Management Server 85 may include: alarms; user identifier and other data required for alarms management system; and, diagnostics.

Thus, the provisioning functionality or the like 74 generally provides provisioning services to all service management center network elements. The managers 74 may send and receive provisioning information via a gateway interface (e.g. APIs) to and from 3.sup.rd party provides such as wholesale VoIP and backup service providers. The provisioning managers 74 may also send to and receive from the branding customer service provider (aka "North Bound" interfaces). The provisioning manager may provide a graphical user interface for service provider users and customer users to order; initialize and provision services. The provisioning manager further may distribute the order or provisioning information to the following functional elements: subscription manager; authentication manager servers; service manager(s); SIP directory server; Pub/Sub servers; VOD(s); CAs; billing system; firmware update manager; location server; the NWM SBC's; content provider(s); and wholesale providers via the gateway interfaces (APIs).

While the provisioning service or functionality was described with respect to registering new gateway devices or subscribers, functionality for provisioning new services for existing users or gateway devices may be provided in the similar manner, for example, by the provisioning manager server 74 or like functionality.

Automatic Discovery and Configuration of Endpoint Devices

In one embodiment, a customer or user self-provisions endpoint devices on a particular multi-services gateway device 10. The provisioning system or like functionality 74 may provision how many endpoints and the types of devices that can be self-provisioned by the user. In one embodiment, the gateway devices are capable of automatically discovering and configuring the gateway device compatible devices belonging to enabled services in the premises such as the home or business, for instance, with minimal human intervention (e.g. for security purposes some devices may need administrator level prompting to proceed with configuration actions). For instance, the gateway device compatible endpoint devices are devices that the gateway device can communicate with and thus become the center of management for the services offered through these, endpoint devices. One or more of these endpoint devices may have automatic configuration capabilities such as universal plug and play (e.g. uPNP devices). These endpoint devices may include but are not limited to, media adaptors, SIP phones, home automation controllers, adaptors that convert IP interfaces to PSTN FXO and FXS interfaces, etc. In one example, the method of configuration, e.g. automatic discovery and configuration may be based on the specific device's current firmware or software or like version. The gateway device 10 in one embodiment also may keep a record or table of configuration information, for example, for those devices configured automatically. Such information may include, for example, for media adaptor, supported formats and bit rates, for home automation controller, information pertaining to the type of controller such as Insteon, Awave, etc.

As another example, if the phone service is enabled and if the gateway device detects a new SIP device, the gateway device 10 may prompt a user to determine if the detected endpoint device needs to be configured for association with the gateway device. If it does, then the gateway device 10 may configure the detected device on its network (home network or other premises network). Yet as another example, when new drives are added to the gateway device for storage expansion, the gateway device 10 may automate initialization of the expanded device storage.

Subscription Management

The gateway device 10 may request information from the service management center network 50 for services that the gateway device 10 is subscribing to, for example, during initialization stage as mentioned above or at any other time. The service management center network 50 contains subscriber and gateway device identification details. Thus, the service management center network may respond to the request with the subscription information and version numbers for various configuration data needed for the services that are subscribed. FIG. 7B illustrates how a gateway device 10 establishes a service subscription request (service/request check), for instance, via the TCP/TLS/XMPP control channel 150 to the service management center 50. This service/request check may be available to ensure that the multi-services gateway device 10 is in sync with the network provisioning and subscription management systems as to what type(s) of services are allowed for the user. This results in finite and real time control of services allowed by the gateway device for a user, by the application service provider via the service management center 50. The service check may also be useful to keep track of service configuration data and/or the firmware/software of the gateway device 10, and to keep the same software base irrespective of the country/region, but have the ability to load configuration/customization information per user based on locale or other criteria.

As an example, during the multi-services gateway device initialization process, the multi-services gateway device 10 queries the subscription manager 71, for example, via the control channel, to determine what services and features are enabled for the multi-services gateway device 10, i.e. based on subscription by the associated customer with the application service provider. The service management center network 50, for example, using its subscription manager functionality 73 responds with a descriptor including the subscription information associated with this particular gateway. Examples of data that subscription manager functionality 73 may store in one embodiment May include but not limited to JID/BID, gateway device model number, services subscribed to, features subscribed to per service, revision exception list, for each gateway device. The multi-services gateway device 10 checks the received subscription information such as version information against the current versions resident on the multi-services gateway device 10. If the multi-services gateway device 10 determines that the versions are different, it may start initiating one or more downloads of the configuration data through web services interface 90 and the applicable service manager(s) 75. Preferably, the multi-services gateway device's firmware and service configuration are implicit subscriptions and hence the multi-services gateway device 10 will receive notifications via the Pub/Sub server 65 when new versions of software and/or service configuration data are available. The new version notifications indicate the version to download, and the same logic of version checking is performed in the multi-services gateway device 10. When downloads are complete, the multi-services gateway device 10 subsequently enables the subscribed services and features.

The subscription manager functionality 73 also informs all requesting service management center network elements what services and features are enabled on a particular gateway device 10. The subscription manager functionality 73 also determines what service specific configuration data needs to be downloaded to the requesting multi-services gateway device 10. In an exemplary embodiment, the subscription manager functionality 73 determines the data needed by interacting with service manager functionality 75, which stores and distributes specific configuration data for services. The subscription manager functionality 73 may interface to the multi-services gateway devices 10 (e.g. indirectly) and the following functionalities of the service management center network 50: message routers and session manager(s), the accessibility server, the service access test mangers, the provisioning manager, the NWM, VOD's, CAs, pub/sub, service manager server and billing subsystem. The subscription manager functionality 73 may additionally support some internetworking to other service providers via the gateway interfaces.

In one example, the service management center network 50 includes service manager functionality 75 for each specific service. The service manager functionality 75 may store and distribute service specific configuration data for each supported service on a per multi-services gateway device basis. Thus, service manager functionality 75 may include service specific configuration managers for voice, back-up, or any other services that are provided by the center 50 and the gateway devices 10. Examples of this configuration data include, but are not limited to, VoIP configuration data such as location-related dial plan information and content/media configuration data such as URL links, etc. The service manager functionality or servers 75 work with subscription manager functionality 73 to resolve multi-services gateway device version requests and ensure that the multi-services gateway devices 10 have the correct version of configuration data. In one embodiment, there is a service manager for each supported service. In addition, there may be a service manager or like functionality for storing and distributing baseline multi-services gateway device configuration data. Subscriber data per service may exist inside the service manager and also, stored directly in the service component, e.g. SIP Redirect/SBC device. The service managers 75 or the like functionality or servers or devices may interact with the subscription manager 73, provisioning, NWM, Web services interface 90, Pub/Sub, message routers and multi-services gateway device. Additionally, third party wholesale providers, such as a backup service, may interface to the service managers via a gateway interface or an API.

In an exemplary application for gateway device services, data and/or software are distributed to the gateway device 10 to enable it to provide various services. Configuration data is provided to the gateway device 10 from the service management center network 50. For instance, subscription manager functionality 73 of the service management center network 50, for example as part of initialization process, queries the service managers functionality 75 to obtain configuration data that can be sent to the gateway device 10 and which versions from configuration perspective to report back to the gateway device 10. Such configuration data may include a web service interface URL of the service manager 75 for where the gateway device 10 should communicate. The subscription manager functionality 73 then sends the metadata of the configuration data, that is, information associated with the configuration data back to the gateway device 10. The gateway device then may update its configuration if needed by accessing the service manager functionality 75, for example, via the web services interface 90 using the URL, and retrieving the needed configuration data from the service manager(s) 75. In another embodiment, the service management center network (e.g. service manager functionality) may push the needed data to the gateway device 10 via the signaling control channel. For each service, the service management center network 50 provides configuration data to the gateway device (e.g. via service manager functionality) and posts a notification if new configuration data is required. When the user invokes the service, the gateway device 10 will thus know all that it needs to invoke the service. For instance, data that the gateway device needs may be obtained from the service manager functionality 75. Login information and keys may be obtained from manager for a particular service, e.g. for service keys.

Figure 9A:
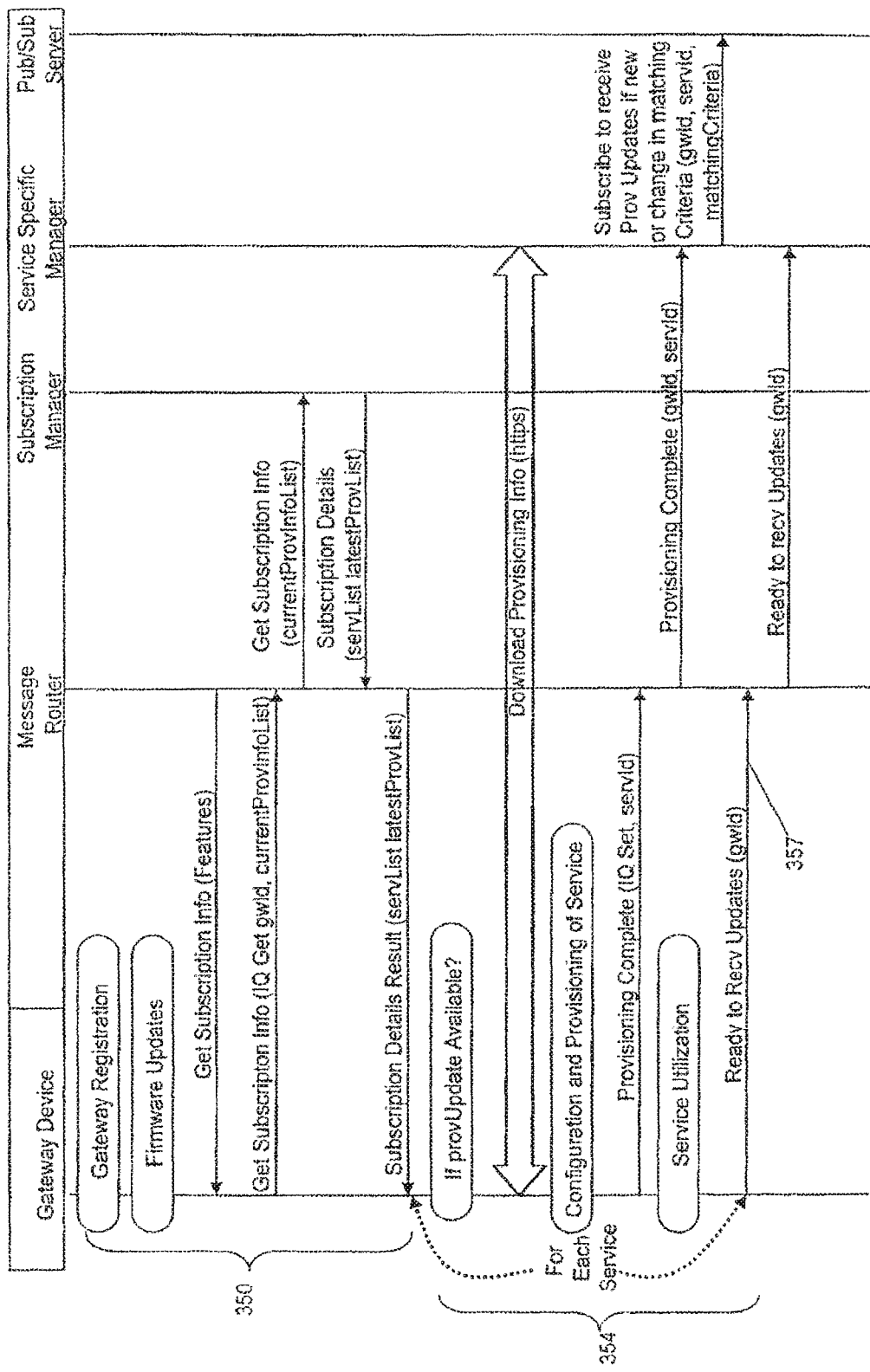
FIGS. 9A-9B illustrate details of service provisioning.

FIG. 9A describes details regarding provisioning service onto the gateway device, in one example. A gateway device 10 at step 350 initiates a sequence to obtain its subscription information and determine whether any updates of configuration data and/or software are available. In the illustrated example, the query is launched in response to an instruction from the service management center, although the gateway device could launch the query under other circumstance. A subscription information query is communicated from the gateway device, for example, via the control channel to the message router 62, which is forwarded to the subscription manager server 75. The subscription manager server 75 provides a service descriptor message containing the subscription details (such as service list and latest version list) back to the router 62, which in turn forwards the descriptor message to the gateway device 10. The gateway device 10 makes a determination whether any updates are available and if so, a service specific manager 75 is employed to download the provisioning and configuration information to implement that subscribed service at the gateway device 10, for example, by communications using the web services interface 90. An example of a sequence for downloading of the information for the subscribed-to services and initializing the subscribed-to services as well as the handshaking signals upon completion as may be performed for each service is shown at 354, FIG. 9A. At the end of the sequence, a notification is sent to a Pub/Sub server 65 or like functionality to register that the gateway device 10 has subscribed to receive any new provisioning updates. For instance, a registration for updates may include the gateway id, service id and matching criteria, which generally tells the pub/sub that if there are changes that match the matching criteria in the service identified by service id, to notify the gateway device identified by the gateway id. The gateway device 10 may optionally send a message for the Pub/Sub server 65 that the gateway device 10 is ready to receive future updates as shown at 357.

Pub/Sub and Updates

As previously mentioned in view of FIG. 5, the Publisher/Subscribe (Pub/Sub) server or like functionality 65 accepts and maintains subscription requests for gateway device upgrades and device upgrades from networked services support elements, and particularly, from every gateway device 10 in the system. Networked elements communicate with the Pub/Sub system or like functionality and publish information that other elements may have subscribed to. The Pub/Sub matching engine matches the published information with users (typically gateway devices) that have subscribed for notices of new specific information. If the Pub/Sub matches a "pub" (publish) with a "sub" (subscription), a notification message is sent, for example, via XMPP protocol or like peer and presence messaging protocol on the signaling control channel, to the subscribing user, notifying them of the new information.

Figure 7D:
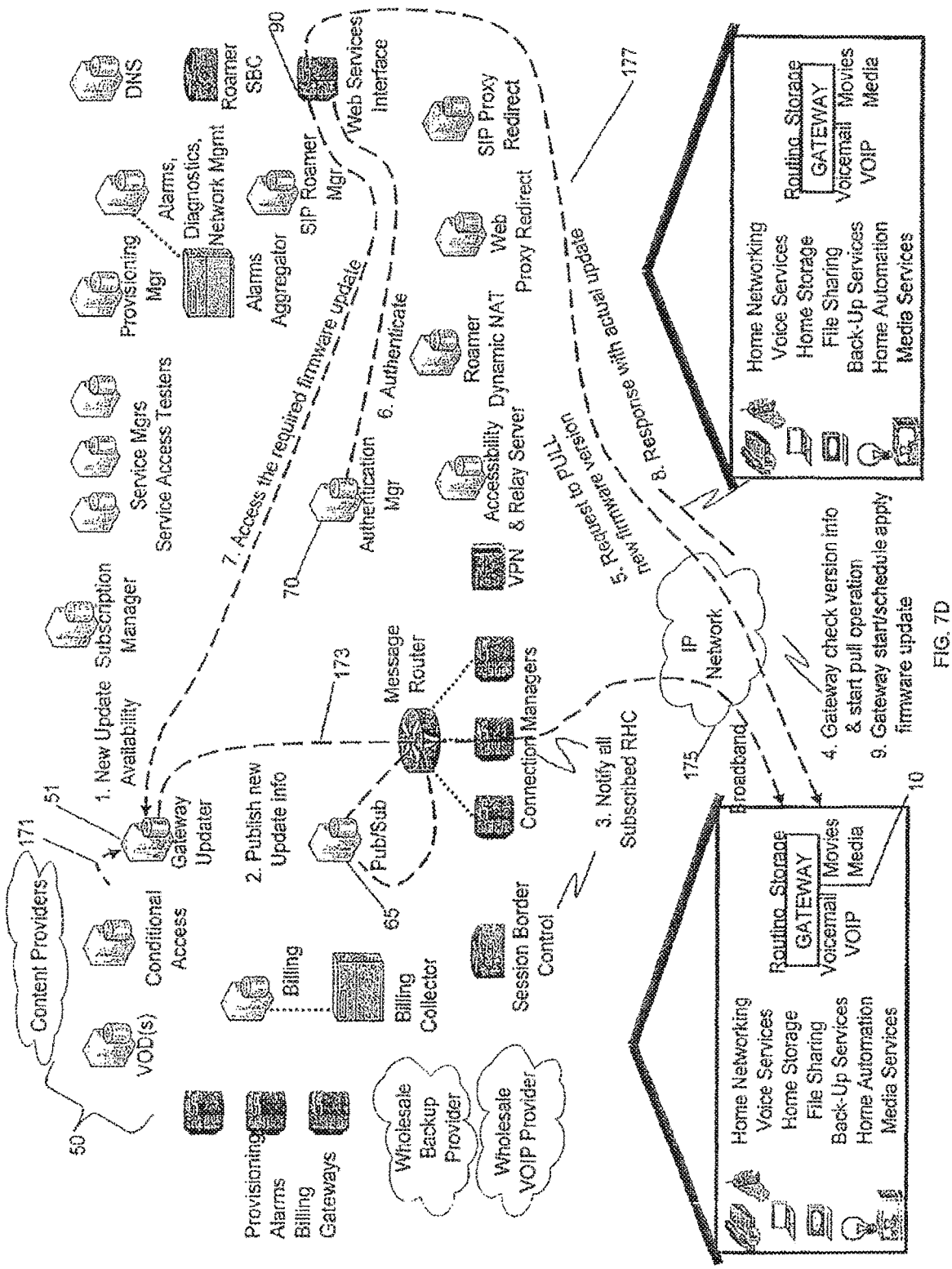

FIG. 7D highlights how the gateway device 10 and the service management center network elements utilize the signaling control channel and the Publisher/Subscribe (Pub/Sub) function to subscribe for notification of certain events and publish notification of these events in one embodiment. In this high-level example, the gateway device subscribes for firmware or software updates for the gateway device or endpoint devices that it connects, and is subsequently notified when such an event occurs. It is understood that the Pub/Sub system provides subscription and publication matching and notification services for both the gateway devices and the networked service management center elements or functionalities. Thus, the logical Pub/Sub device 65 may have interfaces to all elements that use this mechanism to communicate with each other including, for example, firmware update manager 51, provisioning manager 74, authentication manager 71, service manager(s) 75, subscription manager 73, and the gateway devices 10.

In the scenario depicted in FIG. 7D, the updater 51 with knowledge of updates to gateway firmware or software or the like, endpoint device firmware or software or the like, or service configuration files or the like, may publish the update information to the Pub/Sub server or like functionality 65, for example, as shown by the route 173. The gateway updater 51 may receive a message or notification at 171 that updates are available from other sources. Additionally, various service managers (or like functionality) 75 that handle specific services and associated configuration information and data may publish information in the Pub/Sub 65 that updates are available for those services. Thus, in one embodiment, update manager functionality 51 may publish information on Pub/Sub 65 as to the availability of updates for gateway devices and endpoint devices. Similarly, specific service managers or like functionality 75. May publish information on Pub/Sub 65 as to the availability of updates for the respective specific services.

In one example, the update notice published by the updater 51, service managers 75, and/or other software/firmware update manager 51 may include, but is not limited to, new configuration version information for latest firmware or software for the specific service or devices. A matching engine functionality of the Pub/Sub server 65 identifies the gateway devices 10 that are subscribed to receive these particular updates (e.g. for a specified application service or related feature), and generates and sends a notification message 175 to those identified gateway devices that updates are available, for example, via IM-like messaging (or any other presence and peering protocol) over the public Internet.

FIG. 7E shows at step 260 the gateway device receipt of a notify message indicating the published software or configuration update with regard to a particular application service or feature thereof, either for the gateway device or for a digital endpoint device. At step 262, the gateway device 10 makes a comparison against the current version(s) and, determines if the update is needed. If the update is needed for application service software, for example, the gateway device 10 initiates a pull operation to retrieve the software update, for example, over a secure HTTPs connection at step 265 and, may start or schedule application of the software update to its resident firmware at step 267. In one embodiment, a descriptor package in the published notification message helps the gateway device interpret the command to obtain the software update, e.g. at a certain location in the networked service management center. In an orderly manner and optionally in a secure manner, e.g. via HTTPS protocol, each of the subscribing gateway devices 10 may seek out where in the network the published software update resides and once authenticated, via authentication manager server or like functionality, it will retrieve the software. Referring to FIG. 7D, from the service management center network perspective, a request is received from each of the gateway devices 10, for example, via a web services interface 90, to pull the new software version. In one embodiment this may be take place according to a schedule or priority basis. Then, an authentication process is performed, for example, via authentication manager 71, and once the gateway device 10 is verified, the available software update may be pulled from the updater functionality 51 (or from individual service managers or firmware update manager or like), and forwarded to the gateway device as shown at 177. A similar approach to Pub/Sub notification and pull-down may be used to distribute updates of configuration data, for respective application services and/or features thereof, as will be discussed in a later example.

As mentioned above, consumers may subscribe for updates to digital endpoint devices connected to the gateway device 10 as well in one embodiment. For example, a user has a certain type of phone 40 and, if there is an update, the Pub/Sub notification functionality 65 will notify the gateway device 10 of the updates available for that phone type. Thus, all of the gateway devices that have that phone 40 will be informed with service upgrades. In one embodiment, matching engine functionality of the Pub/Sub sends notifications of all the update information concerning operation of the phone device 40 to the subscribers and/or notifies the matching gateway device (that is, the gateway device 10 determined as having this type of phone 40 as one of its endpoint devices) of updates, for example, via signal control channel (e.g. using XMPP), for example, when news or updates are received for this particular phone. The matching engine of the Pub/Sub determines all of the subscribers that are subscribed for that service and will put out update notifications to all of the identified subscribers' gateway devices.

Thus, service managers 75 and/or update manager 51 publish update information availability to the Pub/Sub functionality 65, the gateway devices 10 subscribe to desired update publication services, for example, by registering the current versions of its configuration data and software/firmware to the Pub/Sub 65, and the matching engine functionality of the Pub/Sub 65 matches the published data with subscribing gateway devices 10 and sends a notification to each subscribing gateway device 10.

Figure 9B:
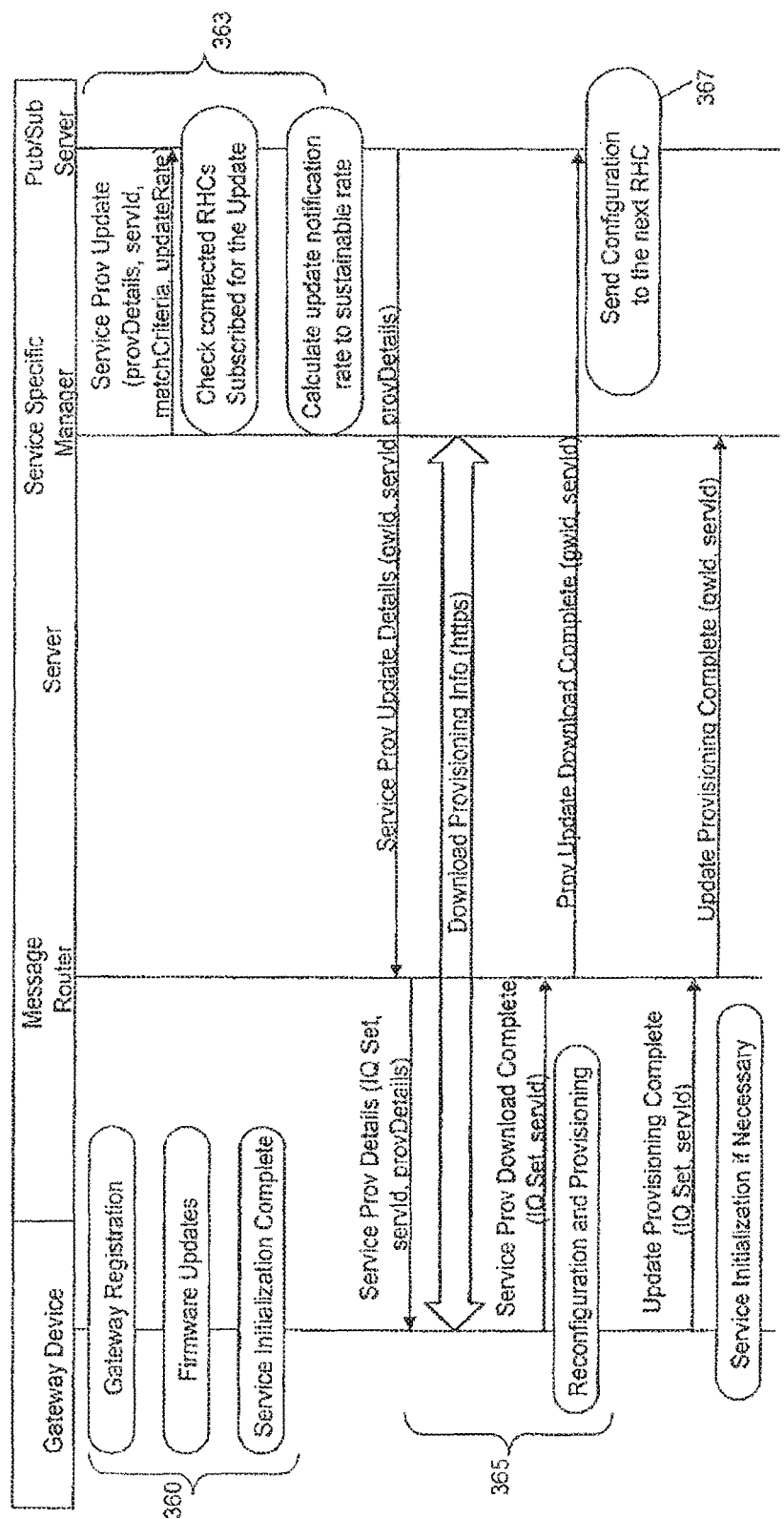

FIG. 98 illustrates a configuration data update push model in one embodiment. As shown in FIG. 9B, it is assumed that at step 360, the following steps have been performed: gateway registration, any software/firmware updates and that service initialization has been completed. At steps 363 the service specific managers or like functionality 75 publish a service provisioning update to the Pub/Sub server 65. The published information, for example, may include but is not limited to, body of the notification, service type, server id of the service manager 75 publishing the information, matching criteria which may include keywords that indicate service components for which the update is available, update rate information rate or schedule at which the update notification should be performed, for example, to mitigate the effect of too many gateway devices retrieving the updates all at once). The Pub/Sub server 65 optionally may check for the gateway devices 10 that have subscribed for this configuration data update and may calculate an update notification rate to ensure a sustainable rate. At steps 365, the Pub/Sub server 65 sends a message destined to all of the gateway devices 10 about the service provisioning update, for example, via a XMPP control channel. Once the update information download from the specific service 75 is complete, the service management center 50 is notified and the gateway device 10 is now responsible for the reconfiguring and provisioning of the gateway device with the new data for the particular service. As shown in FIG. 9B, the process may be repeated at 367 for each gateway device 10 subscribed to that service update.

In one example, the service management center network 50 may include a software/firmware update manager functionality that keeps the gateway devices 10 updated with compatible software and configuration information for the gateway's and the endpoints connected to the specific gateway device. This functionality is similar to the service manager functionality that handles configuration data and updates for specific services provided in the gateway device. The firmware update manager (FUM) component or the like functionality may utilize the underlying accessibility framework of the service management center network to reach the gateway device and interoperate with the in-home (in-premises) digital devices. In embodiment as mentioned above, the gateway devices subscribe for updates on behalf of its endpoint devices.

In one example, the firmware update manager or the like functionality and the gateway devices authenticate with each other prior to any transactions. The updates are generally performed automatically. The FUM sends a control signal to the target gateway devices and the gateway device schedules and pulls the data download from the FUM to the gateway device. In one embodiment, the FUM may maintain a database of all gateway devices and endpoints behind the gateway device, with firmware version information. This database is indexed based upon the unique identifier and account information for each gateway device. To provide this functionality, the firmware update manager may have interfaces to the gateway's, pub/sub, provisioning system, and network to management servers that may further request a "forced update" of endpoint or gateway software to the gateway device. The firmware update manager may have network gateway interfaces to other third party partners to gather updates for the partner endpoint devices connected to each gateway.

Figure 8B:
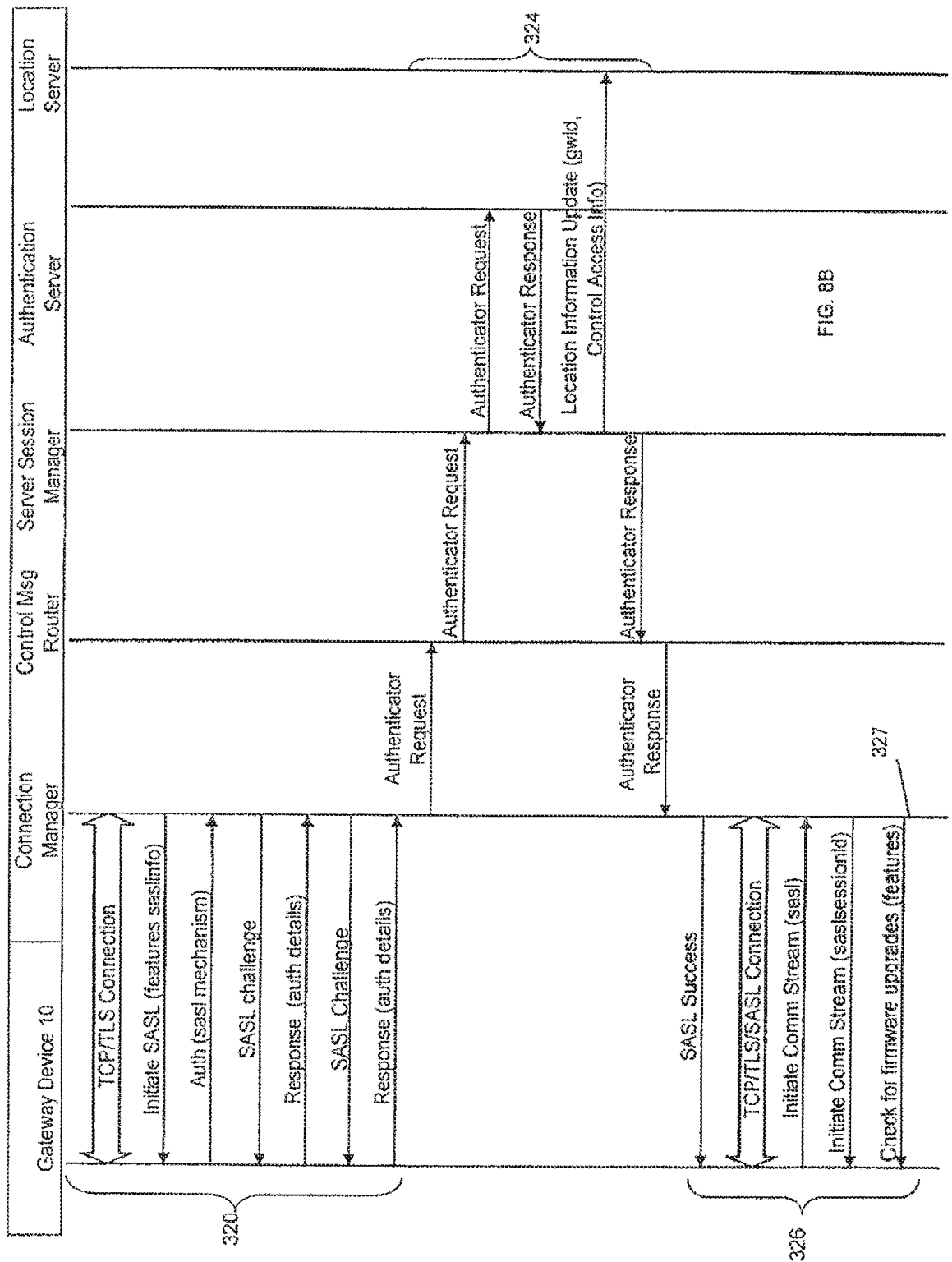
Figure 8C:
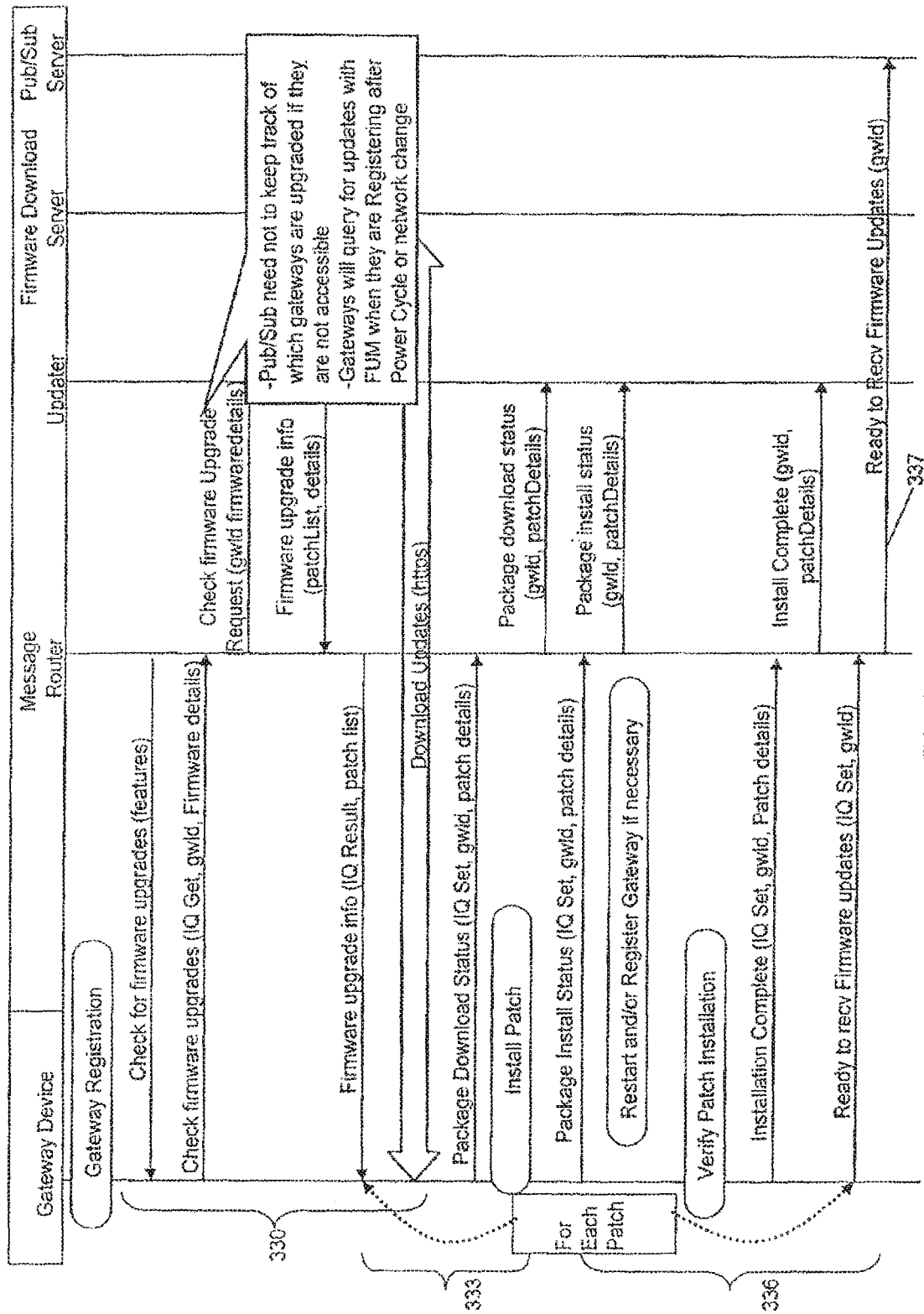

In one example, after device authentication as in FIG. 8B, as part of the gateway device registration process, the gateway device 10 may be instructed to query for its version status as indicated at 330 as shown at sequence 330 in FIG. 8C. The steps in sequence 330 include the instruction and communication of the query to the updater 51, including the software/firmware details of the particular gateway device 10 and associated endpoint devices. This information from the gateway device 10 is forwarded to the connection manager server 60 and sent to the upgrade manager to determine whether the gateway device 10 is performing with the latest software/firmware versions and proper upgrades. Any upgrades deemed necessary or available for the gateway device 10 are forwarded back to the control message router 62 and sent back to the gateway device 10 where the updates are installed. Optionally, a package download status sequence 333 may be initiated where the upgrade patch is installed at the gateway device 10. The gateway device may be reregistered or restarted and the patch installation is verified at step 336. As part of this sequence, the gateway device 10 generates a notification 337 that it is ready to receive firmware updates (e.g. future updates) which communications are forwarded to the publication/subscription (pub/sub) server of the services service management center network.

Figure 8D:
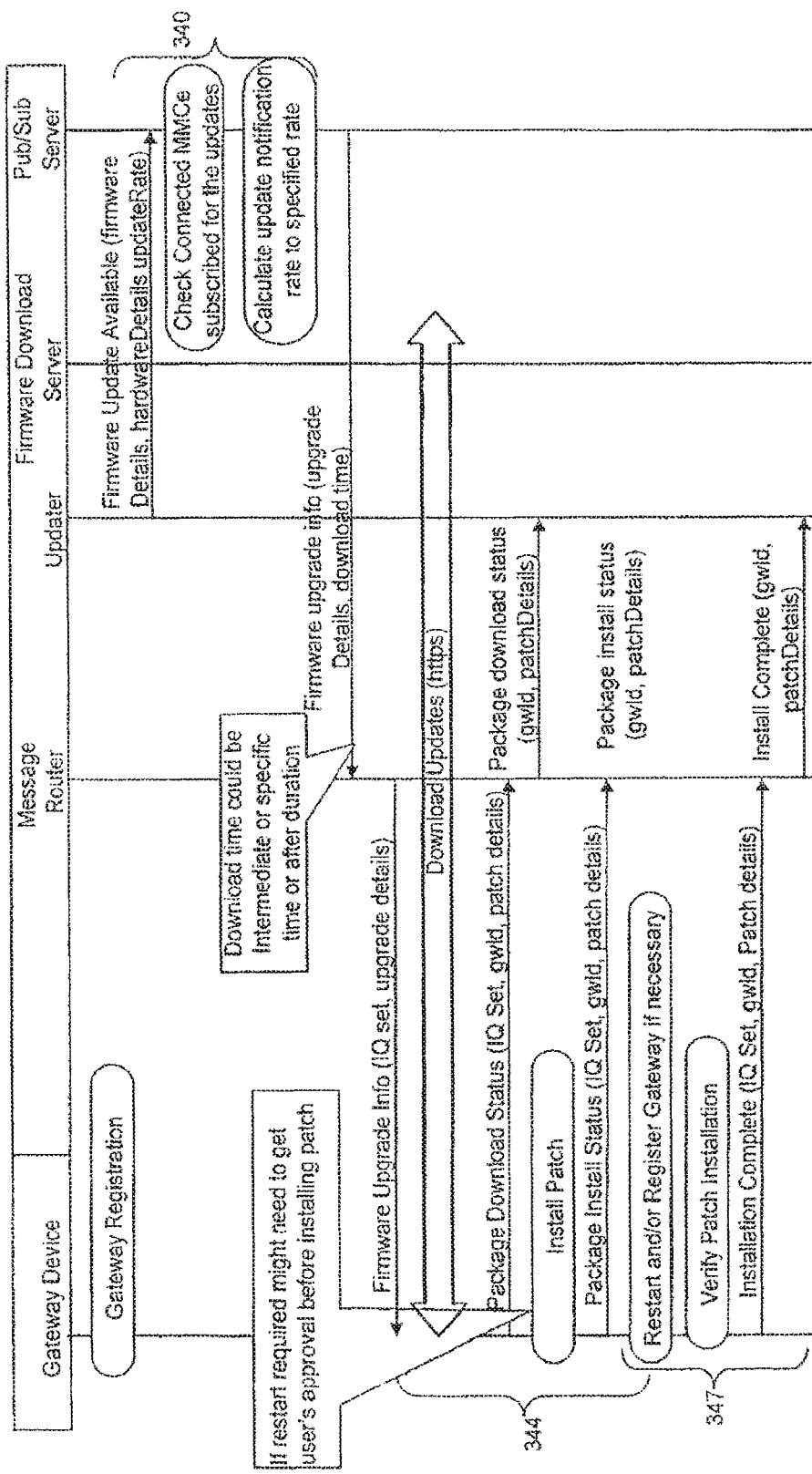

FIG. 8D illustrates software/firmware upgrading processing to connected gateway devices in one embodiment. As mentioned, the gateway device subscribes for certain endpoint software/firmware updates and is subsequently notified when such an event occurs. Thus, the processing illustrated in FIG. 8D may apply for endpoint devices upgrades as well as the gateway devices. At steps 340, FUM or like functionality notifies Pub/Sub server 65 or like functionality of the available updates. The Pub/Sub server 65 checks whether one or more connected gateway devices 10 is subscribed to that particular service upgrade. Optionally, the Pub/Sub server 65 may calculate the notification rate for providing the firmware update and sends the information back to the control message router which forwards the firmware upgrade information to the gateway device in the form of a data structure, for example, including but not limited to IQSet (a type of XMPP message), upgradeDetails (details for upgrade); downloadTime (time it takes to download the upgrade), timeToUpgrade (time it takes to install upgrade at the gateway device). The software/firmware updates are then downloaded from the appropriate download server, via, e.g. HTTPS connection, to the gateway device. Optionally, a package download status message may be sent to the component or functionality (e.g. FUM) from which the upgrades were downloaded shown at 344. Further after instilling the upgrade at the gateway device 10 or the associated endpoint device, package install status message may be sent to the FUM or like functionality to notify the status of the latest upgrade installation. The gateway device 10 may be reregistered or restarted and the patch installation verified. The gateway device 10 may also generate a notification 347 that the firmware upgrade patch has been completed which notice is forwarded to the FUM or the like functionality of service management center network.

Figure 8E:
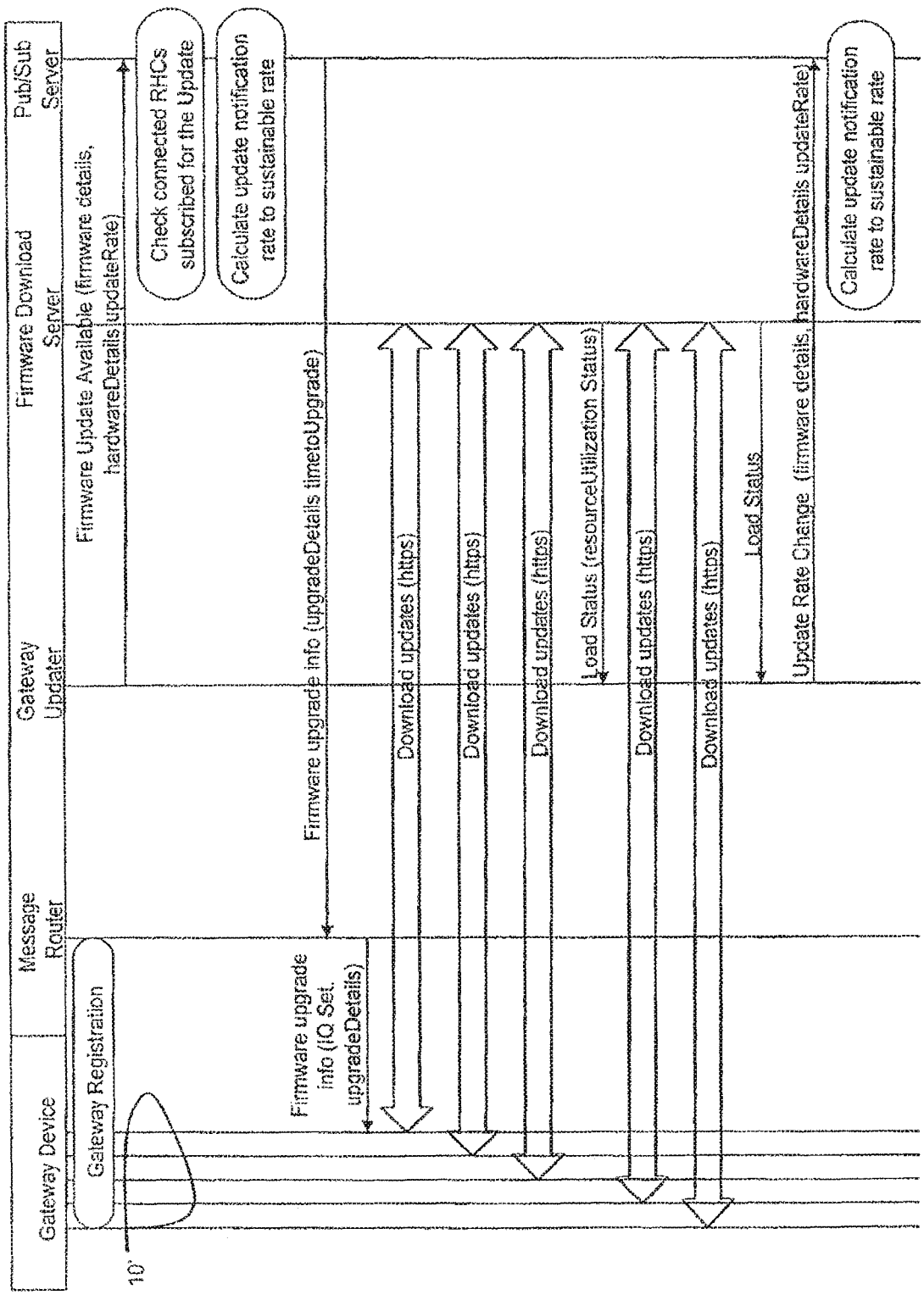

It should be understood that a software/firmware upgrade throttling mechanism may be provided such that, dependent upon the load status (resource utilization) as determined by the provisioning firmware download server, the firmware update rate may be modified on the fly. That is, as shown in FIG. 8E, when multiple gateway devices 10' are connected and each are subscribed to receive the firmware upgrades, the load status may be determined based on a resource utilization parameter from the firmware upgrades manager server. This update notification rate is then recalculated to a sustainable rate depending upon the update server load.

As described above, one or more gateway devices 10 communicate with the FUM or like functionality to download compatible software for itself and the associated endpoint devices. In one embodiment, the gateway device 10 is responsible for updating endpoint devices with the downloaded software. A user of the gateway device 10 may have an option that is configurable to have updates automatically downloaded when available or be prompted to initiate the download. For instance, when a new version of gateway device firmware is available, the FUM or like functionality notifies the gateway device either directly or via pub/sub. If the user is configured for automation, then the gateway device would initiate download of the firmware. If the user is configured to be prompted then the gateway device notifies the user and waits for an ok from the user. If the user agrees for the update then updater in the service management center would initiate a download of the firmware.

In one embodiment, once the software is downloaded, the gateway device performs the automated firmware upgrade to install the received software as part of its resident firmware, when indications are clear that the upgrade will not be interrupting other functions or services provided in the gateway device. For determining compatibility with other existing functions or services, the gateway device performs a basic set of "acceptance" tests to make sure that the subscribed services are still functional after the upgrade. This may be done, for example, referring to a matrix or table of information regarding compatibility or interoperability among software, firmware, hardware or like of various services, gateway device components and endpoint devices. In one embodiment, this matrix or table of information is received as part of configuration data from the service management center network 50, for example, during initialization procedure and during other communication session and may be maintained in the gateway device. In another embodiment, the compatibility test may be performed before the upgrades are downloaded, thus necessitating only the compatible versions of upgrades to be downloaded. The gateway device 10 in one embodiment has the capability to fall back to a previous release in the event of a software upgrade failure. In one embodiment as described above, FUM or like functionality keeps track of the various gateway devices that it communicates with and the firmware version on each gateway device 10. In another embodiment, FUM does not have knowledge of which gateway devices 10 need which upgrade. Rather, FUM simply publishes information regarding any updates to the pub/sub server or like functionality and it is up to the pub/sub server to notify the appropriate gateway devices.

Similarly, for the associated endpoint device a user may have the option to automate the download or be prompted to initiate the download when an update is available in the FUM, for example. For each gateway device 10, the FUM or like functionality may be responsible for tracking the software version status and upgrade availability for the endpoint devices that each gateway device communicates with. Thus, in one embodiment, the FUM or like functionality may maintain a matrix that may include, but not limited to the following information: the gateway device version; the services enabled on each gateway device; currently connected devices on each gateway device; the software version currently on each device; the software versions of the endpoint devices that are compatible with the existing gateway device version. When a new version of software or firmware for an end device that is supported on a gateway device 10 is available on the FUM or like functionality, the FUM may do the following for each gateway device: check to see if the new version is supported on the current version of the gateway device firmware; and if the new software load and gateway device version are compatible then FUM notifies the gateway device 10 if that endpoint device is supported on the gateway device. If the user is configured for automation, then the gateway device may initiate download of the endpoint device software. If the user is configured to be prompted then the gateway device 10 notifies the user and waits for an OK from the user. If the user agrees for the update then the gateway device may initiate download of the firmware. If the gateway device chooses to download the update, then the FUM or like functionality allows the gateway device to download the new version. Once the software or firmware or like is downloaded, the gateway device may perform the automated upgrade of the endpoint device when indications are clear that it will be not be interrupting the rest of the functions and services. The gateway device may perform a basic set of "acceptance" tests to make sure that the end device is still functional after the firmware upgrade in the similar manner described above with reference to the gateway device firmware upgrade. The gateway device also may have the capability to fall back to a previous release in the event of an upgrade failure.

In one example, as described above FUM or like functionality keeps track of the various gateway devices that it communicates with and the firmware version on each gateway device and/or its endpoint devices. In another embodiment, FUM does not have knowledge of which gateway devices need which upgrade. Rather, FUM simply publishes information regarding any updates to the pub/sub server or like functionality and it is up to the pub/sub server to notify the appropriate gateway devices.

With respect to FUM and specific service managers providing update and configuration information to various gateway devices and/or network elements, there may be a plurality of ways in which such notification may occur. In one embodiment, different methods may depend on different categories of configuration and upgrade data organized, for example, in the individual FUM or service managers or like functionality. For example, data may be classified into different categories such that for one class of data there should be notification available to all gateway devices and/or network elements. For this class of data, FUM or service managers or like functionality may publish the available information via the pub/sub functionality and allow Pub/Sub to determine which gateway devices or network elements should be notified and handle sending of notifications. Another class of data may be data that is directed to a subset of elements, for example, regional data that are directed to gateway devices located in certain regions or locales. For this type of data, pub/sub-feature may also be utilized. Yet another class of data may be data that is solely for a specific gateway device or network element. For this type of data, the service mangers or FUM or like functionality need not utilize pub/sub feature, rather the data may be communicated directly to the individual gateway device directly, for instance, using an XMPP control channel, or to the individual network element via interfaces.

Gateway to Gateway Device Communications

Figure 7F:
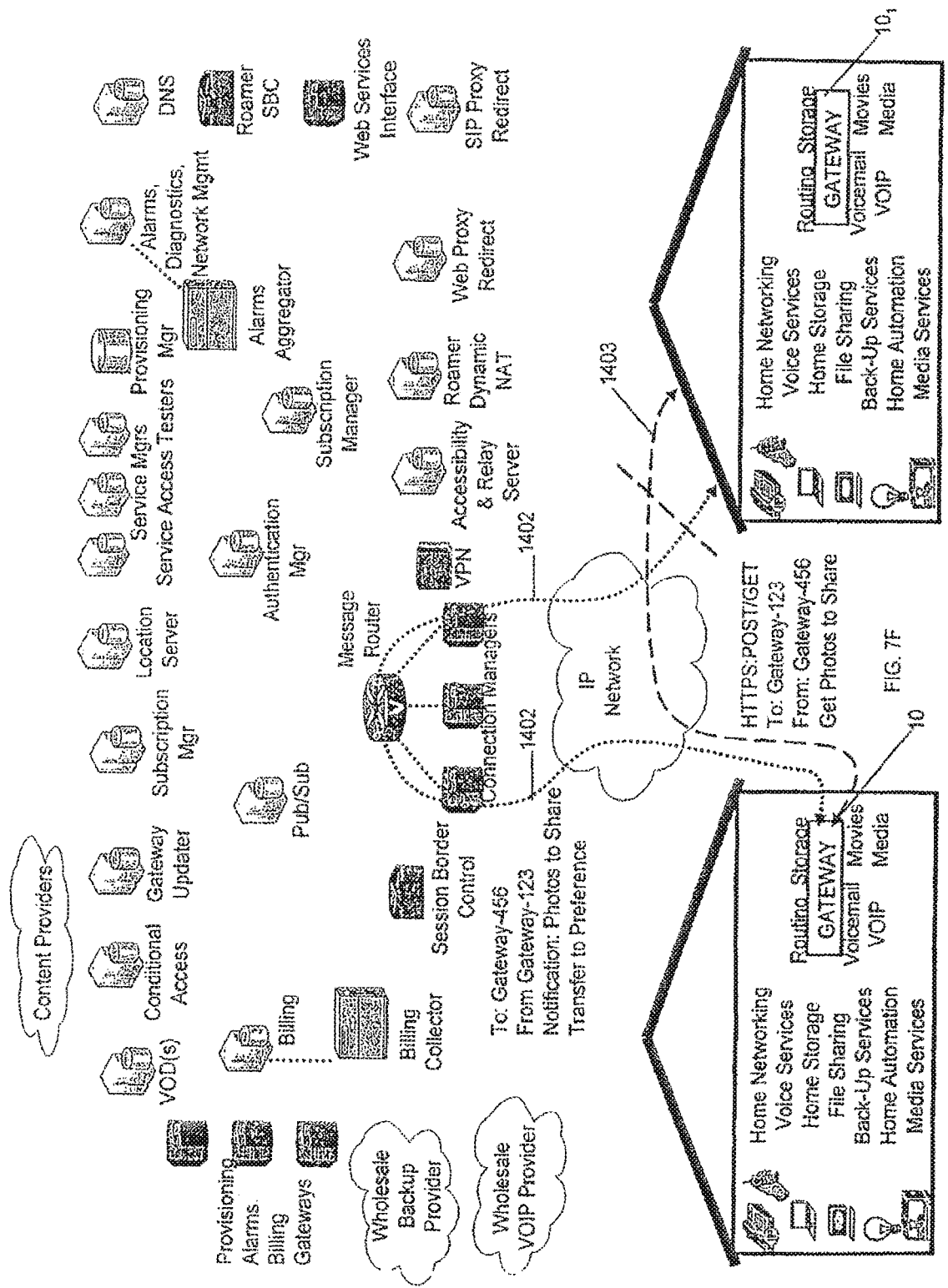

As mentioned earlier, the gateway devices and service management center support a communication capability between the appliances. This feature, for example, may be utilized for enabling secure peer-to-peer sharing of data between or among the gateway appliances. FIG. 7F is an architectural diagram, similar to FIG. 5, that illustrates an overview for communicating or sharing between the gateway devices. As shown at 1402, signaling information is communicated via the signaling control channels, for instance using XMPP. Then, the gateway appliances 10, 10.sub.1 negotiate the subsequent transfer of media over the data path, as represented logically by the dotted line 1403. In the example, this media or data need not travel via the signaling control channel. Thus, for example, a HTTPS path may be negotiated between the appliances 10, 10.sub.1. An example of a process or service using this "peer-to-peer" communication would be a file backup in which files are backed up on different gateway devices.

Additional aspects of the peering capabilities enabled by the gateway device-service management architecture include the ability to store a roster or contact list of distant gateways on either the gateway 10 or within the service management center 50 and utilizing these addresses to maintain the presence and routing information of selected other gateways. This roster information is used to establish and manage access and message routing, via XMPP messaging, to gateways, to locate and address other gateways, and set up peering relationships between the gateways.

A gateway may also expose other details about resources or endpoints within the home to other gateways by communicating resource information along with presence information. As an example, a gateway may send presence information to selected "buddies" via the signaling channel and also include information about the resources available to the distant buddy. Examples of resources include digital picture frames that the distant gateway user may direct photos to, web cams, or other resources, enabling direct interaction between an end user connected to one gateway, or in automated scenarios, the gateway itself, and a distant device connected to the local area network of another gateway.

When a user interacts with the resource sharing functions of their gateway 10, the user may select a specific gateway 10.sub.1 from their roster, represented as a "buddy" list. When the user selects a "buddy", additional resource details are displayed to the user, providing information about any resources that the end user may utilize via that selected peer gateway device 10.sub.1.

The XMPP messaging protocol, combined with the roster and XMPP addressing mechanisms may be utilized for either end user interactions or automated interactions between gateways. Automated use of the peering capabilities include directing utility data for usage and network management information to designated collectors within peering groups and then having the designated collector forward the combined information to the service management center. This distributes the collection processing to the gateways and decreases the overall processing and bandwidth utilization in the service management center. Of course, the XMPP protocol is discussed here merely by way of example, and those skilled in the art will recognize that the gateway to gateway device communications may use other protocols.

The gateway device 10 and its interactions with various endpoint devices and with the service management center 50 have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more of the enumerated elements of the service management center 50. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from the updater 51 a hardware platform for a gateway device 10 or from another source into an element of the service management center 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers to provide multiple application services independently. Application services are managed by the "managed" service provider through the service management center 50, meaning, generally, authorizing, provisioning, and monitoring the usage of a particular application service. This can be accomplished in, a variety of ways with varying degrees of involvement of, or coordination with, the service management center. The service management center 50 could manage these items "soup-to-nuts" or have minimal involvement. For example, the service management center 50 could deal directly with the third party provider to acquire application services at the request of a user and manage the delivery, authorization, usage-monitoring and upgrading of the application service. At the other end of the spectrum, the managed service provider may have arrangements with the third-party application service provider by which orders or requests from the users may come directly to the third-party application service provider, and services are delivered to the user by the third-party service provider who in turn coordinates with the managed service provider to register and monitor the particular application service placed in the gateway device 10. It should be noted that this ability to manage application services extends through the gateway device into the endpoint devices registered or associated with the gateway or network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A management device for operation at a user premises to manage one or more endpoint devices at the user premises, the management device comprising:
   one or more processors; and
   memory storing instructions that, when executed by the one or more processors,
      cause the management device to:
      provide internet-based calling services;
      communicate with at least one endpoint device at the user premises to at least partially manage media playing operations of the at least one endpoint device,
         wherein the managing the media playing operations is based at least partially on an analysis of user command data received via a device at the user premises other than the at least one endpoint device, and
         wherein managing the media playing operations includes providing user-responsive controls to the at least one endpoint device without requiring concurrent communication with a remote server, and
      deliver media based on the user-responsive controls, via at least one streaming application that is locally executed by the management device and that is in communication with a service provider remote from the user premises, to the at least one endpoint device at the user premises for presenting by the at least one endpoint device, wherein presenting of the media by the at least one endpoint device is subject to control by a mobile device at the user premises.

2. The management device of claim 1, wherein the instructions, when executed, further cause the management device to locally execute a plurality of applications that include the at least one streaming application.

3. The management device of claim 2, wherein at least two of the plurality of applications are managed based on data from two different service provides remote from the user premises.

4. The management device of claim 2, wherein the instructions, when executed, further cause the management device to manage at least one of authorization, authentication, configuration, or use of application services by the one or more endpoint devices.

5. The management device of claim 1, wherein the management device includes a router for communicating with the at least one endpoint device.

6. The management device of claim 1, wherein the instructions, when executed, further cause the management device to at least partially manage the at least one streaming application based on data from the remote server.

7. The management device of claim 1, wherein the media includes at least one of audio, video, or at least one still image.

8. The management device of claim 1, wherein the mobile device at the user premises is the device at the user premises other than the at least one endpoint device via which the user command data was received.

9. The management device of claim 1, wherein the instructions, when executed, cause the management device to locally implement call-processing at the user premises.

10. The management device of claim 1, further comprising a module having a processing unit and memory with instructions, that when executed by the processing unit, cause the module to provide voice processing for speech detection and voice-to-text.

11. The management device of claim 1, wherein the internet-based calling services enable the management device to receive voice calls over the internet or deliver voice calls over the internet.

12. The management device of claim 1, wherein the instructions, when executed, cause the management device to provide voice-responsive control of voicemail.

13. The management device of claim 1, wherein the internet-based calling services are voice IP telephone calling services.

14. The management device of claim 1, futher comprising:
   determinig an amount of resources of the management device executing the instructions; and
   implementing corrective measures to free up the amount of the resources, wherein the corrective measures include at least one of:
      prioritizing packets,
      throttling bandwidth,
      performing operations to reduce noise on an RF interface,
      freeing up time slices on a TDMA interface, or
      any combination thereof.

15. The management device of claim 1 wherein the instructions, when executed, provide at least one of home automation, home security, or voice control.

16. A computer-implemented method for managing one or more endpoint devices at the user premises, the method comprising:
   communicating with at least one endpoint device at the user premises to at least partially manage media playing operations of the at least one endpoint device,
      wherein managing the media playing operations is based at least partially on command data, from a user, received via a device at the user premises other than the at least one endpoint device, and
      wherein managing the media playing operations includes providing user- responsive controls to the at least one endpoint device without requiring concurrent communication with a remote server, and
   delivering content based on the user-responsive controls, via at least one application that is locally executed by a management device and that is in communication with a service provider remote from the user premises, to the at least one endpoint device at the user premises for presenting at least partially by the at least one endpoint device, wherein presenting of the content is subject to control by a mobile device at the user premises.

17. The method of claim 16, further comprising at least one of:
   locally executing a plurality of applications,
   managing interfaces related to the plurality of applications,
   implementing an application services framework, or
   managing platforms.

18. The method of claim 17, further comprising providing a plurality of different user interfaces via different endpoint devices, with respect to one or more of the locally executed applications.

19. The method of claim 17, further comprising managing at least one of authorization, authentication, configuration, or use of at least one of the applications by the one or more endpoint devices.

20. The method of claim 16, further comprising receiving the content from the service provider remote from the user premises.

21. The method of claim 16, further comprising manageing application specific resources provided by the management device to implement a request from at least one of the one or more endpoint devices without negatively impacting other management device services, wherein the application specific resources are concurrently accessed by other endpoint devices.

22. The method of claim 16, wherein the device at the user premises other than the at least one endpoint device via which the command data was received is the mobile device.

23. A system, comprising:
one or more processors; and
one or more memories storing instructions that, when executed by the one or more processors, cause the system to perform actions including:
providing internet-based calling services; and
communicating with at least one endpoint device at a user premises to at least partially manage media playing operations of the at least one endpoint device,
wherein managing the media playing operations is based at least partially on user command data received via a device at the user premises other than the at least one endpoint device, and
wherein managing the media playing operations includes providing user-responsive controls to the at least one endpoint device without requiring concurrent communication with a remote server, and
delivering content based on the user-responsive controls, via at least one application that is locally executed by a management device and that is in communication with a service provider remote form the user premises, to the at least one endpoint device at the user premises for presenting at least partially by the at least one endpoint device, wherein presenting of the content is subject to control by a mobile device at the user premises.

24. The system of claim 23, wherein the instructions relate to a plurality of applications and are on the user premises side of a logical demarcation between a wireless network and the user premises.

25. The system of claim 24, wherein the actions further include executing the plurality of applications and wherein individual applications of the plurality of applications are in communication with a respective service provider remote from the user premises.

26. The system of claim 23, wherein the contents are stored on the user premises side of a logical demarcation between a wireless network and the user premises, and wherein the system is configured to communicate, via the wireless network, with the remote server.

27. The system of claim 23, wherein the actions further include enabling support for television services and support for one or more networked home devices.

28. The system of claim 23, wherein the actions further include receiving at least a portion of the content from the service provider remote from the user premises.

29. The system of claim 23, wherein the actions further include delivering the content while at least partially managing operation of the at least one endpoint device based at least partially on the data received from the device at the user premises other than the at least one endpoint device via which the user command data was received.

30. A home media device comprising:
one or more processors;
one or more memories storing instructions that, when executed by the one or more processors, cause the home media device to perform actions including:
providing at least an internet-based calling service,
local voice processing for at least one of speech detection or voice-to-text, and
managing streaming at a user premises by communicating with at least one endpoint device, at the user premises, to at least partially manage media playing operations of the at least one endpoint device based on user command data received via a device at the user premises; and
delivering media to the at least one endpoint device at the user premises, wherein user provided controls for controlling the at least one endpoint device are provided by at least one application that is locally executed by the home media device in communication with a service provider remote from the user premises.

31. The home media device of claim 30, wherein the actions further comprise presenting the content subject to control by a mobile device at the user premises.

32. The home media device of claim 30, wherein the home media device performs the delivery of the user provided controls via one or more X10 communications, Z-Wave communications, and/or ZigBee communications.

* * * * *

UNITED STATES PATENT AND TRADEMARK OFFICE
CERTIFICATE OF CORRECTION

PATENT NO. : 11,032,097 B2  
APPLICATION NO. : 16/452249  
DATED : June 8, 2021  
INVENTOR(S) : Ansari et al.

Page 1 of 2

It is certified that error appears in the above-identified patent and that said Letters Patent is hereby corrected as shown below:

On the Title Page

On page 3, item (56), in Column 2, in "U.S. Patent Documents", Line 12, delete "8/2012" and insert -- 10/2012 --, therefor.

On page 6, in Column 1, under "Other Publications", Line 4, delete "aarXiV.org" and insert -- arXiV.org --, therefor.

On page 7, in Column 1, under "Other Publications", Line 11, delete "Applelnsider," and insert -- AppleInsider, --, therefor.

In the Drawings

On sheet 2 of 23, in Figure 2, Line 28, delete "Respnsibility" and insert -- Responsibility --, therefor.

On sheet 7 of 23, in Figure 4D, Line 5, delete "Transciever" and insert -- Transceiver --, therefor.

On sheet 20 of 23, in Figure 9A, Line 6, delete "Subscripton" and insert -- Subscription --, therefor.

On sheet 22 of 23, in Figure 10, Line 20, delete "Ethemet" and insert -- Ethernet --, therefor.

In the Specification

In Column 2, Line 17, delete "provider," and insert -- Provider, --, therefor.

In Column 3, Line 60, delete "and or" and insert -- and/or --, therefor.

In Column 21, Line 63, delete "SMPT" and insert -- SMTP --, therefor.

In Column 25, Line 48, delete "off of" and insert -- of --, therefor.

Signed and Sealed this  
Fourth Day of April, 2023

Katherine Kelly Vidal  
*Director of the United States Patent and Trademark Office*

CERTIFICATE OF CORRECTION (continued)
U.S. Pat. No. 11,032,097 B2

In Column 28, Line 1, delete "or" and insert -- for --, therefor.

In Column 31, Line 35, delete "PPoE" and insert -- PPPoE --, therefor.

In Column 31, Line 36, delete "PPoE" and insert -- PPPoE --, therefor.

In Column 39, Line 57, delete "version:" and insert -- version; --, therefor.

In Column 42, Line 49, delete "May" and insert -- may --, therefor.

In Column 45, Line 39, delete "75. May" and insert -- 75 may --, therefor.

In the Claims

In Column 54, Line 14, in Claim 13, after "voice" insert -- over --.

In Column 54, Line 17, in Claim 14, delete "futher" and insert -- further --, therefor.

In Column 54, Line 19, in Claim 14, delete "determinig" and insert -- determining --, therefor.

In Column 54, Line 34, in Claim 16, delete "the" and insert -- a --, therefor.

In Column 55, Lines 8-9, in Claim 21, delete "manageing" and insert -- managing --, therefor.

In Column 55, Line 39, in Claim 23, delete "form" and insert -- from --, therefor.

In Column 56, Line 44, in Claim 23, delete "the content" and insert -- a content subject --, therefor.